United States Patent
Park et al.

(10) Patent No.: US 11,576,178 B2
(45) Date of Patent: Feb. 7, 2023

(54) METHOD AND DEVICE FOR TRANSMITTING PPDU IN WIRELESS LAN SYSTEM

(71) Applicant: LG ELECTRONICS INC., Seoul (KR)

(72) Inventors: Eunsung Park, Seoul (KR); Sunwoong Yun, Seoul (KR); Dongguk Lim, Seoul (KR); Jinsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 85 days.

(21) Appl. No.: 17/263,040

(22) PCT Filed: Jul. 19, 2019

(86) PCT No.: PCT/KR2019/008962
§ 371 (c)(1),
(2) Date: Jan. 25, 2021

(87) PCT Pub. No.: WO2020/022707
PCT Pub. Date: Jan. 30, 2020

(65) Prior Publication Data
US 2022/0361170 A1    Nov. 10, 2022

(30) Foreign Application Priority Data

Jul. 25, 2018  (KR) .................. 10-2018-0086845
Aug. 10, 2018  (KR) .................. 10-2018-0093682
(Continued)

(51) Int. Cl.
*H04L 27/26* (2006.01)
*H04W 72/04* (2009.01)
*H04W 84/12* (2009.01)

(52) U.S. Cl.
CPC ..... *H04W 72/0453* (2013.01); *H04L 27/2602* (2013.01); *H04L 27/2614* (2013.01); *H04W 84/12* (2013.01)

(58) Field of Classification Search
CPC .............. H04W 72/0453; H04W 84/12; H04L 27/2602; H04L 27/2614
See application file for complete search history.

(56) References Cited

U.S. PATENT DOCUMENTS 10,630,377 B2*  4/2020  Cheng .................. H04W 52/242
11,160,084 B2* 10/2021  Asterjadhi ............ H04W 28/20
(Continued)

FOREIGN PATENT DOCUMENTS

WO    2018080047    5/2018

OTHER PUBLICATIONS

PCT International Application No. PCT/KR2019/008962, International Search Report dated Oct. 23, 2019, 4 pages.
(Continued)

*Primary Examiner* — Jay P Patel
(74) *Attorney, Agent, or Firm* — Lee Hong Degerman Kang Waimey

(57) ABSTRACT

A method and a device for transmitting a PPDU in a WLAN system are proposed. Specifically, a transmission device generates a PPDU and transmits the PPDU to a reception device through a 320 MHz band. The PPDU includes a legacy preamble and an EHT field, and the legacy preamble includes an L-STF and an L-LTF. The legacy preamble is generated by applying a first phase rotation value or a second phase rotation value. The first phase rotation value is obtained based on a third phase rotation value and a fourth phase rotation value. The third phase rotation value is a phase rotation value obtained by repeating a phase rotation value defined when the PPDU is transmitted in an 80 MHz (Continued)

US 11,576,178 B2

Page 2 band four times. The fourth phase rotation value is a phase rotation value defined for each 80 MHz band in the 320 MHz band based on an optimal PAPR of the L-STF.

14 Claims, 39 Drawing Sheets

(30) Foreign Application Priority Data

Aug. 27, 2018 (KR) .................... 10-2018-0100693
Sep. 5, 2018 (KR) .................... 10-2018-0106202

(56) References Cited

U.S. PATENT DOCUMENTS

| | | | |
|---|---|---|---|
| 2015/0139206 A1 | 5/2015 | Azizi et al. | |
| 2015/0349995 A1* | 12/2015 | Zhang | H04L 27/2613 |
| | | | 375/295 |
| 2016/0087766 A1 | 3/2016 | Sun et al. | |
| 2018/0145860 A1 | 5/2018 | Yu et al. | |
| 2019/0288895 A1* | 9/2019 | Chen | H04L 5/0092 |
| 2019/0289612 A1* | 9/2019 | Chen | H04L 5/0092 |
| 2020/0015219 A1* | 1/2020 | Asterjadhi | H04W 72/048 |
| 2022/0039086 A1* | 2/2022 | Asterjadhi | H04W 72/042 |

OTHER PUBLICATIONS

Yujin, et al., "Gamma Phase Rotation for HE PPDU," IEEE 802.11-16/0903r1, Jul. 25, 2016, 28 pages.
Yujin, et al., "Overview of PHY Features for EHT," IEEE 802.11-18/1967r0, Nov. 12, 2018, 24 pages.

\* cited by examiner

METHOD AND DEVICE FOR TRANSMITTING PPDU IN WIRELESS LAN SYSTEM

BACKGROUND

Field

The present disclosure relates to a technique for transmitting a PPDU in a wireless local area network (WLAN) system and, more particularly, to a method and a device for setting a phase rotation value applied to a legacy preamble to optimize a PAPR when a PPDU is transmitted through a 160, 240, or 320 MHz band in a WLAN system.

Related Art

Discussion for a next-generation wireless local area network (WLAN) is in progress. In the next-generation WLAN, an object is to 1) improve an institute of electronic and electronics engineers (IEEE) 802.11 physical (PHY) layer and a medium access control (MAC) layer in bands of 2.4 GHz and 5 GHz, 2) increase spectrum efficiency and area throughput, 3) improve performance in actual indoor and outdoor environments such as an environment in which an interference source exists, a dense heterogeneous network environment, and an environment in which a high user load exists, and the like.

An environment which is primarily considered in the next-generation WLAN is a dense environment in which access points (APs) and stations (STAs) are a lot and under the dense environment, improvement of the spectrum efficiency and the area throughput is discussed. Further, in the next-generation WLAN, in addition to the indoor environment, in the outdoor environment which is not considerably considered in the existing WLAN, substantial performance improvement is concerned.

In detail, scenarios such as wireless office, smart home, stadium, Hotspot, and building/apartment are largely concerned in the next-generation WLAN and discussion about improvement of system performance in a dense environment in which the APs and the STAs are a lot is performed based on the corresponding scenarios.

In the next-generation WLAN, improvement of system performance in an overlapping basic service set (OBSS) environment and improvement of outdoor environment performance, and cellular offloading are anticipated to be actively discussed rather than improvement of single link performance in one basic service set (BSS). Directionality of the next-generation means that the next-generation WLAN gradually has a technical scope similar to mobile communication. When a situation is considered, in which the mobile communication and the WLAN technology have been discussed in a small cell and a direct-to-direct (D2D) communication area in recent years, technical and business convergence of the next-generation WLAN and the mobile communication is predicted to be further active.

SUMMARY

The present disclosure proposes a method and a device for transmitting a PPDU in a wireless local area network (WLAN) system.

An embodiment of the present disclosure proposes a method for transmitting a PPDU.

The embodiment may be performed in a network environment supporting a next-generation WLAN system. The next-generation WLAN system may be a WLAN system evolving from an 802.11ax system and may satisfy backward compatibility with the 802.11ax system. The next-generation WLAN system may correspond to an extremely high throughput (EHT) WLAN system or an 802.11be WLAN system.

The embodiment may be performed by a transmission device, and the transmission device may correspond to an AP. A reception device may correspond to a STA (non-AP STA).

The embodiment relates to a method and a device for setting a phase rotation value applied to a legacy preamble to optimize a PAPR when a PPDU is transmitted through a 160, 240, or 320 MHz band. However, the following description will be made with reference only to a 320 MHz band.

The transmission device generates a physical protocol data unit (PPDU).

The transmission device transmits the PPDU to the reception device through a 320 MHz band.

The PPDU includes a legacy preamble and an extremely high throughput (EHT) field, and the legacy preamble includes a legacy-short training field (L-STF) and a legacy-long training field (L-LTF). The legacy preamble may further include a legacy-signal (L-SIG). The EHT field may include an EHT-SIG, an EHT-STF, an EHT-LTF, and a data field. The legacy field may be a field supported by a pre-802.11be WLAN system, and the EHT field may be a field supported by an 802.11be WLAN system.

The legacy preamble is generated by applying a first phase rotation value or a second phase rotation value. That is, either the first phase rotation value or the second phase rotation value may be commonly applied to all fields included in the legacy preamble. The first phase rotation value is a phase rotation value defined for an optimal PAPR of the L-STF, and the second phase rotation value is a phase rotation value defined for an optimal PAPR of the L-LTF. For example, when the PAPR of the L-STF is high, the first phase rotation value may be applied to the legacy preamble to minimize the PAPR of the L-STF. When the PAPR of the L-LTF is high, the second phase rotation value may be applied to the legacy preamble to minimize the PAPR of the L-LTF.

The first phase rotation value is obtained based on a third phase rotation value and a fourth phase rotation value.

The third phase rotation value is a phase rotation value obtained by repeating a phase rotation value defined when the PPDU is transmitted in an 80 MHz band four times. Since the PPDU is transmitted through the 320 MHz band, the third phase rotation value may be obtained by repeating the phase rotation value for the 80 MHz band defined in existing 802.11ax four times. When the PPDU is transmitted through a 160 MHz band, the third phase rotation value may be obtained by repeating the phase rotation value for the 80 MHz band defined in existing 802.11ax twice. When the PPDU is transmitted through a 240 MHz band, the third phase rotation value may be obtained by repeating the phase rotation value for the 80 MHz band defined in existing 802.11ax three times.

The fourth phase rotation value is a phase rotation value defined for each 80 MHz band in the 320 MHz band based on the optimal PAPR of the L-STF. Since the 320 MHz band can be divided into four 80 MHz bands, one value in the fourth phase rotation value may be defined for each of the four 80 MHz bands. When the PPDU is transmitted through a 160 MHz band, one value in the fourth phase rotation value may be defined for each of two 80 MHz bands based on the optimal PAPR of the L-STF. When the PPDU is transmitted through a 240 MHz band, one value in the fourth phase rotation value may be defined for each of three 80 MHz bands based on the optimal PAPR of the L-STF.

That is, the embodiment proposes a method of additionally performing phase rotation (fourth phase rotation value or fifth phase rotation value) per 80 MHz unit in the entire band while applying the existing 802.11ax method (third phase rotation value).

Hereinafter, a subcarrier range to which a phase rotation value is applied will be described.

The 320 MHz band may include subcarriers having a subcarrier index ranging from −512 to 511.

The third phase rotation value may be [1 −1 1 −1 1 −1 1 −1], because the third phase rotation value is obtained by repeating the phase rotation value [1 −1] for the 80 MHz band defined in existing 802.11ax four times.

A first value of 1 in the third phase rotation value may be applied to subcarriers having a subcarrier index ranging from −512 to −449. A second value of −1 in the third phase rotation value may be applied to subcarriers having a subcarrier index ranging from −448 to −257. That is, the first and second values of [1 −1] in the third phase rotation value may be applied to a first 80 MHz band in the 320 MHz band.

A third value of 1 in the third phase rotation value may be applied to subcarriers having a subcarrier index ranging from −256 to −193. A fourth value of −1 in the third phase rotation value may be applied to subcarriers having a subcarrier index ranging from −192 to −1. That is, the third and fourth values of [1 −1] in the third phase rotation value may be applied to a second 80 MHz band in the 320 MHz band.

A fifth value of 1 in the third phase rotation value may be applied to subcarriers having a subcarrier index ranging from 0 to 63. A sixth value of −1 in the third phase rotation value may be applied to subcarriers having a subcarrier index ranging from 64 to 255. That is, the fifth and sixth values of [1 −1] in the third phase rotation value may be applied to a third 80 MHz band in the 320 MHz band.

A seventh value of 1 in the third phase rotation value may be applied to subcarriers having a subcarrier index ranging from 256 to 319. An eighth value of −1 in the third phase rotation value may be applied to subcarriers having a subcarrier index ranging from 320 to 511. That is, the seventh and eighth values of [1 −1] in the third phase rotation value may be applied to a fourth 80 MHz band in the 320 MHz band.

For example, the fourth phase rotation value may be [1 −j −j 1]. Since the 320 MHz band has the four 80 MHz bands, one value in the fourth phase rotation value may be defined for each of the four 80 MHz bands.

A first value of 1 in the fourth phase rotation value may be applied to the first 80 MHz band in the 320 MHz band.

A second value of −j in the fourth phase rotation value may be applied to the second 80 MHz band in the 320 MHz band.

A third value of −j in the fourth phase rotation value may be applied to the third 80 MHz band in the 320 MHz band.

A fourth value of 1 in the fourth phase rotation value may be applied to the fourth 80 MHz band in the 320 MHz band.

The first phase rotation value may be obtained based on the product of the third phase rotation value and the fourth phase rotation value. That is, the first phase rotation value may be obtained by multiplying the third phase rotation value and the fourth phase rotation value according to a frequency band (or subcarrier index). In this case, the first phase rotation value may be [1 −1 −j j j −j 1 −1].

In another example, the fourth phase rotation value may be [1 j j 1]. Since the 320 MHz band has four 80 MHz bands, one value in the fourth phase rotation value may be defined for each of the four 80 MHz bands.

A first value of 1 in the fourth phase rotation value may be applied to the first 80 MHz band in the 320 MHz band.

A second value of j in the fourth phase rotation value may be applied to the second 80 MHz band in the 320 MHz band.

A third value of j in the fourth phase rotation value may be applied to the third 80 MHz band in the 320 MHz band.

A fourth value of 1 in the fourth phase rotation value may be applied to the fourth 80 MHz band in the 320 MHz band.

The first phase rotation value may be obtained based on the product of the third phase rotation value and the fourth phase rotation value. That is, the first phase rotation value may be obtained by multiplying the third phase rotation value and the fourth phase rotation value according to a frequency band (or subcarrier index). In this case, the first phase rotation value may be [1 −1 j −j j −j 1 −1].

The second phase rotation value may be obtained based on the third phase rotation value and a fifth phase rotation value.

The second phase rotation value may be obtained based on the third phase rotation value and the fifth phase rotation value.

The fifth phase rotation value may be a phase rotation value defined for each 80 MHz band in the 320 MHz band based on the optimal PAPR of the L-LTF. Since the 320 MHz band can be divided into the four 80 MHz bands, one value in the fifth phase rotation value may be defined for each of the four 80 MHz bands. When the PPDU is transmitted through the 160 MHz band, one value in the fifth phase rotation value may be defined for each of two 80 MHz bands based on the optimal PAPR of the L-LTF. When the PPDU is transmitted through the 240 MHz band, one value in the fifth phase rotation value may be defined for each of three 80 MHz bands based on the optimal PAPR of the L-LTF.

For example, the fifth phase rotation value may be [1 j j 1]. Since the 320 MHz band has the four 80 MHz bands, one value in the fifth phase rotation value may be defined for each of the four 80 MHz bands.

A first value of 1 in the fifth phase rotation value may be applied to the first 80 MHz band in the 320 MHz band.

A second value of j in the fifth phase rotation value may be applied to the second 80 MHz band in the 320 MHz band.

A third value of j in the fifth phase rotation value may be applied to the third 80 MHz band in the 320 MHz band.

A fourth value of 1 in the fifth phase rotation value may be applied to the fourth 80 MHz band in the 320 MHz band.

The second phase rotation value may be obtained based on the product of the third phase rotation value and the fifth phase rotation value. That is, the second phase rotation value may be obtained by multiplying the third phase rotation value and the fifth phase rotation value according to a frequency band (or subcarrier index). In this case, the second phase rotation value may be [1 −1 j −j j −j 1 −1].

In another example, the fifth phase rotation value may be [1 −j −j 1]. Since the 320 MHz band has four 80 MHz bands, one value in the fifth phase rotation value may be defined for each of the four 80 MHz bands.

A first value of 1 in the fifth phase rotation value may be applied to the first 80 MHz band in the 320 MHz band.

A second value of −j in the fifth phase rotation value may be applied to the second 80 MHz band in the 320 MHz band.

A third value of −j in the fifth phase rotation value may be applied to the third 80 MHz band in the 320 MHz band.

A fourth value of 1 in the fifth phase rotation value may be applied to the fourth 80 MHz band in the 320 MHz band.

The second phase rotation value may be obtained based on the product of the third phase rotation value and the fifth phase rotation value. That is, the second phase rotation value may be obtained by multiplying the third phase rotation value and the fifth phase rotation value according to a frequency band (or subcarrier index). In this case, the second phase rotation value may be [1 −1 −j j −j j 1 −1].

The L-STF may be generated by applying the first phase rotation value or the second phase rotation value to an L-STF sequence. The L-LTF may be generated by applying the first phase rotation value or the second phase rotation value to an L-LTF sequence.

The L-STF sequence may be a sequence in which an L-STF sequence defined for a 20 MHz band is repeated. Since the L-STF is transmitted through the 320 MHz band, the L-STF sequence may be obtained by repeating the L-STF sequence defined for the 20 MHz band in existing 802.11ax. Likewise, when the L-STF is transmitted through the 160 MHz band, the L-STF sequence defined for the 20 MHz band in existing 802.11ax may be repeated twice. When the L-STF is transmitted through the 240 MHz band, the L-STF sequence defined for the 20 MHz band in existing 802.11 ax may be repeated three times.

The L-STF sequence defined for the 20 MHz band is sqrt(½)*[0 0 0 0 0 0 0 0 1 +j 0 0 0 −1 −j 0 0 0 1 +j 0 0 0 −1 −j 0 0 0 −1 −j 0 0 0 1 +j 0 0 0 0 0 0 0 −1 −j 0 0 0 −1 −j 0 0 0 1 +j 0 0 0 1 +j 0 0 0 1 +j 0 0 0 1 +j 0 0 0 0 0 0 0].

The L-LTF sequence may be a sequence in which an L-LTF sequence defined for a 20 MHz band is repeated. Since the L-LTF is transmitted through the 320 MHz band, the L-LTF sequence may be obtained by repeating the L-LTF sequence defined for the 20 MHz band in existing 802.11ax. Likewise, when the L-LTF is transmitted through the 160 MHz band, the L-LTF sequence defined for the 20 MHz band in existing 802.11ax may be repeated twice. When the L-LTF is transmitted through the 240 MHz band, the L-LTF sequence defined for the 20 MHz band in existing 802.11ax may be repeated three times.

The L-LTF sequence defined for the 20 MHz band is [0 0 0 0 0 1 1 −1 −1 1 1 −1 1 −1 1 1 1 1 1 1 −1 −1 1 1 −1 1 −1 1 1 1 1 1 −1 1 1 1 1 0 −1 −1 1 1 −1 1 −1 1 −1 1 −1 −1 −1 −1 −1 1 1 −1 −1 1 −1 1 −1 1 1 1 1 −1 −1 1 1 1 1 0 0 0 0].

According to the foregoing embodiment, when the PPDU is transmitted through the 160 MHz or 240 MHz band, a phase rotation value may also be defined and applied to the legacy preamble in the same manner.

The EHT-SIG may include an EHT-SIG-A and an EHT-SIG-B. The EHT-SIG-B may include RU information. That is, the AP may indicate information on a tone plan for 160/240/320 MHz through the EHT-SIG-B in the PPDU. The EHT-STF, EHT-LTF, and the data field included in the EHT field may be transmitted or received in a band (RU) according to the tone plan for 160/240/320 MHz.

The EHT-SIG may be generated by applying the first phase rotation value or the second phase rotation value. When the EHT PPDU has a preamble structure according to 11ax, the field may be generated by applying the same phase rotation value to up to the EHT-SIG-B.

According to an embodiment proposed in the present disclosure, when a PPDU is transmitted through a 160, 240, or 320 MHz band, a phase rotation value applied to a legacy preamble may be defined, thereby obtaining an optimized PAPR. Accordingly, it is possible to achieve efficiency in a subcarrier and high throughput.

DESCRIPTION OF EXEMPLARY EMBODIMENTS

Figure 1:
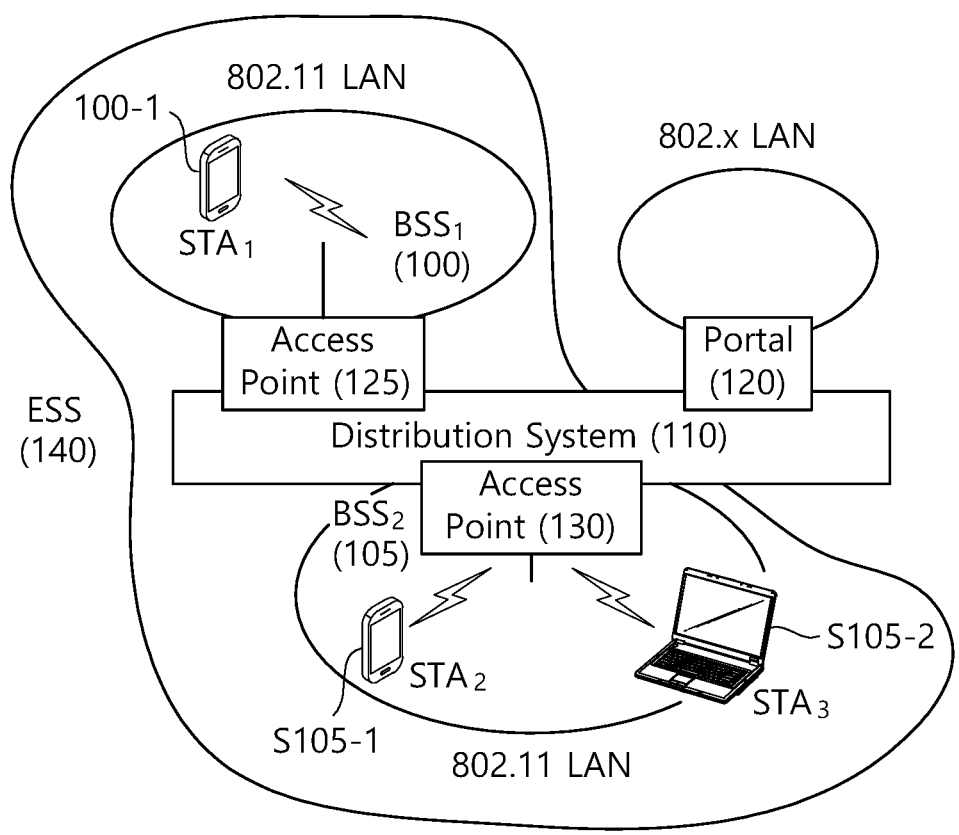
FIG. 1 is a conceptual view illustrating the structure of a wireless local area network (WLAN).
Figure 1:
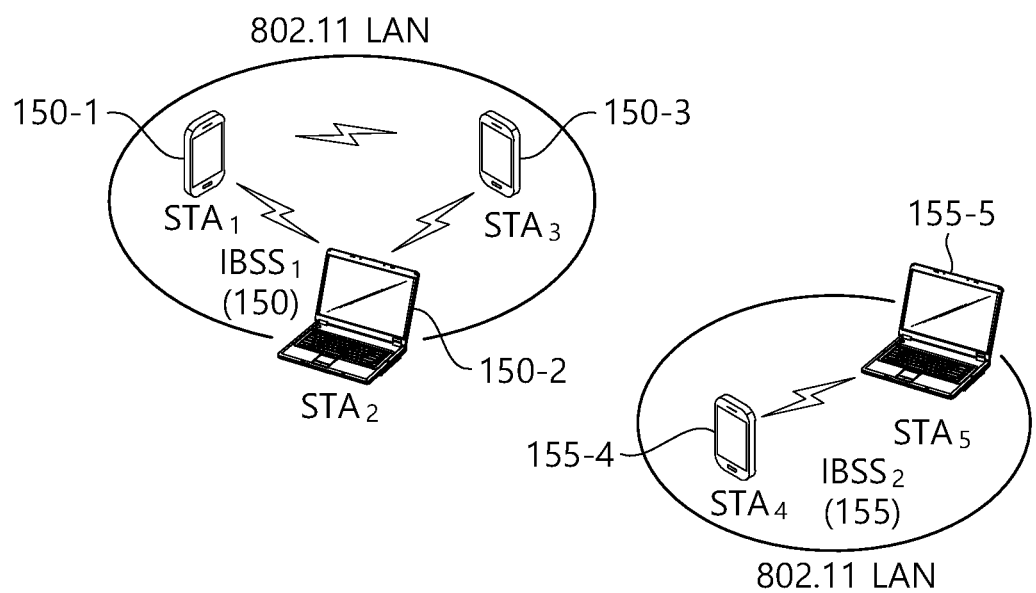

FIG. 1 is a conceptual view illustrating the structure of a wireless local area network (WLAN).

An upper part of FIG. 1 illustrates the structure of an infrastructure basic service set (BSS) of institute of electrical and electronic engineers (IEEE) 802.11.

Referring the upper part of FIG. 1, the wireless LAN system may include one or more infrastructure BSSs (100, 105) (hereinafter, referred to as BSS). The BSSs (100, 105), as a set of an AP and an STA such as an access point (AP) (125) and a station (STA1) (100-1) which are successfully synchronized to communicate with each other, are not concepts indicating a specific region. The BSS (105) may include one or more STAs (105-1, 105-2) which may be joined to one AP (130).

The BSS may include at least one STA, APs providing a distribution service, and a distribution system (DS) (110) connecting multiple APs.

The distribution system (110) may implement an extended service set (ESS) (140) extended by connecting the multiple BSSs (100, 105). The ESS (140) may be used as a term indicating one network configured by connecting one or more APs (125, 130) through the distribution system (110). The AP included in one ESS (140) may have the same service set identification (SSID).

A portal (120) may serve as a bridge which connects the wireless LAN network (IEEE 802.11) and another network (e.g., 802.X).

In the BSS illustrated in the upper part of FIG. 1, a network between the APs (125, 130) and a network between the APs (125, 130) and the STAs (100-1, 105-1, 105-2) may be implemented. However, the network is configured even between the STAs without the APs (125, 130) to perform communication. A network in which the communication is performed by configuring the network even between the STAs without the APs (125, 130) is defined as an Ad-Hoc network or an independent basic service set (IBSS).

A lower part of FIG. 1 illustrates a conceptual view illustrating the IBSS.

Referring to the lower part of FIG. 1, the IBSS is a BSS that operates in an Ad-Hoc mode. Since the IBSS does not include the access point (AP), a centralized management entity that performs a management function at the center does not exist. That is, in the IBSS, STAs (150-1, 150-2, 150-3, 155-4, 155-5) are managed by a distributed manner. In the IBSS, all STAs (150-1, 150-2, 150-3, 155-4, 155-5) may be constituted by movable STAs and are not permitted to access the DS to constitute a self-contained network.

The STA as a predetermined functional medium that includes a medium access control (MAC) that follows a regulation of an Institute of Electrical and Electronics Engineers (IEEE) 802.11 standard and a physical layer interface for a radio medium may be used as a meaning including all of the APs and the non-AP stations (STAs).

The STA may be called various a name such as a mobile terminal, a wireless device, a wireless transmit/receive unit (WTRU), user equipment (UE), a mobile station (MS), a mobile subscriber unit, or just a user.

Meanwhile, the term user may be used in various meanings, for example, in wireless LAN communication, this term may be used to signify a STA participating in uplink MU MIMO and/or uplink OFDMA transmission. However, the meaning of this term will not be limited only to this.

Figure 2:
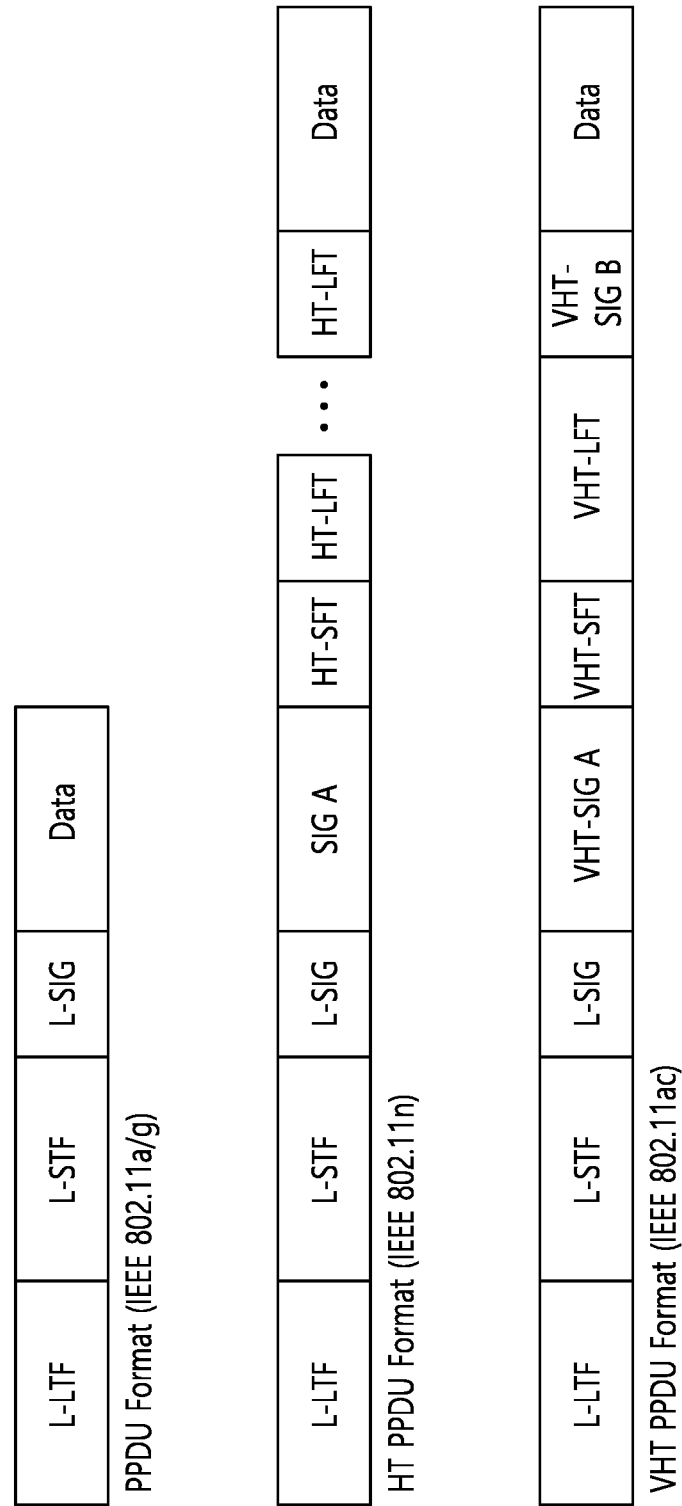
FIG. 2 is a diagram illustrating an example of a PPDU used in an IEEE standard.

FIG. 2 is a diagram illustrating an example of a PPDU used in an IEEE standard.

As illustrated in FIG. 2, various types of PHY protocol data units (PPDUs) may be used in a standard such as IEEE a/g/n/ac, and so on. In detail, LTF and STF fields include a training signal, SIG-A and SIG-B include control information for a receiving station, and a data field includes user data corresponding to a PSDU.

In the embodiment, an improved technique is provided, which is associated with a signal (alternatively, a control information field) used for the data field of the PPDU. The signal provided in the embodiment may be applied onto high efficiency PPDU (HE PPDU) according to an IEEE 802.11ax standard. That is, the signal improved in the embodiment may be HE-SIG-A and/or HE-SIG-B included in the HE PPDU. The HE-SIG-A and the HE-SIG-B may be represented even as the SIG-A and SIG-B, respectively. However, the improved signal proposed in the embodiment is not particularly limited to an HE-SIG-A and/or HE-SIG-B standard and may be applied to control/data fields having various names, which include the control information in a wireless communication system transferring the user data.

Figure 3:
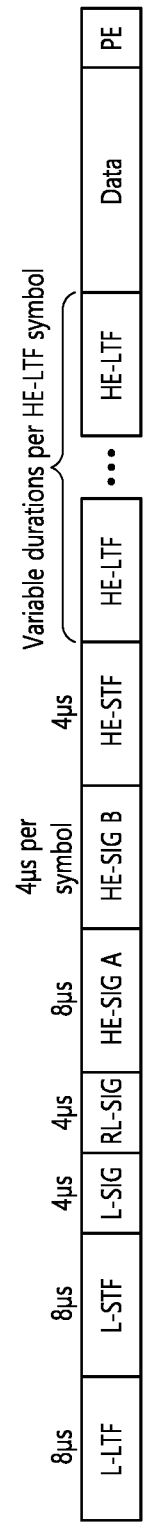
FIG. 3 is a diagram illustrating an example of an HE PDDU.

FIG. 3 is a diagram illustrating an example of an HE PDDU.

The control information field provided in the embodiment may be the HE-SIG-B included in the HE PPDU. The HE PPDU according to FIG. 3 is one example of the PPDU for multiple users and only the PPDU for the multiple users may include the HE-SIG-B and the corresponding HE SIG-B may be omitted in a PPDU for a single user.

As illustrated in FIG. 3, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted during an illustrated time period (that is, 4 or 8 μs).

More detailed description of the respective fields of FIG. 3 will be made below.

Figure 4:
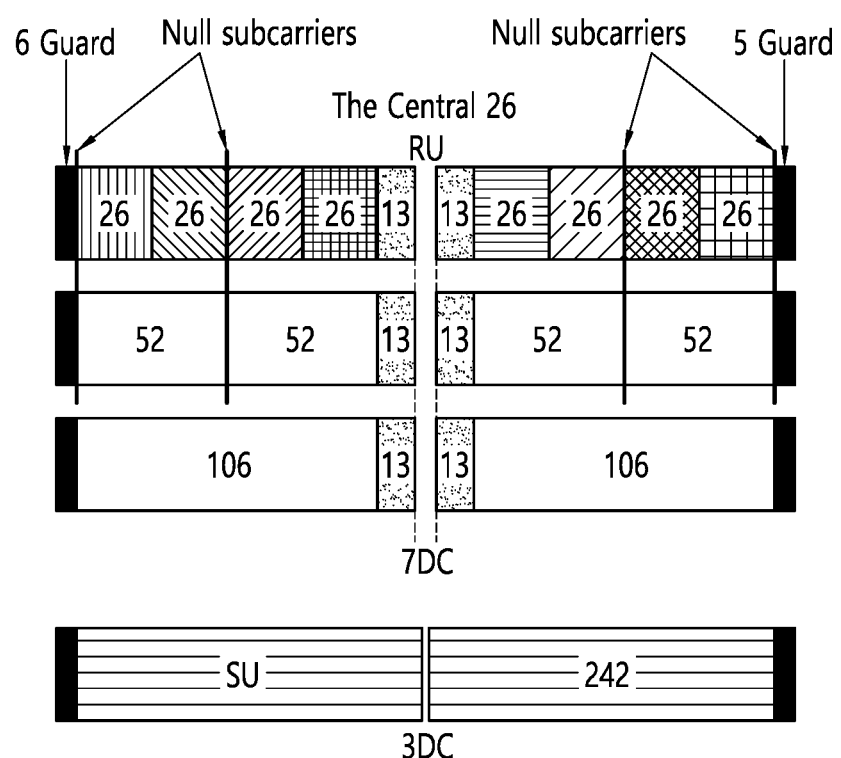
FIG. 4 is a diagram illustrating a layout of resource units (RUs) used in a band of 20 MHz.

FIG. 4 is a diagram illustrating a layout of resource units (RUs) used in a band of 20 MHz.

As illustrated in FIG. 4, resource units (RUs) corresponding to tone (that is, subcarriers) of different numbers are used to constitute some fields of the HE-PPDU. For example, the resources may be allocated by the unit of the RU illustrated for the HE-STF, the HE-LTF, and the data field.

As illustrated in an uppermost part of FIG. 4, 26 units (that is, units corresponding to 26 tones). 6 tones may be used as a guard band in a leftmost band of the 20 MHz band and 5 tones may be used as the guard band in a rightmost band of the 20 MHz band. Further, 7 DC tones may be inserted into a center band, that is, a DC band and a 26-unit corresponding to each 13 tones may be present at left and right sides of the DC band. The 26-unit, a 52-unit, and a 106-unit may be allocated to other bands. Each unit may be allocated for a receiving station, that is, a user.

Meanwhile, the RU layout of FIG. 4 may be used even in a situation for a single user (SU) in addition to the multiple users (MUs) and, in this case, as illustrated in a lowermost part of FIG. 4, one 242-unit may be used and, in this case, three DC tones may be inserted.

In one example of FIG. 4, RUs having various sizes, that is, a 26-RU, a 52-RU, a 106-RU, a 242-RU, and the like are proposed, and as a result, since detailed sizes of the RUs may extend or increase, the embodiment is not limited to a detailed size (that is, the number of corresponding tones) of each RU.

Figure 5:
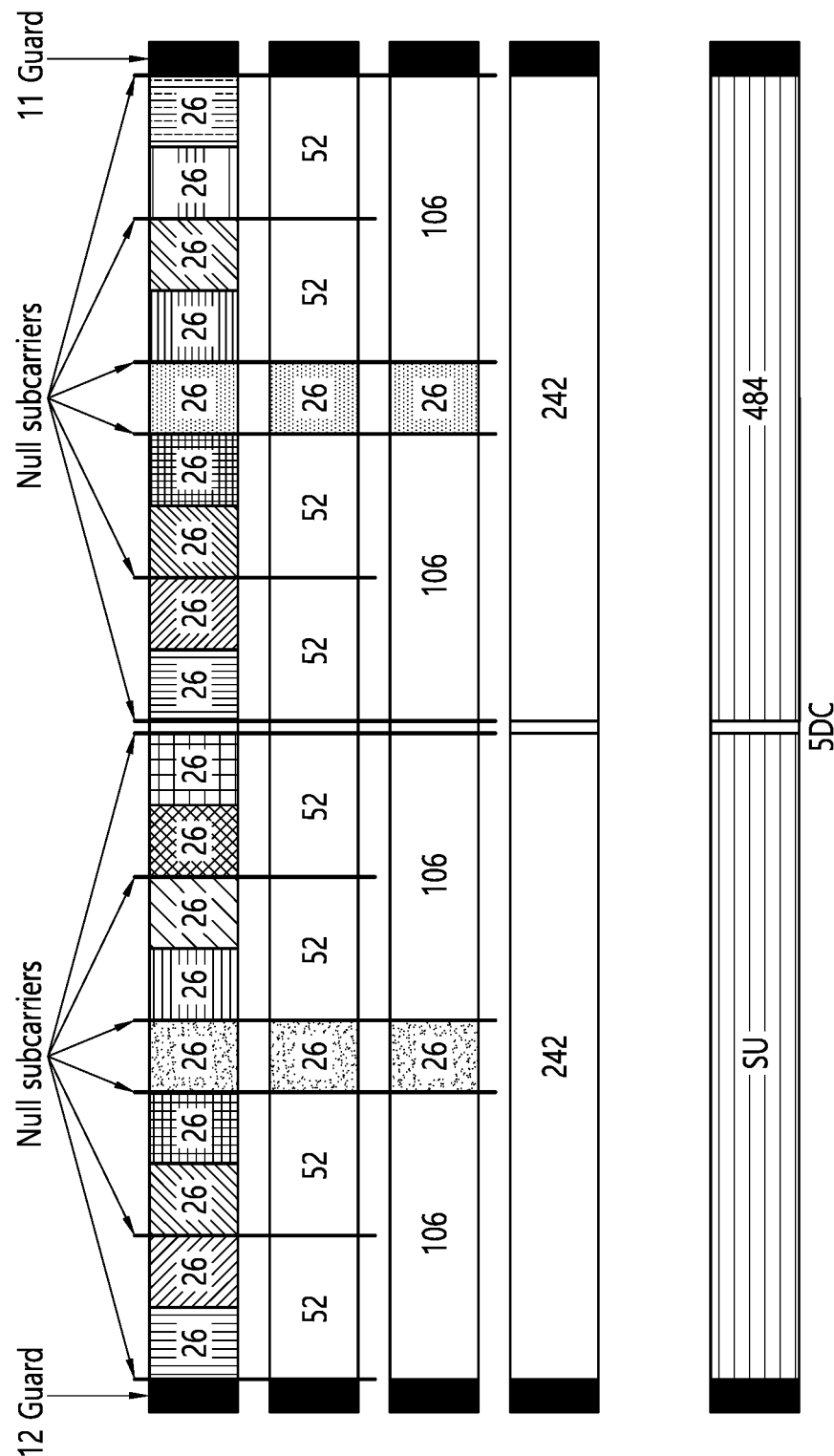
FIG. 5 is a diagram illustrating a layout of resource units (RUs) used in a band of 40 MHz.

FIG. 5 is a diagram illustrating a layout of resource units (RUs) used in a band of 40 MHz.

Similarly to a case in which the RUs having various RUs are used in one example of FIG. 4, 26-RU, 52-RU, 106-RU, 242-RU, 484-RU, and the like, may be used even in one example of FIG. 5. Further, 5 DC tones may be inserted into a center frequency, 12 tones may be used as the guard band in the leftmost band of the 40 MHz band and 11 tones may be used as the guard band in the rightmost band of the 40 MHz band.

In addition, as illustrated in FIG. 5, when the RU layout is used for the single user, the 484-RU may be used. That is, the detailed number of RUs may be modified similarly to one example of FIG. 4.

Figure 6:
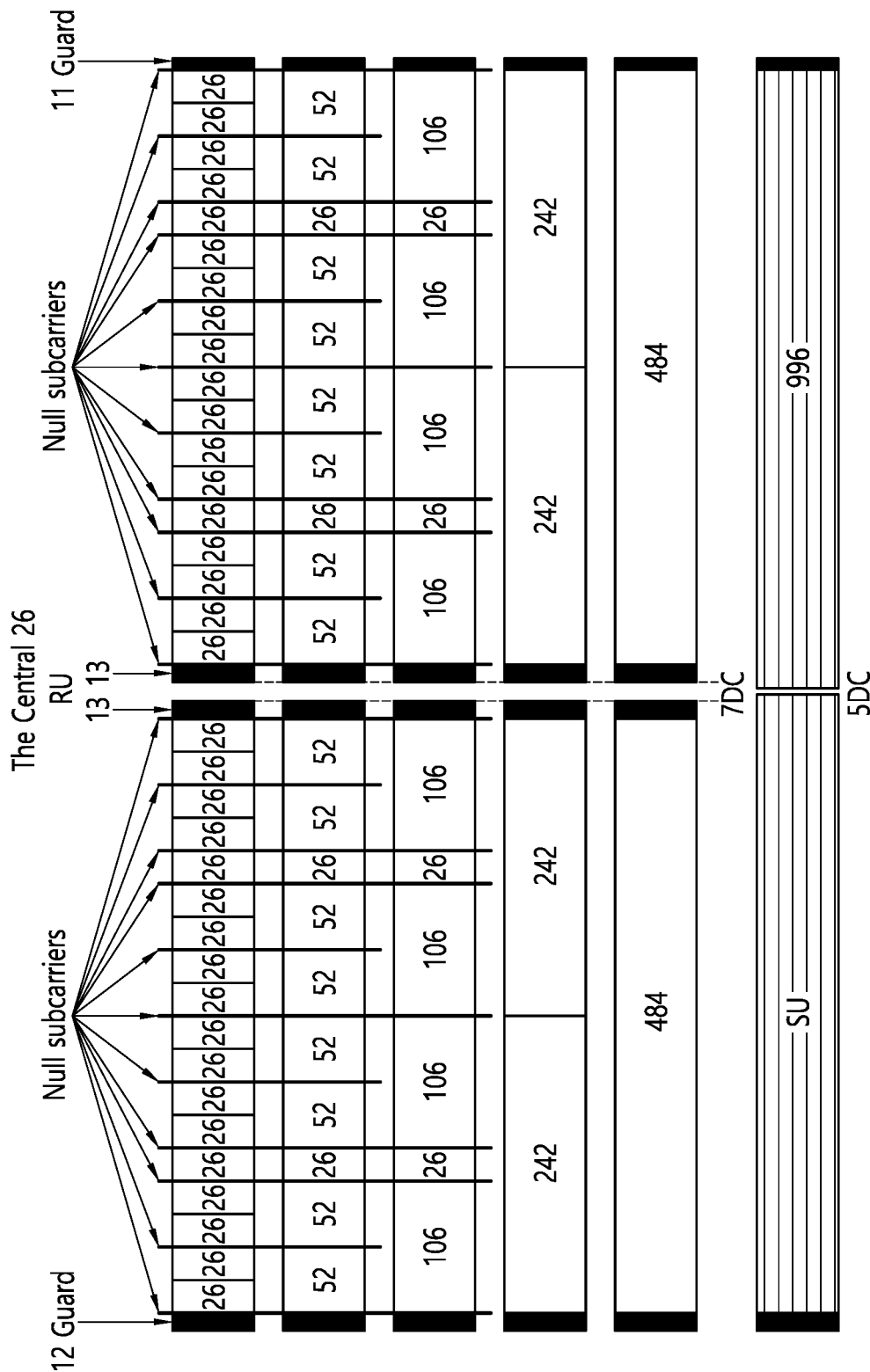
FIG. 6 is a diagram illustrating a layout of resource units (RUs) used in a band of 80 MHz.

FIG. 6 is a diagram illustrating a layout of resource units (RUs) used in a band of 80 MHz.

Figure 26:
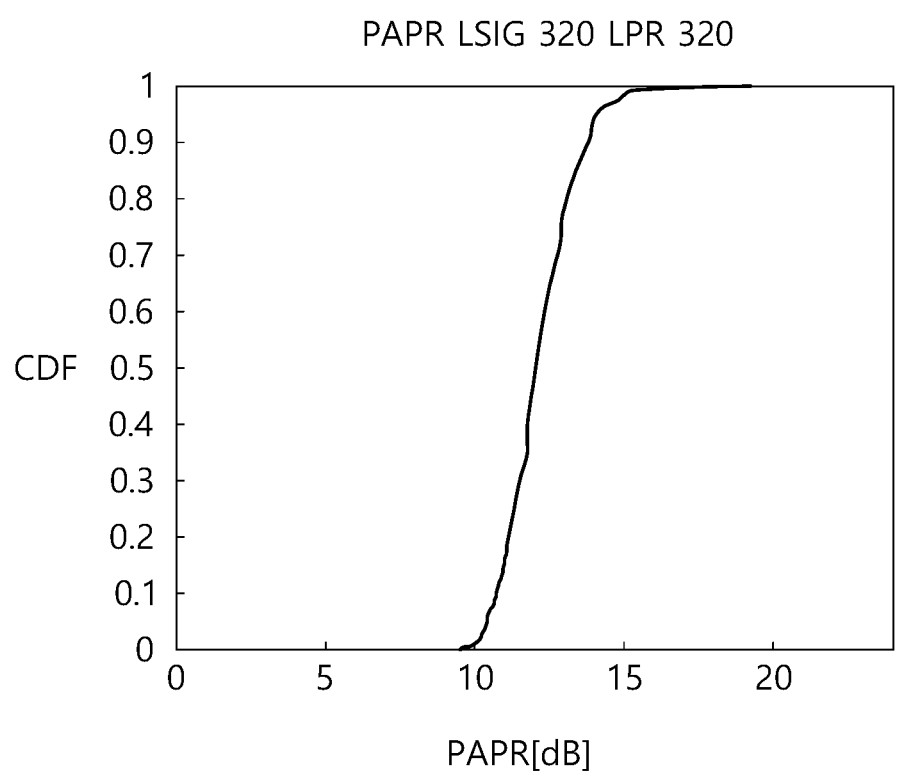
FIG. 26 illustrates the PAPR of an L-SIG in contiguous 320 MHz to which phase rotation 8 is applied.

Similarly to a case in which the RUs having various RUs are used in one example of each of FIG. 4 or 5, 26-RU, 52-RU, 106-RU, 242-RU, 484-RU, and the like, may be used even in one example of FIG. 6. Further, 7 DC tones may be inserted into the center frequency, 12 tones may be used as the guard band in the leftmost band of the 80 MHz band and 11 tones may be used as the guard band in the rightmost band of the 80 MHz band. In addition, the 26-RU may be used, which uses 13 tones positioned at each of left and right sides of the DC band.

Moreover, as illustrated in FIG. 6, when the RU layout is used for the single user, 996-RU may be used and, in this case, 5 DC tones may be inserted.

Meanwhile, the detailed number of RUs may be modified similarly to one example of each of FIG. 4 or FIG. 5.

Figure 7:
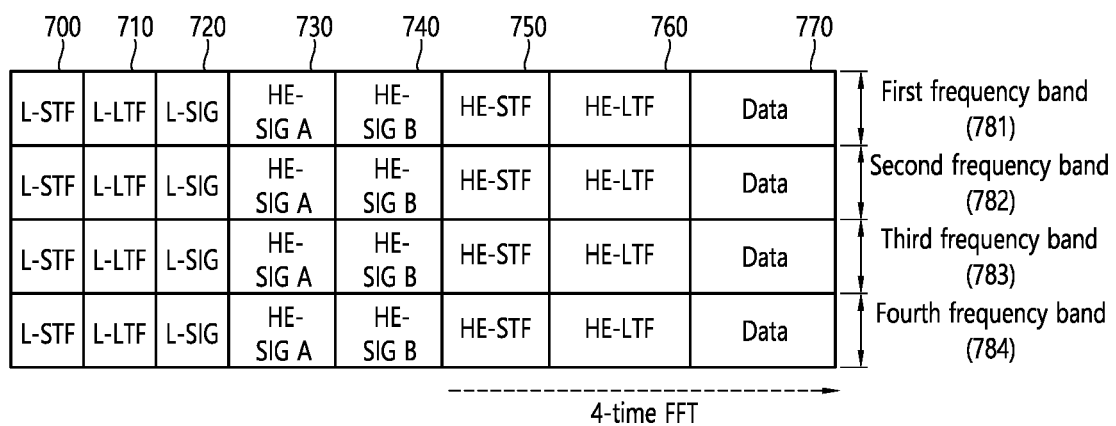
FIG. 7 is a diagram illustrating another example of the HE PPDU.

FIG. 7 is a diagram illustrating another example of the HE PPDU.

A block illustrated in FIG. 7 is another example of describing the HE-PPDU block of FIG. 3 in terms of a frequency.

An illustrated L-STF (700) may include a short training orthogonal frequency division multiplexing (OFDM) symbol. The L-STF (700) may be used for frame detection, automatic gain control (AGC), diversity detection, and coarse frequency/time synchronization.

An L-LTF (710) may include a long training orthogonal frequency division multiplexing (OFDM) symbol. The L-LTF (710) may be used for fine frequency/time synchronization and channel prediction.

An L-SIG (720) may be used for transmitting control information. The L-SIG (720) may include information regarding a data rate and a data length. Further, the L-SIG (720) may be repeatedly transmitted. That is, a new format, in which the L-SIG (720) is repeated (for example, may be referred to as R-LSIG) may be configured.

An HE-SIG-A (730) may include the control information common to the receiving station.

In detail, the HE-SIG-A (730) may include information on 1) a DL/UL indicator, 2) a BSS color field indicating an identify of a BSS, 3) a field indicating a remaining time of a current TXOP period, 4) a bandwidth field indicating at least one of 20, 40, 80, 160 and 80+80 MHz, 5) a field indicating an MCS technique applied to the HE-SIG-B, 6) an indication field regarding whether the HE-SIG-B is modulated by a dual subcarrier modulation technique for MCS, 7) a field indicating the number of symbols used for the HE-SIG-B, 8) a field indicating whether the HE-SIG-B is configured for a full bandwidth MIMO transmission, 9) a field indicating the number of symbols of the HE-LTF, 10) a field indicating the length of the HE-LTF and a CP length, 11) a field indicating whether an OFDM symbol is present for LDPC coding, 12) a field indicating control information regarding packet extension (PE), and 13) a field indicating information on a CRC field of the HE-SIG-A, and the like. A detailed field of the HE-SIG-A may be added or partially omitted. Further, some fields of the HE-SIG-A may be partially added or omitted in other environments other than a multi-user (MU) environment.

In addition, the HE-SIG-A (730) may be composed of two parts: HE-SIG-A1 and HE-SIG-A2. HE-SIG-A1 and HE-SIG-A2 included in the HE-SIG-A may be defined by the following format structure (fields) according to the PPDU. First, the HE-SIG-A field of the HE SU PPDU may be defined as follows.

TABLE 1

| Two Parts of HE-SIG-A | Bit | Field | Number of bits | Description |
|---|---|---|---|---|
| HE-SIG-A1 | B0 | Format | 1 | Differentiate an HE SU PPDU and HE ER SU PPDU from an HE TB PPDU: Set to 1 for an HE SU PPDU and HE ER SU PPDU |
| | B1 | Beam Change | 1 | Set to 1 to indicate that the pre-HE modulated fields of the PPDU are spatially mapped differently from the first symbol of the HE-LTF. Equation (28-6), Equation (28-9), Equation (28-12), Equation (28-14), Equation (28-16) and Equation (28-18) apply if the Beam Change field is set to 1. Set to 0 to indicate that the pre-HE modulated fields of the PPDU are spatially mapped the same way as the first symbol of the HE-LTF on each tone. Equation (28-8), Equation (28-10), Equation (28-13), Equation (28-15), Equation (28-17) and Equation (28-19) apply if the Beam Change field is set to 0. |

TABLE 1-continued

| Two Parts of HE-SIG-A | Bit | Field | Number of bits | Description |
|---|---|---|---|---|
| | B2 | UL/DL | 1 | Indicates whether the PPDU is sent UL or DL. Set to the value indicated by the TXVECTOR parameter UPLINK_FLAG. |
| | B3-B6 | MCS | 4 | For an HE SU PPDU:<br>Set to n for MCSn, where n = 0, 1, 2, . . . , 11<br>Values 12-15 are reserved<br>For HE ER SU PPDU with Bandwidth field set to 0 (242-tone RU):<br>Set to n for MCSn, where n = 0, 1, 2<br>Values 3-15 are reserved<br>For HE ER SU PPDU with Bandwidth field set to 1 (upper frequency 106-tone RU):<br>Set to 0 for MCS 0<br>Values 1-15 are reserved |
| | B7 | DCM | 1 | Indicates whether or not DCM is applied to the Data field for the MCS indicated.<br>If the STBC field is 0, then set to 1 to indicate that DCM is applied to the Data field. Neither DCM nor STBC shall be applied if both the DCM and STBC are set to 1.<br>Set to 0 to indicate that DCM is not applied to the Data field.<br>NOTE-DCM is applied only to HE-MCSs 0, 1, 3 and 4. DCM is applied only to 1 and 2 spatial streams. DCM is not applied in combination with STBC. |
| | B8-B13 | BSS Color | 6 | The BSS Color field is an identifier of the BSS.<br>Set to the value of the TXVECTOR parameter BSS_COLOR. |
| | B14 | Reserved | 1 | Reserved and set to 1 |
| | B15-B18 | Spatial Reuse | 4 | Indicates whether or not spatial reuse is allowed during the transmission of this PPDU.<br>Set to a value from Table 28-21 (Spatial Reuse field encoding for an HE SU PPDU, HE ER SU PPDU, and HE MU PPDU), see 27.11.6 (SPATIAL_REUSE).<br>Set to SRP_DISALLOW to prohibit SRP-based spatial reuse during this PPDU.<br>Set to SRP_AND_NON_SRG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |
| | B19-B20 | Bandwidth | 2 | For an HE SU PPDU:<br>Set to 0 for 20 MHz<br>Set to 1 for 40 MHz<br>Set to 2 for 80 MHz<br>Set to 3 for 160 MHz and 80 + 80 MHz<br>For an HE ER SU PPDU:<br>Set to 0 for 242-tone RU<br>Set to 1 for upper frequency 106-tone RU within the primary 20 MHz<br>Values 2 and 3 are reserved |
| | B21-B22 | GI + LTF Size | 2 | Indicates the GI duration and HE-LTF size.<br>Set to 0 to indicate a 1x HE-LTF and 0.8 µs GI<br>Set to 1 to indicate a 2x HE-LTF and 0.8 µs GI<br>Set to 2 to indicate a 2x HE-LTF and 1.6 µs GI<br>Set to 3 to indicate:<br>a 4x HE-LTF and 0.8 µs GI if both the DCM and STBC fields are 1. Neither DCM nor STBC shall be applied if both the DCM and STBC fields are set to 1.<br>a 4x HE-LTF and 3.2 µs GI, otherwise |
| | B23-B25 | NSTS And Midamble Periodicity | 3 | If the Doppler field is 0, indicates the number of space-time streams.<br>Set to the number of space-time streams minus 1<br>For an HE ER SU PPDU, values 2 to 7 are reserved<br>If the Doppler field is 1, then B23-B24 indicates the number of space time streams, up to 4, and B25 indicates the midamble periodicity.<br>B23-B24 is set to the number of space time streams minus 1.<br>For an HE ER SU PPDU, values 2 and 3 are reserved<br>B25 is set to 0 if TXVECTOR parameter MIDAMBLE_PERIODICITY is 10 and set to 1 if TXVECTOR parameter MIDAMBLE_PERIODICITY is 20. |

TABLE 1-continued

| Two Parts of HE-SIG-A | Bit | Field | Number of bits | Description |
|---|---|---|---|---|
| HE-SIG-A2 (HE SU PPDU) or HE-SIG-A3 (HE ER SU PPDU) | B0-B6 | TXOP | 7 | Set to 127 to indicate no duration information if TXVECTOR parameter TXOP_DURATION is set to UNSPECIFIED. Set to a value less than 127 to indicate duration information for NAV setting and protection of the TXOP as follows: If TXVECTOR parameter TXOP_DURATION is less than 512, then B0 is set to 0 and B1-B6 is set to floor(TXOP_DURATION/8). Otherwise, B0 is set to 1 and B1-B6 is set to floor ((TXOP_DURATION − 512)/128). where B0 indicates the TXOP length granularity. Set to 0 for 8 μs; otherwise set to 1 for 128 μs. B1-B6 indicates the scaled value of the TXOP_DURATION |
| | B7 | Coding | 1 | Indicates whether BCC or LDPC is used: Set to 0 to indicate BCC Set to 1 to indicate LDPC |
| | B8 | LDPC Extra Symbol Segment | 1 | Indicates the presence of the extra OFDM symbol segment for LDPC: Set to 1 if an extra OFDM symbol segment for LDPC is present Set to 0 if an extra OFDM symbol segment for LDPC is not present Reserved and set to 1 if the Coding field is set to 0. |
| | B9 | STBC | 1 | If the DCM field is set to 0, then set to 1 if space time block coding is used. Neither DCM nor STBC shall be applied if both the DCM field and STBC field are set to 1. Set to 0 otherwise. |
| | B10 | Beam-formed | 1 | Set to 1 if a beamforming steering matrix is applied to the waveform in an SU transmission. Set to 0 otherwise. |
| | B11-B12 | Pre-FEC Padding Factor | 2 | Indicates the pre-FEC padding factor. Set to 0 to indicate a pre-FEC padding factor of 4 Set to 1 to indicate a pre-FEC padding factor of 1 Set to 2 to indicate a pre-FEC padding factor of 2 Set to 3 to indicate a pre-FEC padding factor of 3 |
| | B13 | PE Disambiguity | 1 | Indicates PE disambiguity as defined in 28.3.12 (Packet extension). |
| | B14 | Reserved | 1 | Reserved and set to 1 |
| | B15 | Doppler | 1 | Set to 1 if one of the following applies: The number of OFDM symbols in the Data field is larger than the signaled midamble periodicity plus 1 and the midamble is present The number of OFDM symbols in the Data field is less than or equal to the signaled midamble periodicity plus 1 (see 28.3.11.16 Midamble), the midamble is not present, but the channel is fast varying. It recommends that midamble may be used for the PPDUs of the reverse link. Set to 0 otherwise. |
| | B16-B19 | CRC | 4 | CRC for bits 0-41 of the HE-SIG-A field (see 28.3.10.7.3 (CRC computation)). Bits 0-41 of the HE-SIG-A field correspond to bits 0-25 of HE-SIG-A1 followed by bits 0-15 of HE-SIG-A2). |
| | B20-B25 | Tail | 6 | Used to terminate the trellis of the convolutional decoder. Set to 0. |

In addition, the HE-SIG-A field of the HE MU PPDU may be defined as follows.

TABLE 2

| Two Parts of HE-SIG-A | Bit | Field | Number of bits | Description |
|---|---|---|---|---|
| HE-SIG-A1 | B0 | UL/DL | 1 | Indicates whether the PPDU is sent UL or DL. Set to the value indicated by the TXVECTOR parameter UPLINK_FLAG. |

TABLE 2-continued

| Two Parts of HE-SIG-A | Bit | Field | Number of bits | Description |
|---|---|---|---|---|
| | | | | NOTE-The TDLS peer can identify the TDLS frame by To DS and From DS fields in the MAC header of the MPDU. |
| | B1-B3 | SIGB MCS | 3 | Indicates the MCS of the HE-SIG-B field:<br>Set to 0 for MCS 0<br>Set to 1 for MCS 1<br>Set to 2 for MCS 2<br>Set to 3 for MCS 3<br>Set to 4 for MCS 4<br>Set to 5 for MCS 5<br>The values 6 and 7 are reserved |
| | B4 | SIGB DCM | 1 | Set to 1 indicates that the HE-SIG-B is modulated with DCM for the MCS.<br>Set to 0 indicates that the HE-SIG-B is not modulated with DCM for the MCS.<br>NOTE-DCM is only applicable to MCS 0, MCS 1, MCS 3, and MCS 4. |
| | B5-B10 | BSS Color | 6 | The BSS Color field is an identifier of the BSS.<br>Set to the value of the TXVECTOR parameter BSS_COLOR. |
| | B11-B14 | Spatial Reuse | 4 | Indicates whether or not spatial reuse is allowed during the transmission of this PPDU.<br>Set to the value of the SPATIAL_REUSE parameter of the TXVECTOR, which contains a value from Table 28-21 (Spatial Reuse field encoding for an HE SU PPDU, HE ER SU PPDU, and HE MU PPDU) (see 27.11.6 (SPATIAL_REUSE)).<br>Set to SRP_DISALLOW to prohibit SRP-based spatial reuse during this PPDU. Set to SRP_AND_NON_SRG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |
| | B15-B17 | Bandwidth | 3 | Set to 0 for 20 MHz.<br>Set to 1 for 40 MHz.<br>Set to 2 for 80 MHz non-preamble puncturing mode.<br>Set to 3 for 160 MHz and 80 + 80 MHz non-preamble puncturing mode.<br>If the SIGB Compression field is 0:<br>Set to 4 for preamble puncturing in 80 MHz, where in the preamble only the secondary 20 MHz is punctured.<br>Set to 5 for preamble puncturing in 80 MHz, where in the preamble only one of the two 20 MHz sub-channels in secondary 40 MHz is punctured.<br>Set to 6 for preamble puncturing in 160 MHz or 80 + 80 MHz, where in the primary 80 MHz of the preamble only the secondary 20 MHz is punctured.<br>Set to 7 for preamble puncturing in 160 MHz or 80 + 80 MHz, where in the primary 80 MHz of the preamble the primary 40 MHz is present.<br>If the SIGB Compression field is 1 then values 4-7 are reserved. |
| | B18-B21 | Number Of HE-SIG-B Symbols Or MU-MIMO Users | 4 | If the HE-SIG-B Compression field is set to 0, indicates the number of OFDM symbols in the HE-SIG-B field:<br>Set to the number of OFDM symbols in the HE-SIG-B field minus 1 if the number of OFDM symbols in the HE-SIG-B field is less than 16;<br>Set to 15 to indicate that the number of OFDM symbols in the HE-SIG-B field is equal to 16 if Longer Than 16 HE SIG-B OFDM Symbols Support sub-field of the HE Capabilities element transmitted by at least one recipient STA is 0;<br>Set to 15 to indicate that the number of OFDM symbols in the HE-SIG-B field is greater than or equal to 16 if the Longer Than 16 HE SIG-B OFDM Symbols Support subfield of the HE Capabilities element transmitted by all the recipient STAs are 1 and if the HE-SIG-B data rate is less than MCS 4 without DCM. The exact number of OFDM symbols in the HE-SIG-B field is calculated based on the number of User fields in the HE-SIG-B content channel which is indicated by HE-SIG-B common field in this case. |

TABLE 2-continued

| Two Parts of HE-SIG-A | Bit | Field | Number of bits | Description |
|---|---|---|---|---|
| | | | | If the HE-SIG-B Compression field is set to 1, indicates the number of MU-MIMO users and is set to the number of NU-MIMO users minus 1. |
| | B22 | SIGB Compression | 1 | Set to 0 if the Common field in HE-SIG-B is present. Set to 1 if the Common field in HE-SIG-B is not present. |
| | B23-B24 | GI + LTF Size | 2 | Indicates the GI duration and HE-LTF size: Set to 0 to indicate a 4x HE-LTF and 0.8 μs GI Set to 1 to indicate a 2x HE-LTF and 0.8 μs GI Set to 2 to indicate a 2x HE-LTF and 1.6 μs GI Set to 3 to indicate a 4x HE-LTF and 3.2 μs GI |
| | B25 | Doppler | 1 | Set to 1 if one of the following applies: The number of OFDM symbols in the Data field is larger than the signaled midamble periodicity plus 1 and the midamble is present The number of OFDM symbols in the Data field is less than or equal to the signaled midamble periodicity plus 1 (see 28.3.11.16 Midamble), the midamble is not present, but the channel is fast varying. It recommends that midamble may be used for the PPDUs of the reverse link. Set to 0 otherwise. |
| HE-SIG-A2 | B0-B6 | TXOP | 7 | Set to 127 to indicate no duration information if TXVECTOR parameter TXOP_DURATION is set to UNSPECIFIED. Set to a value less than 127 to indicate duration information for NAV setting and protection of the TXOP as follows: If TXVECTOR parameter TXOP_DURATION is less than 512, then B0 is set to 0 and B1-B6 is set to floor(TXOP_DURATION/8). Otherwise, B0 is set to 1 and B1-B6 is set to floor ((TXOP_DURATION − 512)/128). where B0 indicates the TXOP length granularity. Set to 0 for 8 μs; otherwise set to 1 for 128 μs. B1-B6 indicates the scaled value of the TXOP_DURATION |
| | B7 | Reserved | 1 | Reserved and set to 1 |
| | B8-B10 | Number of HE-LTF SymbolsAnd Midamble Periodicity | 3 | If the Doppler field is set to 0, indicates the number of HE-LTF symbols: Set to 0 for 1 HE-LTF symbol Set to 1 for 2 HE-LTF symbols Set to 2 for 4 HE-LTF symbols Set to 3 for 6 HE-LTF symbols Set to 4 for 8 HE-LTF symbols Other values are reserved. If the Doppler field is set to 1, B8-B9 indicates the number of HE-LTF symbols and B10 indicates midamble periodicity: B8-B9 is encoded as follows: 0 indicates 1 HE-LTF symbol 1 indicates 2 HE-LTF symbols 2 indicates 4 HE-LTF symbols 3 is reserved B10 is set to 0 if the TXVECTOR parameter MIDAMBLE_PERIODICITY is 10 and set to 1 if the TXVECTOR parameter PREAMBLE_PERIODICITY is 20. |
| | B11 | LDPC Extra Symbol Segment | 1 | Indication of the presence of the extra OFDM symbol segment for LDPC. Set to 1 if an extra OFDM symbol segment for LDPC is present. Set to 0 otherwise. |
| | B12 | STBC | 1 | In an HE MU PPDU where each RU includes no more than 1 user, set to 1 to indicate all RUs are STBC encoded in the payload, set to 0 to indicate all RUs are not STBC encoded in the payload. STBC does not apply to HE-SIG-B. STBC is not applied if one or more RUs are used for MU-MIMO allocation. |
| | B13-B14 | Pre-FEC Padding Factor | 2 | Indicates the pre-FEC padding factor. Set to 0 to indicate a pre-FEC padding factor of 4 Set to 1 to indicate a pre-FEC padding factor of 1 Set to 2 to indicate a pre-FEC padding factor of 2 Set to 3 to indicate a pre-FEC padding factor of 3 |
| | B15 | PE Disambiguity | 1 | Indicates PE disambiguity as defined in 28.3.12 (Packet extension). |

TABLE 2-continued

| Two Parts of HE-SIG-A | Bit | Field | Number of bits | Description |
|---|---|---|---|---|
| | B16-B19 | CRC | 4 | CRC for bits 0-41 of the HE-SIG-A field (see 28.3.10.7.3 (CRC computation)). Bits 0-41 of the HE-SIG-A field correspond to bits 0-25 of HE-SIG-A1 followed by bits 0-15 of HE-SIG-A2). |
| | B20-B25 | Tail | 6 | Used to terminate the trellis of the convolutional decoder. Set to 0. |

In addition, the HE-SIG-A field of the HE TB PPDU may be defined as follows.

TABLE 3

| Two Parts of HE-SIG-A | Bit | Field | Number of bits | Description |
|---|---|---|---|---|
| HE-SIG-A1 | B0 | Format | 1 | Differentiate an HE SU PPDU and HE ER SU PPDU from an HE TB PPDU: Set to 0 for an HE TB PPDU |
| | B1-B6 | BSS Color | 6 | The BSS Color field is an identifier of the BSS. Set to the value of the TXVECTOR parameter BSS_COLOR. |
| | B7-B10 | Spatial Reuse 1 | 4 | Indicates whether or not spatial reuse is allowed in a subband of the PPDU during the transmission of this PPDU, and if allowed, indicates a value that is used to determine a limit on the transmit power of a spatial reuse transmission. If the Bandwidth field indicates 20 MHz, 40 MHz, or 80 MHz then this Spatial Reuse field applies to the first 20 MHz subband. If the Bandwidth field indicates 160/80 + 80 MHz then this Spatial Reuse field applies to the first 40 MHz subband of the 160 MHz operating band. Set to the value of the SPATIAL_REUSE(1) parameter of the TXVECTOR, which contains a value from Table 28-22 (Spatial Reuse field encoding for an HE TB PPDU) for an HE TB PPDU (see 27.11.6 (SPATIAL_REUSE)). Set to SRP_DISALLOW to prohibit SRP-based spatial reuse during this PPDU. Set to SRP_AND_NON_SRG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |
| | B11-B14 | Spatial Reuse 2 | 4 | Indicates whether or not spatial reuse is allowed in a subband of the PPDU during the transmission of this PPDU, and if allowed, indicates a value that is used to determine a limit on the transmit power of a spatial reuse transmission. If the Bandwidth field indicates 20 MHz, 40 MHz, or 80 MHz: This Spatial Reuse field applies to the second 20 MHz subband. If the STA operating channel width is 20 MHz, then this field is set to the same value as Spatial Reuse 1 field. If the STA operating channel width is 40 MHz in the 2.4 GHz band, this field is set to the same value as Spatial Reuse 1 field. If the Bandwidth field indicates 160/80 + 80 MHz the this Spatial Reuse field applies to the second 40 MHz subband of the 160 MHz operating band. Set to the value of the SPATIAL_REUSE(2) parameter of the TXVECTOR, which contains a value from Table 28-22 (Spatial Reuse field encoding for an HE TB PPDU) for an HE TB PPDU (see 27.11.6 (SPATIAL_REUSE)). Set to SRP_DISALLOW to prohibit SRP-based spatial reuse during this PPDU. Set to SRP_AND_NON_SRG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |

TABLE 3-continued

| Two Parts of HE-SIG-A | Bit | Field | Number of bits | Description |
|---|---|---|---|---|
| | B15-B18 | Spatial Reuse 3 | 4 | Indicates whether or not spatial reuse is allowed in a subband of the PPDU during the transmission of this PPDU, and if allowed, indicates a value that is used to determine a limit on the transmit power of a spatial reuse transmission.<br>If the Bandwidth field indicates 20 MHz, 40 MHz or 80 MHz:<br>This Spatial Reuse field applies to the third 20 MHz subband.<br>If the STA operating channel width is 20 MHz or 40 MHz, this field is set to the same value as Spatial Reuse 1 field.<br>If the Bandwidth field indicates 160/80 + 80 MHz:<br>This Spatial Reuse field applies to the third 40 MHz subband of the 160 MHz operating band.<br>If the STA operating channel width is 80 + 80 MHz, this field is set to the same value as Spatial Reuse 1 field.<br>Set to the value of the SPATIAL_REUSE(3) parameter of the TXVECTOR, which contains a value from Table 28-22 (Spatial Reuse field encoding for an HE TB PPDU) for an HE TB PPDU (see 27.11.6 (SPATIAL_REUSE)).<br>Set to SRP_DISALLOW to prohibit SRP-based spatial reuse during this PPDU. Set to SRP_AND_NON_SRG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |
| | B19-B22 | Spatial Reuse 4 | 4 | Indicates whether or not spatial reuse is allowed in a subband of the PPDU during the transmission of this PPDU, and if allowed, indicates a value that is used to determine a limit on the transmit power of a spatial reuse transmission.<br>If the Bandwidth field indicates 20 MHz, 40 MHz or 80 MHz:<br>This Spatial Reuse field applies to the fourth 20 MHz subband.<br>If the STA operating channel width is 20 MHz, then this field is set to the same value as Spatial Reuse 1 field.<br>If the STA operating channel width is 40 MHz, then this field is set to the same value as Spatial Reuse 2 field.<br>If the Bandwidth field indicates 160/80 + 80 MHz:<br>This Spatial Reuse field applies to the fourth 40 MHz subband of the 160 MHz operating band.<br>If the STA operating channel width is 80 + 80 MHz, then this field is set to same value as Spatial Reuse 2 field.<br>Set to the value of the SPATIAL_REUSE(4) parameter of the TXVECTOR, which contains a value from Table 28-22 (Spatial Reuse field encoding for an HE TB PPDU) for an HE TB PPDU (see 27.11.6 (SPATIAL_REUSE)).<br>Set to SRP_DISALLOW to prohibit SRP-based spatial reuse during this PPDU. Set to SRP_AND_NON_SRG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |
| | B23 | Reserved | 1 | Reserved and set to 1.<br>NOTE-Unlike other Reserved fields in HE-SIG-A of the HE TB PPDU, B23 does not have a corresponding bit in the Trigger frame. |
| | B24-B25 | Bandwidth | 2 | Set to 0 for 20 MHz<br>Set to 1 for 40 MHz<br>Set to 2 for 80 MHz<br>Set to 3 for 160 MHz and 80 + 80 MHz |
| HE-SIG-A2 | B0-B6 | TXOP | 7 | Set to 127 to indicate no duration information if TXVECTOR parameter TXOP_DURATION is set to UNSPECIFIED.<br>Set to a value less than 127 to indicate duration information for NAV setting and protection of the TXOP as follows: |

TABLE 3-continued

| Two Parts of HE-SIG-A | Bit | Field | Number of bits | Description |
|---|---|---|---|---|
| | | | | If TXVECTOR parameter TXOP_DURATION is less than 512, then B0 is set to 0 and B1-B6 is set to floor(TXOP_DURATION/8). Otherwise, B0 is set to 1 and B1-B6 is set to floor ((TXOP_DURATION − 512)/128). where B0 indicates the TXOP length granularity. Set to 0 for 8 µs; otherwise set to 1 for 128 µs. B1-B6 indicates the scaled value of the TXOP_DURATION |
| | B7-B15 | Reserved | 9 | Reserved and set to value indicated in the UL HE-SIG-A2 Reserved subfield in the Trigger frame. |
| | B16-B19 | CRC | 4 | CRC of bits 0-41 of the HE-SIG-A field. See 28.3.10.7.3 (CRC computation). Bits 0-41 of the HE-SIG-A field correspond to bits 0-25 of HE-SIG-A1 followed by bits 0-15 of HE-SIG-A2). |
| | B20-B25 | Tail | 6 | Used to terminate the trellis of the convolutional decoder. Set to 0. |

An HE-SIG-B (740) may be included only in the case of the PPDU for the multiple users (MUs) as described above. Principally, an HE-SIG-A (750) or an HE-SIG-1B (760) may include resource allocation information (alternatively, virtual resource allocation information) for at least one receiving STA.

Figure 8:
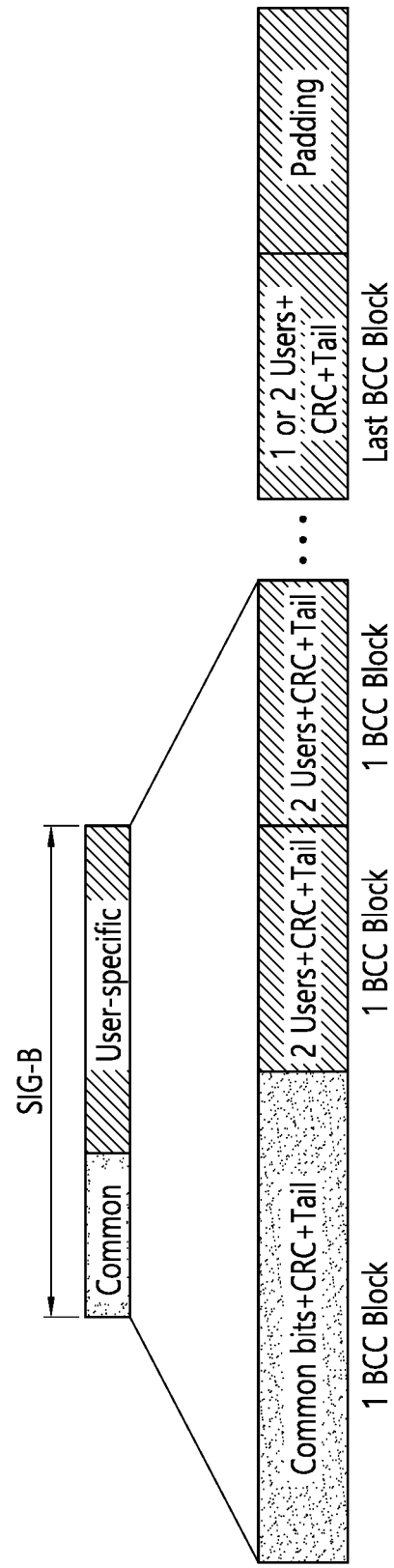
FIG. 8 is a block diagram illustrating one example of HE-SIG-B according to an embodiment.

FIG. 8 is a block diagram illustrating one example of HE-SIG-1B according to an embodiment.

As illustrated in FIG. 8, the HE-SIG-1B field includes a common field at a frontmost part and the corresponding common field is separated from a field which follows therebehind to be encoded. That is, as illustrated in FIG. 8, the HE-SIG-1B field may include a common field including the common control information and a user-specific field including user-specific control information. In this case, the common field may include a CRC field corresponding to the common field, and the like and may be coded to be one BCC block. The user-specific field subsequent thereafter may be coded to be one BCC block including the "user-specific field" for 2 users and a CRC field corresponding thereto as illustrated in FIG. 8.

A previous field of the HE-SIG-B (740) may be transmitted in a duplicated form on a MU PPDU. In the case of the HE-SIG-B (740), the HE-SIG-B (740) transmitted in some frequency band (e.g., a fourth frequency band) may even include control information for a data field corresponding to a corresponding frequency band (that is, the fourth frequency band) and a data field of another frequency band (e.g., a second frequency band) other than the corresponding frequency band. Further, a format may be provided, in which the HE-SIG-B (740) in a specific frequency band (e.g., the second frequency band) is duplicated with the HE-SIG-B (740) of another frequency band (e.g., the fourth frequency band). Alternatively, the HE-SIG B (740) may be transmitted in an encoded form on all transmission resources. A field after the HE-SIG B (740) may include individual information for respective receiving STAs receiving the PPDU.

The HE-STF (750) may be used for improving automatic gain control estimation in a multiple input multiple output (MIMO) environment or an OFDMA environment.

The HE-LTF (760) may be used for estimating a channel in the MIMO environment or the OFDMA environment.

The size of fast Fourier transform (FFT)/inverse fast Fourier transform (IFFT) applied to the HE-STF (750) and the field after the HE-STF (750), and the size of the FFT/IFFT applied to the field before the HE-STF (750) may be different from each other. For example, the size of the FFT/IFFT applied to the HE-STF (750) and the field after the HE-STF (750) may be four times larger than the size of the FFT/IFFT applied to the field before the HE-STF (750).

For example, when at least one field of the L-STF (700), the L-LTF (710), the L-SIG (720), the HE-SIG-A (730), and the HE-SIG-B (740) on the PPDU of FIG. 7 is referred to as a first field, at least one of the data field (770), the HE-STF (750), and the HE-LTF (760) may be referred to as a second field. The first field may include a field associated with a legacy system and the second field may include a field associated with an HE system. In this case, the fast Fourier transform (FFT) size and the inverse fast Fourier transform (IFFT) size may be defined as a size which is N (N is a natural number, e.g., N=1, 2, and 4) times larger than the FFT/IFFT size used in the legacy wireless LAN system. That is, the FFT/IFFT having the size may be applied, which is N(=4) times larger than the first field of the HE PPDU. For example, 256 FFT/IFFT may be applied to a bandwidth of 20 MHz, 512 FFT/IFFT may be applied to a bandwidth of 40 MHz, 1024 FFT/IFFT may be applied to a bandwidth of 80 MHz, and 2048 FFT/IFFT may be applied to a bandwidth of continuous 160 MHz or discontinuous 160 MHz.

In other words, a subcarrier space/subcarrier spacing may have a size which is 1/N times (N is the natural number, e.g., N=4, the subcarrier spacing is set to 78.125 kHz) the subcarrier space used in the legacy wireless LAN system. That is, subcarrier spacing having a size of 312.5 kHz, which is legacy subcarrier spacing may be applied to the first field of the HE PPDU and a subcarrier space having a size of 78.125 kHz may be applied to the second field of the HE PPDU.

Alternatively, an IDFT/DFT period applied to each symbol of the first field may be expressed to be N(=4) times shorter than the IDFT/DFT period applied to each data symbol of the second field. That is, the IDFT/DFT length applied to each symbol of the first field of the HE PPDU may be expressed as 3.2 µs and the IDFT/DFT length applied to each symbol of the second field of the HE PPDU may be expressed as 3.2 µs*4 (=12.8 µs). The length of the OFDM symbol may be a value acquired by adding the length of a guard interval (GI) to the IDFT/DFT length. The length of the GI may have various values such as 0.4 µs, 0.8 µs, 1.6 µs, 2.4 µs, and 3.2 µs.

For simplicity in the description, in FIG. 7, it is expressed that a frequency band used by the first field and a frequency band used by the second field accurately coincide with each other, but both frequency bands may not completely coincide with each other, in actual. For example, a primary band of the first field (L-STF, L-LTF, L-SIG, HE-SIG-A, and HE-SIG-B) corresponding to the first frequency band may be the same as the most portions of a frequency band of the second field (HE-STF, HE-LTF, and Data), but boundary surfaces of the respective frequency bands may not coincide with each other. As illustrated in FIGS. 4 to 6, since multiple null subcarriers, DC tones, guard tones, and the like are inserted during arranging the RUs, it may be difficult to accurately adjust the boundary surfaces.

The user (e.g., a receiving station) may receive the HE-SIG-A (730) and may be instructed to receive the downlink PPDU based on the HE-SIG-A (730). In this case, the STA may perform decoding based on the FFT size changed from the HE-STF (750) and the field after the HE-STF (750). On the contrary, when the STA may not be instructed to receive the downlink PPDU based on the HE-SIG-A (730), the STA may stop the decoding and configure a network allocation vector (NAV). A cyclic prefix (CP) of the HE-STF (750) may have a larger size than the CP of another field and the during the CP period, the STA may perform the decoding for the downlink PPDU by changing the FFT size.

Hereinafter, in the embodiment of the present disclosure, data (alternatively, or a frame) which the AP transmits to the STA may be expressed as a terms called downlink data (alternatively, a downlink frame) and data (alternatively, a frame) which the STA transmits to the AP may be expressed as a term called uplink data (alternatively, an uplink frame). Further, transmission from the AP to the STA may be expressed as downlink transmission and transmission from the STA to the AP may be expressed as a term called uplink transmission.

In addition, a PHY protocol data unit (PPDU), a frame, and data transmitted through the downlink transmission may be expressed as terms such as a downlink PPDU, a downlink frame, and downlink data, respectively. The PPDU may be a data unit including a PPDU header and a physical layer service data unit (PSDU) (alternatively, a MAC protocol data unit (MPDU)). The PPDU header may include a PHY header and a PHY preamble and the PSDU (alternatively, MPDU) may include the frame or indicate the frame (alternatively, an information unit of the MAC layer) or be a data unit indicating the frame. The PHY header may be expressed as a physical layer convergence protocol (PLCP) header as another term and the PHY preamble may be expressed as a PLCP preamble as another term.

Further, a PPDU, a frame, and data transmitted through the uplink transmission may be expressed as terms such as an uplink PPDU, an uplink frame, and uplink data, respectively.

In the wireless LAN system to which the embodiment of the present description is applied, the total bandwidth may be used for downlink transmission to one STA and uplink transmission to one STA. Further, in the wireless LAN system to which the embodiment of the present description is applied, the AP may perform downlink (DL) multi-user (MU) transmission based on multiple input multiple output (MU MIMO) and the transmission may be expressed as a term called DL MU MIMO transmission.

In addition, in the wireless LAN system according to the embodiment, an orthogonal frequency division multiple access (OFDMA) based transmission method is preferably supported for the uplink transmission and/or downlink transmission. That is, data units (e.g., RUs) corresponding to different frequency resources are allocated to the user to perform uplink/downlink communication. In detail, in the wireless LAN system according to the embodiment, the AP may perform the DL MU transmission based on the OFDMA and the transmission may be expressed as a term called DL MU OFDMA transmission. When the DL MU OFDMA transmission is performed, the AP may transmit the downlink data (alternatively, the downlink frame and the downlink PPDU) to the plurality of respective STAs through the plurality of respective frequency resources on an overlapped time resource. The plurality of frequency resources may be a plurality of subbands (alternatively, subchannels) or a plurality of resource units (RUs). The DL MU OFDMA transmission may be used together with the DL MU MIMO transmission. For example, the DL MU MIMO transmission based on a plurality of space-time streams (alternatively, spatial streams) may be performed on a specific subband (alternatively, subchannel) allocated for the DL MU OFDMA transmission.

Further, in the wireless LAN system according to the embodiment, uplink multi-user (UL MU) transmission in which the plurality of STAs transmits data to the AP on the same time resource may be supported. Uplink transmission on the overlapped time resource by the plurality of respective STAs may be performed on a frequency domain or a spatial domain.

When the uplink transmission by the plurality of respective STAs is performed on the frequency domain, different frequency resources may be allocated to the plurality of respective STAs as uplink transmission resources based on the OFDMA. The different frequency resources may be different subbands (alternatively, subchannels) or different resources units (RUs). The plurality of respective STAs may transmit uplink data to the AP through different frequency resources. The transmission method through the different frequency resources may be expressed as a term called a UL MU OFDMA transmission method.

When the uplink transmission by the plurality of respective STAs is performed on the spatial domain, different time-space streams (alternatively, spatial streams) may be allocated to the plurality of respective STAs and the plurality of respective STAs may transmit the uplink data to the AP through the different time-space streams. The transmission method through the different spatial streams may be expressed as a term called a UL MU MIMO transmission method.

The UL MU OFDMA transmission and the UL MU MIMO transmission may be used together with each other. For example, the UL MU MIMO transmission based on the plurality of space-time streams (alternatively, spatial streams) may be performed on a specific subband (alternatively, subchannel) allocated for the UL MU OFDMA transmission.

In the legacy wireless LAN system which does not support the MU OFDMA transmission, a multi-channel allocation method is used for allocating a wider bandwidth (e.g., a 20 MHz excess bandwidth) to one terminal. When a channel unit is 20 MHz, multiple channels may include a plurality of 20 MHz-channels. In the multi-channel allocation method, a primary channel rule is used to allocate the wider bandwidth to the terminal. When the primary channel rule is used, there is a limit for allocating the wider bandwidth to the terminal. In detail, according to the primary channel rule, when a secondary channel adjacent to a primary channel is used in an overlapped BSS (OBSS) and is thus busy, the STA may use remaining channels other than the primary channel. Therefore, since the STA may transmit the frame only to the primary channel, the STA receives a limit for transmission of the frame through the multiple channels. That is, in the legacy wireless LAN system, the primary channel rule used for allocating the multiple channels may be a large limit in obtaining a high throughput by operating the wider bandwidth in a current wireless LAN environment in which the OBSS is not small.

In order to solve the problem, in the embodiment, a wireless LAN system is disclosed, which supports the OFDMA technology. That is, the OFDMA technique may be applied to at least one of downlink and uplink. Further, the MU-MIMO technique may be additionally applied to at least one of downlink and uplink. When the OFDMA technique is used, the multiple channels may be simultaneously used by not one terminal but multiple terminals without the limit by the primary channel rule. Therefore, the wider bandwidth may be operated to improve efficiency of operating a wireless resource.

As described above, in case the uplink transmission performed by each of the multiple STAs (e.g., non-AP STAs) is performed within the frequency domain, the AP may allocate different frequency resources respective to each of the multiple STAs as uplink transmission resources based on OFDMA. Additionally, as described above, the frequency resources each being different from one another may correspond to different subbands (or sub-channels) or different resource units (RUs).

The different frequency resources respective to each of the multiple STAs are indicated through a trigger frame.

Figure 9:
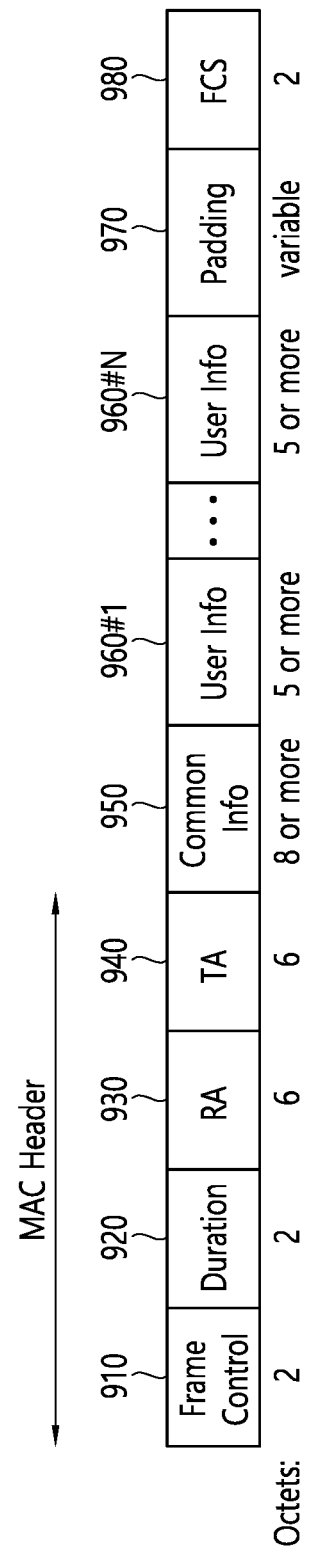
FIG. 9 illustrates an example of a trigger frame.

FIG. 9 illustrates an example of a trigger frame. The trigger frame of FIG. 9 allocates resources for Uplink Multiple-User (MU) transmission and may be transmitted from the AP. The trigger frame may be configured as a MAC frame and may be included in the PPDU. For example, the trigger frame may be transmitted through the PPDU shown in FIG. 3, through the legacy PPDU shown in FIG. 2, or through a certain PPDU, which is newly designed for the corresponding trigger frame. In case the trigger frame is transmitted through the PPDU of FIG. 3, the trigger frame may be included in the data field shown in the drawing.

Each of the fields shown in FIG. 9 may be partially omitted, or other fields may be added. Moreover, the length of each field may be varied differently as shown in the drawing.

A Frame Control field (910) shown in FIG. 9 may include information related to a version of the MAC protocol and other additional control information, and a Duration field (920) may include time information for configuring a NAV or information related to an identifier (e.g., AID) of the user equipment.

Also, the RA field (930) includes address information of a receiving STA of the corresponding trigger frame and may be omitted if necessary. The TA field (940) includes address information of an STA triggering the corresponding trigger frame (for example, an AP), and the common information field (950) includes common control information applied to a receiving STA that receives the corresponding trigger frame. For example, a field indicating the length of the L-SIG field of the UL PPDU transmitted in response to the corresponding trigger frame or information controlling the content of the SIG-A field (namely, the HE-SIG-A field) of the UL PPDU transmitted in response to the corresponding trigger frame may be included. Also, as common control information, information on the length of the CP of the UP PPDU transmitted in response to the corresponding trigger frame or information on the length of the LTF field may be included.

Also, it is preferable to include a per user information field (960#1 to 960#N) corresponding to the number of receiving STAs that receive the trigger frame of FIG. 9. The per user information field may be referred to as an "RU allocation field".

Also, the trigger frame of FIG. 9 may include a padding field (970) and a frame check sequence field (980).

It is preferable that each of the per user information fields (960#1 to 960#N) shown in FIG. 9 includes a plurality of subfields.

Figure 10:
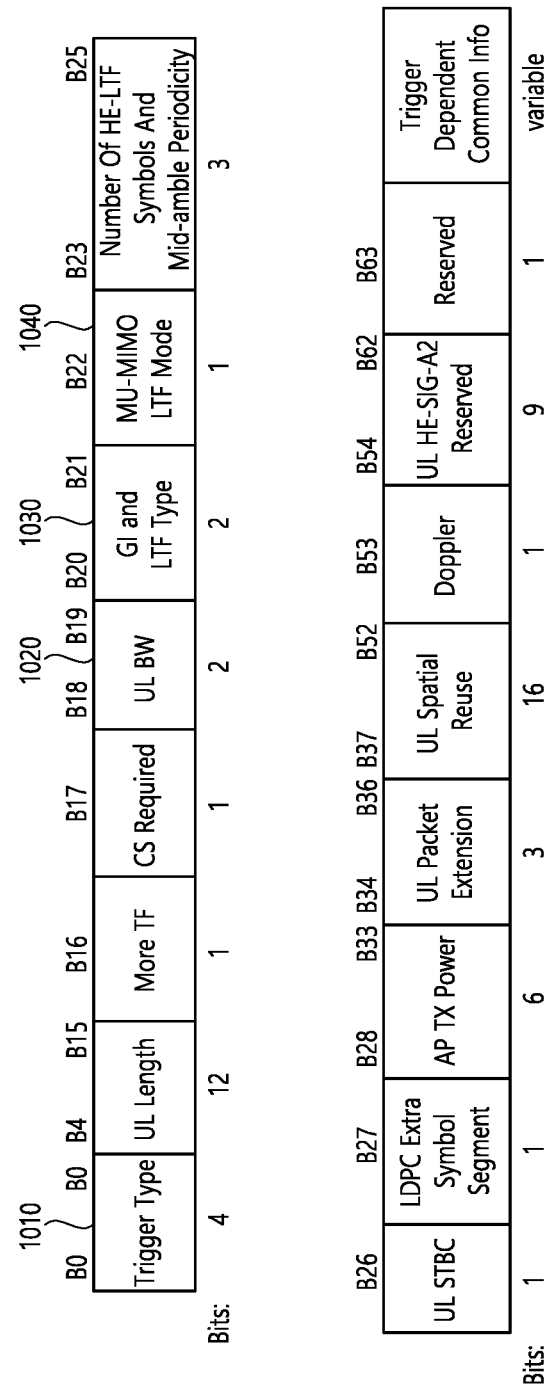
FIG. 10 illustrates an example of a common information field.

FIG. 10 illustrates an example of a common information field. Among the subfields of FIG. 10, some may be omitted, and other additional subfields may also be added. Additionally, the length of each of the subfields shown in the drawing may be varied.

The trigger type field (1010) of FIG. 10 may indicate a trigger frame variant and encoding of the trigger frame variant. The trigger type field (1010) may be defined as follows.

TABLE 4

| Trigger Type subfield value | Trigger frame variant |
|---|---|
| 0 | Basic |
| 1 | Beamforming Report Poll (BFRP) |
| 2 | MU-BAR |
| 3 | MU-RTS |
| 4 | Buffer Status Report Poll (BSRP) |
| 5 | GCR MU-BAR |
| 6 | Bandwidth Query Report Poll (BQRP) |
| 7 | NDP Feedback Report Poll (NFRP) |
| 8-15 | Reserved |

The UL BW field (1020) of FIG. 10 indicates bandwidth in the HE-SIG-A field of an HE Trigger Based (TB) PPDU. The UL BW field (1020) may be defined as follows.

TABLE 5

| UL BW subfield value | Description |
|---|---|
| 0 | 20 MHz |
| 1 | 40 MHz |
| 2 | 80 MHz |
| 3 | 80 + 80 MHz or 160 MHz |

The Guard Interval (GI) and LTF type fields (1030) of FIG. 10 indicate the GI and HE-LTF type of the HE TB PPDU response. The GI and LTF type field (1030) may be defined as follows.

TABLE 6

| GI And LTF field value | Description |
|---|---|
| 0 | 1x HE-LTF + 1.6 μs GI |
| 1 | 2x HE-LTF + 1.6 μs GI |
| 2 | 4x HE-LTF + 3.2 μs GI |
| 3 | Reserved |

Also, when the GI and LTF type fields (1030) have a value of 2 or 3, the MU-MIMO LTF mode field (1040) of FIG. 10 indicates the LTF mode of a UL MU-MIMO HE TB PPDU response. At this time, the MU-MIMO LTF mode field (1040) may be defined as follows.

If the trigger frame allocates an RU that occupies the whole HE TB PPDU bandwidth and the RU is allocated to one or more STAs, the MU-MIMO LTF mode field (1040) indicates one of an HE single stream pilot HE-LTF mode or an HE masked HE-LTF sequence mode.

If the trigger frame does not allocate an RU that occupies the whole HE TB PPDU bandwidth and the RU is not allocated to one or more STAs, the MU-MIMO LTF mode field (1040) indicates the HE single stream pilot HE-LTF mode. The MU-MIMO LTF mode field (1040) may be defined as follows.

TABLE 7

| MU-MIMO LTF subfield value | Description |
| --- | --- |
| 0 | HE single stream pilot HE-LTF mode |
| 1 | HE masked HE-LTF sequence mode |

Figure 11:
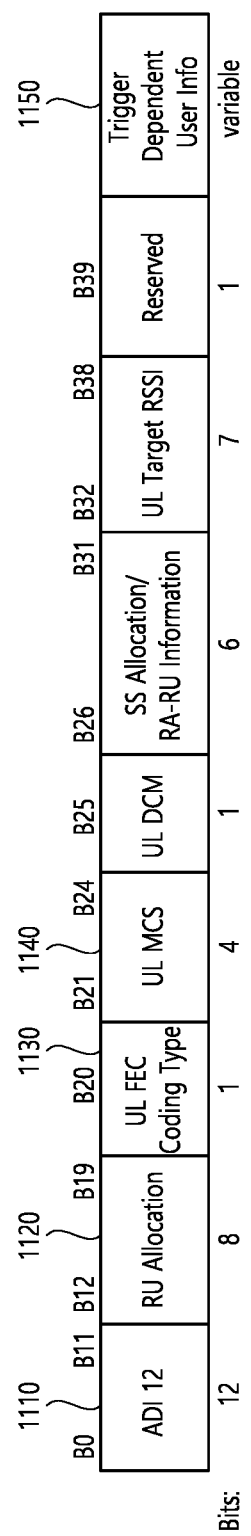
FIG. 11 illustrates an example of a sub-field being included in a per user information field.

FIG. 11 illustrates an example of a subfield being included in a per user information field. Among the subfields of FIG. 11, some may be omitted, and other additional subfields may also be added. Additionally, the length of each of the subfields shown in the drawing may be varied.

The User Identifier field of FIG. 11 (or AID12 field, 1110) indicates the identifier of an STA (namely, a receiving STA) corresponding to per user information, where an example of the identifier may be the whole or part of the AID.

Also, an RU Allocation field (1120) may be included. In other words, when a receiving STA identified by the User Identifier field (1110) transmits a UL PPDU in response to the trigger frame of FIG. 9, the corresponding UL PPDU is transmitted through an RU indicated by the RU Allocation field (1120). In this case, it is preferable that the RU indicated by the RU Allocation field (1120) indicates the RUs shown in FIGS. 4, 5, and 6. A specific structure of the RU Allocation field (1120) will be described later.

The subfield of FIG. 11 may include a (UL FEC) coding type field (1130). The coding type field (1130) may indicate the coding type of an uplink PPDU transmitted in response to the trigger frame of FIG. 9. For example, when BCC coding is applied to the uplink PPDU, the coding type field (1130) may be set to '1', and when LDPC coding is applied, the coding type field (1130) may be set to '0'.

Additionally, the subfield of FIG. 11 may include a UL MCS field (1140). The MCS field (1140) may indicate an MCS scheme being applied to the uplink PPDU that is transmitted in response to the trigger frame of FIG. 9.

Also, the subfield of FIG. 11 may include a Trigger Dependent User Info field (1150). When the Trigger Type field (1010) of FIG. 10 indicates a basic trigger variant, the Trigger Dependent User Info field (1150) may include an MPDU MU Spacing Factor subfield (2 bits), a TID Aggregate Limit subfield (3 bits), a Reserved field (1 bit), and a Preferred AC subfield (2 bits).

Hereinafter, the present disclosure proposes an example of improving a control field included in a PPDU. The control field improved according to the present disclosure includes a first control field including control information required to interpret the PPDU and a second control field including control information for demodulate the data field of the PPDU. The first and second control fields may be used for various fields. For example, the first control field may be the HE-SIG-A (730) of FIG. 7, and the second control field may be the HE-SIG-B (740) shown in FIGS. 7 and 8.

Hereinafter, a specific example of improving the first or the second control field will be described.

In the following example, a control identifier inserted to the first control field or a second control field is proposed. The size of the control identifier may vary, which, for example, may be implemented with 1-bit information.

The control identifier (for example, a 1-bit identifier) may indicate whether a 242-type RU is allocated when, for example, 20 MHz transmission is performed. As shown in FIGS. 4 to 6, RUs of various sizes may be used. These RUs may be divided broadly into two types. For example, all of the RUs shown in FIGS. 4 to 6 may be classified into 26-type RUs and 242-type RUs. For example, a 26-type RU may include a 26-RU, a 52-RU, and a 106-RU while a 242-type RU may include a 242-RU, a 484-RU, and a larger RU.

The control identifier (for example, a 1-bit identifier) may indicate that a 242-type RU has been used. In other words, the control identifier may indicate that a 242-RU, a 484-RU, or a 996-RU is included. If the transmission frequency band in which a PPDU is transmitted has a bandwidth of 20 MHz, a 242-RU is a single RU corresponding to the full bandwidth of the transmission frequency band (namely, 20 MHz). Accordingly, the control identifier (for example, 1-bit identifier) may indicate whether a single RU corresponding to the full bandwidth of the transmission frequency band is allocated.

For example, if the transmission frequency band has a bandwidth of 40 MHz, the control identifier (for example, a 1-bit identifier) may indicate whether a single RU corresponding to the full bandwidth (namely, bandwidth of 40 MHz) of the transmission frequency band has been allocated. In other words, the control identifier may indicate whether a 484-RU has been allocated for transmission in the frequency band with a bandwidth of 40 MHz.

For example, if the transmission frequency band has a bandwidth of 80 MHz, the control identifier (for example, a 1-bit identifier) may indicate whether a single RU corresponding to the full bandwidth (namely, bandwidth of 80 MHz) of the transmission frequency band has been allocated. In other words, the control identifier may indicate whether a 996-RU has been allocated for transmission in the frequency band with a bandwidth of 80 MHz.

Various technical effects may be achieved through the control identifier (for example, 1-bit identifier).

First of all, when a single RU corresponding to the full bandwidth of the transmission frequency band is allocated through the control identifier (for example, a 1-bit identifier), allocation information of the RU may be omitted. In other words, since only one RU rather than a plurality of RUs is allocated over the whole transmission frequency band, allocation information of the RU may be omitted deliberately.

Also, the control identifier may be used as signaling for full bandwidth MU-MIMO. For example, when a single RU is allocated over the full bandwidth of the transmission frequency band, multiple users may be allocated to the corresponding single RU. In other words, even though signals for each user are not distinctive in the temporal and spatial domains, other techniques (for example, spatial multiplexing) may be used to multiplex the signals for multiple users in the same, single RU. Accordingly, the control identifier (for example, a 1-bit identifier) may also be used to indicate whether to use the full bandwidth MU-MIMO described above.

The common field included in the second control field (HE-SIG-B, 740) may include an RU allocation subfield. According to the PPDU bandwidth, the common field may include a plurality of RU allocation subfields (including N RU allocation subfields). The format of the common field may be defined as follows.

TABLE 8

| Subfield | Number of bits | Description |
|---|---|---|
| RU Allocation | N × 8 | Indicates the RU assignment to be used in the data portion in the frequency domain. It also indicates the number of users in each RU. For RUs of size greater than or equal to 106-tones that support MU-MIMO, it indicates the number of users multiplexed using MU-MIMO. Consists of N RU Allocation subfields: N = 1 for a 20 MHz and a 40 MHz HE MU PPDU N = 2 for an 80 MHz HE MU PPDU N = 4 for a 160 MHz or 80 + 80 MHz HE MU PPDU |
| Center 26-tone RU | 1 | This field is present only if the value of the Bandwidth field of HE-SIG-A field in an HE MU PPDU is set to greater than 1. If the Bandwidth field of the HE-SIG-A field in an HE MU PPDU is set to 2, 4 or 5 for 80 MHz: Set to 1 to indicate that a user is allocated to the center 26-tone RU (see FIG. 28-7 (RU locations in an 80 MHz HE PPDU(#16528))); otherwise, set to 0. The same value is applied to both HE-SIG-B content channels. If the Bandwidth field of the HE-SIG-A field in an HE MU PPDU is set to 3, 6 or 7 for 160 MHz or 80 + 80 MHz: For HE-SIG-B content channel 1, set to 1 to indicate that a user is allocated to the center 26-tone RU of the lower frequency 80 MHz; otherwise, set to 0. For HE-SIG-B content channel 2, set to 1 to indicate that a user is allocated to the center 26-tone RU of the higher frequency 80 MHz; otherwise, set to 0. |
| CRC | 4 | See 28.3.10.7.3 (CRC computation) |
| Tail | 6 | Used to terminate the trellis of the convolutional decoder. Set to 0 |

The RU allocation subfield included in the common field of the HE-SIG-B may be configured with 8 bits and may indicate as follows with respect to 20 MHz PPDU bandwidth. RUs to be used as a data portion in the frequency domain are allocated using an index for RU size and disposition in the frequency domain. The mapping between an 8-bit RU allocation subfield for RU allocation and the number of users per RU may be defined as follows.

TABLE 9

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 | | 1 |
| 00000010 | 26 | 26 | 26 | 26 | 26 | 52 | | 26 | 26 | 1 |
| 00000011 | 26 | 26 | 26 | 26 | 26 | 52 | | 52 | | 1 |
| 00000100 | 26 | 26 | 52 | | 26 | 26 | 26 | 26 | 26 | 1 |
| 00000101 | 26 | 26 | 52 | | 26 | 26 | 26 | 52 | | 1 |
| 00000110 | 26 | 26 | 52 | | 26 | 52 | | 26 | 26 | 1 |
| 00000111 | 26 | 26 | 52 | | 26 | 52 | | 52 | | 1 |
| 00001000 | 52 | | 26 | 26 | 26 | 26 | 26 | 26 | 26 | 1 |
| 00001001 | 52 | | 26 | 26 | 26 | 26 | 26 | 52 | | 1 |
| 00001010 | 52 | | 26 | 26 | 26 | 52 | | 26 | 26 | 1 |
| 00001011 | 52 | | 26 | 26 | 26 | 52 | | 52 | | 1 |
| 00001100 | 52 | | 52 | | 26 | 26 | 26 | 26 | 26 | 1 |
| 00001101 | 52 | | 52 | | 26 | 26 | 26 | 52 | | 1 |
| 00001110 | 52 | | 52 | | 26 | 52 | | 26 | 26 | 1 |
| 00001111 | 52 | | 52 | | 26 | 52 | | 52 | | 1 |
| 00010$y_2y_1y_0$ | 52 | | 52 | | — | | 106 | | | 8 |
| 00011$y_2y_1y_0$ | | 106 | | | — | | 52 | | 52 | 8 |
| 00100$y_2y_1y_0$ | 26 | 26 | 26 | 26 | 26 | | 106 | | | 8 |
| 00101$y_2y_1y_0$ | 26 | 26 | 52 | | 26 | | 106 | | | 8 |
| 00110$y_2y_1y_0$ | 52 | | 26 | 26 | 26 | | 106 | | | 8 |
| 00111$y_2y_1y_0$ | 52 | | 52 | | 26 | | 106 | | | 8 |
| 01000$y_2y_1y_0$ | | 106 | | | 26 | 26 | 26 | 26 | 26 | 8 |
| 01001$y_2y_1y_0$ | | 106 | | | 26 | 26 | 26 | 52 | | 8 |
| 01010$y_2y_1y_0$ | | 106 | | | 26 | 52 | | 26 | 26 | 8 |
| 01011$y_2y_1y_0$ | | 106 | | | 26 | 52 | | 52 | | 8 |
| 0110$y_1y_0z_1z_0$ | | 106 | | | — | | 106 | | | 16 |
| 01110000 | 52 | | 52 | | — | | 52 | | 52 | 1 |
| 01110001 | | | | 242-tone RU empty | | | | | | 1 |
| 01110010 | | | | 484-tone RU with zero User fields indicated in this RU Allocation subfield of the HE-SIG-B content channel | | | | | | 1 |
| 01110011 | | | | 996-tone RU with zero User fields indicated in this RU Allocation subfield of the HE-SIG-B content channel | | | | | | 1 |

TABLE 9-continued

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| $011101x_1x_0$ |  |  | Reserved |  |  |  |  |  |  | 4 |
| $01111y_2y_1y_0$ |  |  | Reserved |  |  |  |  |  |  | 8 |
| $10y_2y_1y_0z_2z_1z_0$ |  | 106 |  |  | 26 |  | 106 |  |  | 64 |
| $11000y_2y_1y_0$ |  |  | 242 |  |  |  |  |  |  | 8 |
| $11001y_2y_1y_0$ |  |  | 484 |  |  |  |  |  |  | 8 |
| $11010y_2y_1y_0$ |  |  | 996 |  |  |  |  |  |  | 8 |
| $11011y_2y_1y_0$ |  |  | Reserved |  |  |  |  |  |  | 8 |
| $111x_4x_3x_2x_1x_0$ |  |  | Reserved |  |  |  |  |  |  | 32 |

If signaling RUs of size greater than 242 subcarriers, $y_2y_1y_0$ = 000-111 indicates number of User fields in the HE-SIG-B content channel that contains the corresponding 8-bit RU Allocation subfield. Otherwise, $y_2y_1y_0$ = 000-111 indicates number of STAs multiplexed in the 106-tone RU, 242-tone RU or the lower frequency 106-tone RU if there are two 106-tone RUs and one 26-tone RU is assigned between two 106-tone RUs. The binary vector $y_2y_1y_0$ indicates $2^2 \cdot y_2 + 2^1 \cdot y_1 - y_0 + 1$ STAs multiplexed the RU.
$z_2z_1z_0$ = 000-111 indicates number of STAs multiplexed in the higher frequency 106-tone RU if there are two 106-tone RUs and one 26-tone RU is assigned between two 106-tone RUs. The binary vector $z_2z_1z_0$ indicates $2^2 \cdot z_2 + 2^1 \cdot z_1 - z_0 + 1$ STAs multiplexed in the RU.
Similarly, $y_1y_0$ = 00-11 indicates number of STAs multiplexed in the lower frequency 106-tone RU. The binary vector $y_1y_0$ indicates $2^1 \cdot y_1 + y_0 - 1$ STAs multiplexed in the RU.
Similarly, $z_1z_0$ = 00-11 indicates the number of STAs multiplexed in the higher frequency 106-tone RU. The binary vector $z_1z_0$ indicates $2^1 \cdot z_1 - z_0 + 1$ STAs multiplexed in the RU.
1 to #9 (from left to the right) is ordered in increasing order of the absolute frequency.
$x_1x_0$ = 00-11. $x_4x_3x_2x_1x_0$ = 00000-11111.
'—' means no STA in that RU.

The user-specific field included in the second control field (HE-SIG-B, 740) may include a user field, a CRC field, and a Tail field. The format of the user-specific field may be defined as follows.

TABLE 10

| Subfield | Number of bits | Description |
|---|---|---|
| User field | N × 21 | The User field format for a non-MU-MIMO allocation is defined in Table 28-26 (User field format for a non-MU-MIMO allocation). The User field format for a MU-MIMO allocation is defined in Table 28-27 (User field for an MU-MIMO allocation). N = 1 if it is the last User Block field, and if there is only one user in the last User Block field. N = 2 otherwise. |
| CRC | 4 | The CRC is calculated over bits 0 to 20 for a User Block field that contains one User field, and bits 0 to 41 for a User Block field that contains two User fields. See 28.3.10.7.3 (CRC computation). |
| Tail | 6 | Used to terminate the trellis of the convolutional decoder. Set to 0. |

Also, the user-specific field of the HE-SIG-B is composed of a plurality of user fields. The plurality of user fields is located after the common field of the HE-SIG-B. The location of the RU allocation subfield of the common field and that of the user field of the user-specific field are used together to identify an RU used for transmitting data of an STA. A plurality of RUs designated as a single STA are now allowed in the user-specific field. Therefore, signaling that allows an STA to decode its own data is transmitted only in one user field.

In one example, it may be assumed that the RU allocation subfield is configured with 8 bits of 01000010 to indicate that five 26-tone RUs are arranged next to one 106-tone RU and three user fields are included in the 106-tone RU. At this time, the 106-tone RU may support multiplexing of the three users. This example may indicate that eight user fields included in the user-specific field are mapped to six RUs, the first three user fields are allocated according to the MU-MIMO scheme in the first 106-tone RU, and the remaining five user fields are allocated to each of the five 26-tone RUs.

Figure 12:
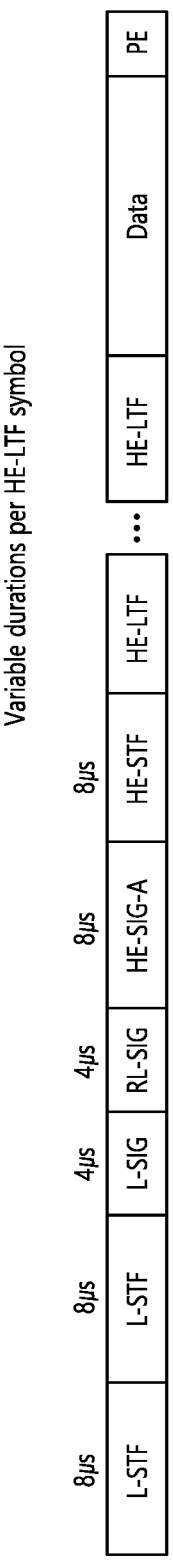
FIG. 12 illustrates an example of an HE TB PPDU.

FIG. 12 illustrates an example of an HE TB PPDU. The PPDU of FIG. 12 illustrates an uplink PPDU transmitted in response to the trigger frame of FIG. 9. At least one STA receiving a trigger frame from an AP may check the common information field and the individual user information field of the trigger frame and may transmit a HE TB PPDU simultaneously with another STA which has received the trigger frame.

As shown in the figure, the PPDU of FIG. 12 includes various fields, each of which corresponds to the field shown in FIGS. 2, 3, and 7. Meanwhile, as shown in the figure, the HE TB PPDU (or uplink PPDU) of FIG. 12 may not include the HE-SIG-B field but only the HE-SIG-A field.

In the existing 11ax, a tone plan for full band and OFDMA transmission at 20/40/80/80+80/160 MHz is designed, and a 160 MHz tone plan is used by simply repeating the existing 80 MHz tone plan twice. This is designed in consideration of a case where transmission is performed by taking two RFs into account, and may be a reasonable tone plan in case of non-contiguous 80+80 MHz. However, a situation where transmission is performed by using one RF may be considered in case of contiguous 160 MHz. In this case, since there are many subcarriers wasted in the existing tone plan, a new tone plan may be proposed to increase efficiency and throughput of a subcarrier in use.

1. New 160 MHz Tone Plan

<Full Band>

In case of transmission using a full band, a new resource unit (RU) may be proposed, and a size of the new RU may be determined by considering various DC tones according to an effect of a DC offset and by considering the existing 11ax 160 MHz guard tone. The existing 11ax guard tone consists of left 12 tones and right 11 tones, and the number of DC tones of 80 MHz is 5 or 7. When this is directly considered, the new RU of the full band is 2020 RU or 2018 RU.

12/11 guard tone, 5DC, 2020 RU
12/11 guard tone, 7DC, 2018 RU

In 160 MHz, considering the effect of the DC offset, it is not preferable that the number of DC tones in use is less than 5/7 which is less than the number of DC tones used in the existing 80 MHz. In addition, 5/7DC may be sufficient in terms of performance. Considering the following OFDMA tone plan, up to 7DC may be suitable. In the following OFDMA tone plan, DC is designed by considering 7DC and 5DC in the existing 80 MHz OFDMA tone plan, and it is not preferable that the number of DC tones is less than that. 5 or 7DC may be sufficient in terms of performance. 7DC is used in 20 MHz and 80 MH which is a case where a center 26 RU (13+13 RU) is used in the existing 11ax.

<OFDMA Tone Plan>

The OFDMA tone plan can be expressed using the existing 996 RU and 26 RU (13+13 RU) as follows. Hereinafter, G denotes a guard tone and N denotes a null tone.

12G+996 RU+13 RU+7DC+13 RU+996 RU+11G
12G+996 RU+1N+13 RU+5DC+13 RU+1N+996 RU+11G

The number of DC tones and the number of null subcarriers at both sides may be determined by a DC offset of the center 26 RU (13+13 RU) and performance based on an effect of interference. Considering the effect of interference, it may be preferably configured of 5DC and 1 null carrier at both sides.

The following two configurations are proposed as a 996 RU configuration.

996 RU=484 RU+1N+26 RU+1N+484 RU
996 RU=1N+484 RU+26 RU+484 RU+1N

In a first configuration, a null tone is present at both sides of the 26 RU so that an effect of interference from/to an adjacent RU can be decreased. In a second configuration, the effect of interference between 484 RU and its adjacent RU can be decreased. An RU which uses a small number of subcarriers, such as 26 RU, may preferably use the first configuration since interference has significant effect on performance.

The 484 RU has two 242 RU configurations as in the existing 11ax.

484 RU=242 RU+242 RU

The 242 RU has the following configuration as in the existing 11ax.

242 RU=1N+106 RU+1N+26 RU+1N+106 RU+1N

The 106 RU has the following configuration as in the existing 11ax.

106 RU=52 RU+2N+52 RU

The 52 RU has the following configuration as in the existing 11ax.

52 RU=26 RU+26 RU

2. 320 MHz Tone Plan

A configuration of 320 MHz may consider various options as follows.

Option 1: Combination of Four Existing 11ax 80 MHz Tone Plans

This may be expressed as follows by considering both contiguous and non-contiguous situations.

80+80+80+80 MHz/160+80+80 MHz/80+160+80 MHz/80+80+160 MHz/240+80 MHz/80+240 MHz/320 MHz

+ means non-contiguous, and 160/240/320 manes that 2/3/4 80 MHz tone plans are contiguously arranged in succession.

<In the Presence of Contiguous Band>

When 160 MHz is used, a tone index of a left 80 MHz tone plan is tone index−512 of the existing 80 MHz tone plan, and a tone index of a right 80 MHz tone plan is tone index+512 of the existing 80 MHZ tone plan.

When 240 MHz is used, a tone index of a center 80 MHz tone plan is directly a tone index of the existing 80 MHz tone plan, a tone index of the leftmost 80 MHz tone plan is a tone index−1024 of the existing 80 MHz tone plan, and a tone index of the rightmost 80 MHz tone index is tone index+1024 of the existing 80 MHz tone plan.

When 320 MHz is used, a tone index of a first left 80 MHz tone plan is tone index-1536 of the existing 80 MHz tone plan, a tone index of a second left 80 MHz tone plan is tone index−512 of the existing 80 MHz tone plan, a tone index of a third left 80 MHz tone plan is tone index+512 of the existing 80 MHz tone plan, and a tone index of a fourth left 80 MHz tone plan is tone index+1536 of the existing 80 MHz tone plan.

The aforementioned various non-contiguous combinations may use not only the same band but also different bands. For example, in 80+160+80 MHz, each 80/160/80 MHz bandwidth may use 2.4 GH/5 GHz/6 GHz band in transmission.

Option 2: Combination of Two New 160 MHz Tone Plans

This may be expressed as follows by considering both contiguous and non-contiguous situations.

160+160 MHz/320 MHz

+ means non-contiguous, and 320 MHz means that two new 160 MHz tone plans are contiguously arranged.

<In the Presence of Contiguous Band>

When 320 MHz is used, a tone index of a left 160 MHz tone plan is tone index−1024 of the new 160 MHz tone plan, and a tone index of a right 160 MHz tone plan is tone index+1024 of the existing 160 MHz tone plan.

In the above non-contiguous combination, not only the same band but also different bands may be used. For example, in 160+160 MHz, each 160 MHz bandwidth may be transmitted using a 2.4 GH/5 GHz band.

Option 3: Combination of Two Existing 11ax 80 MHz Tone Plans and One New 160 MHz This may be expressed as follows by considering both contiguous and non-contiguous situations.

c80+c80+n160 MHz/c80+n160 MHz+c80/n160+c80+c80 MHz/cc160+n160 MHz/n160+cc160 MHz/ncc320 MHz/cnc320 MHz/ccn320 MHz + means non-contiguous, and c80 MHz, cc160 MHz, and n160 MHz respectively mean the existing 11ax 80 MHz tone plan, the existing 11ax successive two 80 MHz tone plans, and a new 160 MHz tone plan. ncc320 MHz/cnc320 MHz/ccn320 MHz mean successive one new 160 MHz tone plan and existing two 1 lax 80 MHz tone plan, and ncc/cnc/ccn denote successive orders of the respective tone plans.

<In the Presence of Contiguous Band>

When cc160 MHz is used, a tone index of a left 80 MHz tone plan is tone index−512 of the existing 80 MHz tone plan, and a tone index of a right 80 MHz is tone index+512 of the existing 80 MHz tone plan.

When ncc320 MHz is used, a tone index of a left 160 MHz tone plan is tone index −1024 of a 160 MHz tone plan, a tone index of a next 80 MHz tone plan is tone index+512 of the existing 80 MHz tone plan, and a tone index of a last 80 MHz tone plan is tone index+1536 of the existing 80 MHz tone plan.

When cnc320 MHz is used, a tone index of a left 80 MHz tone plan is tone index −1536 of the existing 80 MHz tone plan, a tone index of a center 160 MHz tone plan is directly tone index of the new 160 MHz tone plan, a tone index of a last 80 MHz tone plan is tone index+1536 of the existing 80 MHz tone plan.

When ccn320 MHz is used, a tone index of a left 80 MHz tone plan is tone index −1536, a tone index of a next 80 MHz tone plan is tone index −512 of the existing 80 MHz tone plan, and a tone index of a last 160 MHz tone plan is tone index+1024 of the new 160 MHz tone plan.

In the above options, various combinations of tone plans having different structures of c80 and n160 may be considered. In this case, an indication as to RU allocation may be very complicated. Therefore, there may be a restriction that only a structure having a specific order is used in order to reduce signaling overhead. For example, only c80+c80+n160 MHz/ccn320 MHz may be used.

In the above various non-contiguous combinations, not only the same band but also different bands may be used. For example, in c80+n160+c80 MHz, each c80/n160/c80 MHz bandwidth may be transmitted using a 2.4 GH/5 GHz/6 GHz band.

Option 4: Alternative 320 MHz Tone Plan Considering Use of One RF

In case of contiguous 320 MHz, a situation where transmission is performed by using one RF may be considered. In this case, 320 MHz constituted by combining 160 MHz or 80 MHz tone plans has many subcarriers which are wasted. Therefore, a new tone plan may be proposed to increase efficiency and throughput of subcarrier in use. Various alternative tone plans are proposed below.

A. Alternative 320 MHz Tone Plan 1

When two 160 MHz tone plans are successive to constitute 320 MHz, 12 left/11 right guard tones are used, and may be directly applied to the alternative 320 MHz tone plan. In addition, when a full band is used in transmission, a new RU may be proposed, and a size of the new RU may be determined by considering various DC tones according to an effect of a DC offset. The number of DC tones of the existing 11ax 80 MHz is 5 or 7, and when this is directly considered, the new RU of the full band is 4068 RU or 4066 RU.

12/11 guard tone, 5DC, 4068 RU (RU subcarrier index: −2036: −3, 3:2036)

12/11 guard tone, 7DC, 4066 RU (RU subcarrier index: −2036: −4, 4:2036)

In 320 MHz, considering the effect of the DC offset, it is not preferable that the number of DC tones in use is less than 5/7 which is less than the number of DC tones used in the existing 80 MHz. In addition, 5/7DC may be sufficient in terms of performance. Considering the following OFDMA tone plan using 2020 RU described below, up to 7DC may be suitable. The number of DC tones in the OFDMA tone plan is designed by considering 7DC used in the existing 11ax 80 MHz OFDMA tone plan, and it is not preferable that the number of DC tones is less than that, and 7DC may also be sufficient in 320 MHZ in terms of performance.

The OFDMA tone plan can be expressed using the existing 2020 RU and 26 RU (13+13 RU) as follows.

12G+2020 RU+13 RU+7DC+13 RU+2020 RU+1 IG

The following two configurations are proposed as a 2020 RU configuration.

2020 RU=996 RU+1N+26 RU+1N+996 RU

2020 RU=1N+996 RU+26 RU+996 RU+1N

In a first configuration, a null tone is present at both sides of the 26 RU so that an effect of interference from/to an adjacent RU can be decreased. In a second configuration, the effect of interference between 996 RU and its adjacent RU can be decreased. An RU which uses a small number of subcarriers, such as 26 RU, may preferably use the first configuration since interference has significant effect on performance.

The following two configurations are proposed as a 996 RU configuration as in the new 160 MHz.

996 RU=484 RU+1N+26 RU+1N+484 RU

996 RU=1N+484 RU+26 RU+484 RU+1N

The 484 RU has two 242 RU configurations as in the existing 11ax.

484 RU=242 RU+242 RU

The 242 RU has the following configuration as in the existing 11ax.

242 RU=1N+106 RU+1N+26 RU+1N+106 RU+1N

The 106 RU has the following configuration as in the existing 11ax.

106 RU=52 RU+2N+52 RU

The 52 RU has the following configuration as in the existing 11ax.

52 RU=26 RU+26 RU 3. 240 MHz Tone Plan

An AP may transmit a PPDU using a bandwidth of 240 MHz, and a 240 MHz tone plan may be configured by combining three existing 11ax 80 MHz tone plans. Here, the 240 MHz tone plan may be configured as follows considering both contiguous and non-contiguous bands: 80+80+80 MHz/160+80 MHz/80+160 MHz/240 MHz.

+ means non-contiguous, and 160/240 means that ⅔ 80 MHz tone plans are contiguously arranged in succession.

<In the Presence of Contiguous Band>

When 160 MHz is used, a tone index of a left 80 MHz tone plan is tone index −512 of the existing 80 MHz tone plan, and a tone index of a right 80 MHz tone plan is tone index+512 of the existing 80 MHz tone plan.

When 240 MHz is used, a tone index of a center 80 MHz tone plan is directly a tone index of the existing 80 MHz tone plan, a tone index of the leftmost 80 MHz tone plan is tone index −1024 of the existing 80 MHz tone plan, and a tone index of the right most 80 MHz is tone index+1024 of the existing 80 MHz tone plan.

A pilot subcarrier also needs to be adjusted corresponding to the position. When 160 MHz is used, pilot tone indices in a left 80 MHz tone plan are the pilot tone indices in the conventional 80 MHz tone plan−512, and pilot tone indices in a right 80 MHz tone plan are the pilot tone indices in the conventional 80 MHz tone plan +512.

When 240 MHz is used, pilot tone indices in a middle 80 MHz tone plan are the same pilot tone indices in the conventional 80 MHz tone plan, pilot tone indices in a left 80 MHz tone plan are the pilot tone indices in the conventional 80 MHz tone plan−1024, and pilot tone indices in a right 80 MHz tone plan are the pilot tone indices in the conventional 80 MHz tone plan +1024.

Alternatively, when the conventional 11ax 80 MHz tone plan and the new 160 MHz tone plan may be used and both a contiguous band and a non-contiguous band are considered, a tone plan may be represented as follows.

c80+n160 MHz/n160 MHz+c80/nc240 MHz/cn240 MHz

+ denotes non-contiguous, and c80 MHz and n160 MHz denote the conventional 11ax 80 MHz tone plan and the new 160 MHz tone plan, respectively. nc240 MHz/cn240 MHz denote one new 160 MHz tone plan and one conventional 11ax 80 MHz tone plan which are contiguous, and nc/cn denotes the order in which the tone plans are contiguous.

When nc240 MHz is used, tone indices in a left 160 MHz tone plan are the tone indices in the new 160 MHz tone plan−512, and tone indices in a right 80 MHz tone plan are the tone indices in the conventional 80 MHz tone plan +1024.

When cn240 MHz is used, tone indices in a left 80 MHz tone plan are the tone indices in the conventional 80 MHz tone plan−1024, and tone indices in a right 160 MHz tone plan are the tone indices in the new 160 MHz tone plan +512.

A pilot subcarrier also needs to be adjusted corresponding to the position. When nc240 MHz is used, pilot tone indices in a left 160 MHz tone plan are the pilot tone indices in the new 160 MHz tone plan−512, and pilot tone indices in a right 80 MHz tone plan are the pilot tone indices in the conventional 80 MHz tone plan +1024.

When cn240 MHz is used, pilot tone indices in a left 80 MHz tone plan are the pilot tone indices in the conventional 80 MHz tone plan−1024, and pilot tone indices in a right 160 MHz tone plan are the pilot tone indices in the new 160 MHz tone plan +512.

In the above various non-contiguous combinations, not only the same band but also different bands may be used. For example, in 80+80+80 MHz, each 80 MHz bandwidth may be transmitted using a 2.4 GH/5 GHz/6 GHz band.

Specifically, there may be three options to configure a 240 MHz tone plan.

Option 1: Combination of three 80 MHz tone plans (80+80+80)

Option 2: Combination of two 80 MHz tone plans and one new 160 MHz tone plan (160+80/80+160)

Option 3: Alternative 240 MHz tone plan (240)

In a non-contiguous case, different bands may be used. Indices for RU subcarriers may be adjusted according to position.

Indices for 240 MHz pilot subcarriers may be adjusted according to position as follows:
- 160 MHz: Existing 80 MHz±512 (same as in RU tone indices)
- 240 MHz: Existing 80 MHz+1024, existing 80 MHz (same as in RU tone indices), new 160 MHz+512 (same as in RU tone indices)

Tone Plan 1

When the full band is used, a new RU may be proposed in consideration of a guard tone and a DC tone. In existing 11ax 80 MHz and 160 MHz, 12 right guard tones and 11 left guard tones are used, which may equally be used in 240 MHz. Considering actual interference from an adjacent channel or interference in an adjacent channel, 12 right guard tones and 11 left guard tones may be used. Further, it is needed to use an equal or greater number of DC tones to or than the number of DC tones used in existing 80 MHz, which is five or seven, and five or seven DC tones may be used in consideration of a DC offset. Accordingly, the following tone plans may be proposed. In the following tone plans, G denotes a guard tone, and N denotes a null tone.

1. Alternative 240 MHz Tone Plan 1

<Full Band Tone Plan>

12/11 guard, DC 5 or 7, RU 3044 or 3042

<OFMDA Tone Plan>

12G+996 RU+1N+26 RU+1N+996 RU (5DC)+1N+26 RU+1N+996 RU+11G

Either 996 RU=484 RU+1N+26 RU+1N+484 RU (ver1) (or 1N+484 RU+26 RU +484 RU+1N (ver2))

Middle 996 RU (5DC)=484 RU+13 RU+7DC+13 RU+484 RU (same as in 80 MHz)

484 RU=242 RU+242 RU

242 RU=1N+106 RU+1N+26 RU+1N+106 RU+1N

106 RU=52 RU+2N+52 RU

52 RU=26 RU+26 RU

In the full band, five or seven DC tones are configured in consideration of the impact of a DC offset. The number of DC tones cannot be less than that in 80 MHz/160 MHz and may not be greater than seven in OFDMA.

The two options of the configuration of either 996 RU may be considered to secure the performance of the 26 RU or performance of the 484 RU. The configurations of the middle 996 RU and the remaining RUs are the same as those in existing ax.

Specifically, two configurations may be proposed for either 996 RU, among which a first configuration has a null tone disposed on either side of a 26 RU to reduce the impact of interference from/in an adjacent RU, and a second configuration can reduce the impact of interference between a 484 RU and an RU adjacent thereto. An RU using a small number of subcarriers, such as a 26 RU, may preferably use the first configuration since interference significantly affects performance.

The middle 996 RU may employ the same 996 RU tone plan as in existing 80 MHz. Further, the 484/242/106/52 RUs may employ the same configurations as in existing 11ax.

4. Examples of Tone Plan

Figure 13:
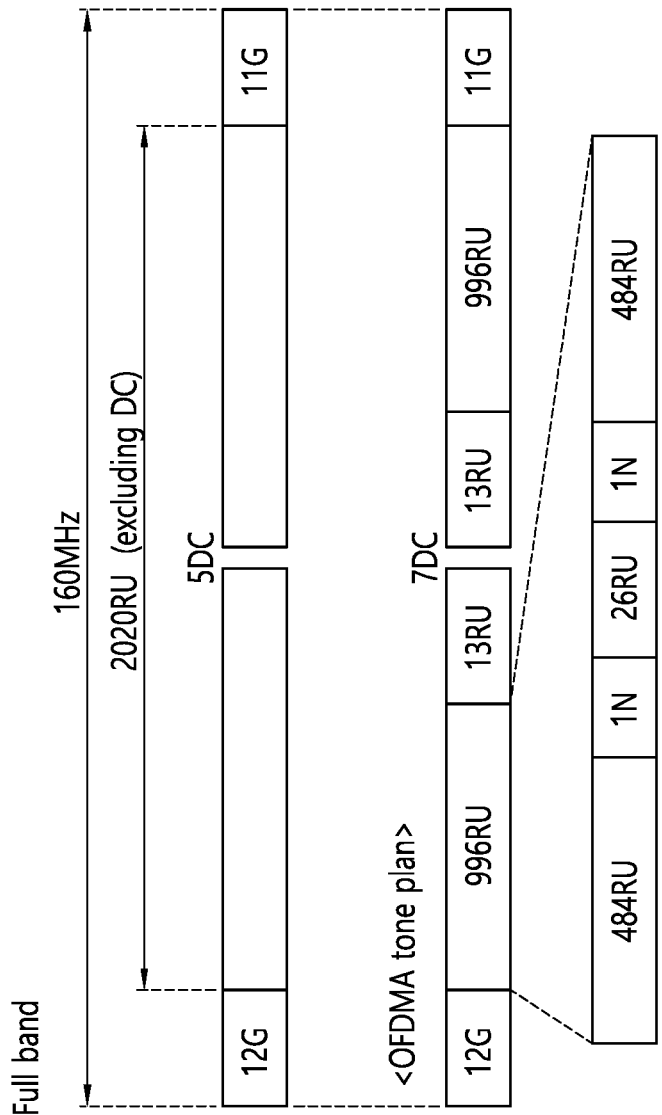
FIG. 13 illustrates an example of a tone plan in a 160 MHz band according to an embodiment.

FIG. 13 illustrates an example of a tone plan in a 160 MHz band according to an embodiment.

A tone plan in case of a full band and a tone plan in case of applying OFDMA are both illustrated in FIG. 13.

First, in case of the full band, a tone plan of 160 MHz may sequentially include 12 guard tones, 2020 RU, 5 DC tones, and 11 guard tones. 5 DC tones may be located at the center of 160 MHz, and data may be transmitted in the 2020 RU. However, FIG. 13 is for one embodiment only, and thus the 12 guard tones and the 11 guard tones may change in locations. When 7 DC tones are located at the center of 160 MHz, the data may be transmitted in 2018 RU.

In case of applying OFDMA, a tone plan of 160 MHz may sequentially include 12 guard tones, 996 RU, 13 RU, 7 DC tones, 13 RU, 996 RU, and 11 guard tones. In addition, the 996 RU may include 484 RU, one null tone, 26 RU, one null tone, and 484 RU. However, FIG. 13 is for one embodiment only, and thus the 12 guard tones and the 11 guard tones may change in locations. The 996 RU may include one null tone, 484 RU, 26 RU, 484 RU, and one null tone.

The 484 RU and subordinate RUs are not shown since they may have the same configuration as in the existing 11ax.

Figure 14:
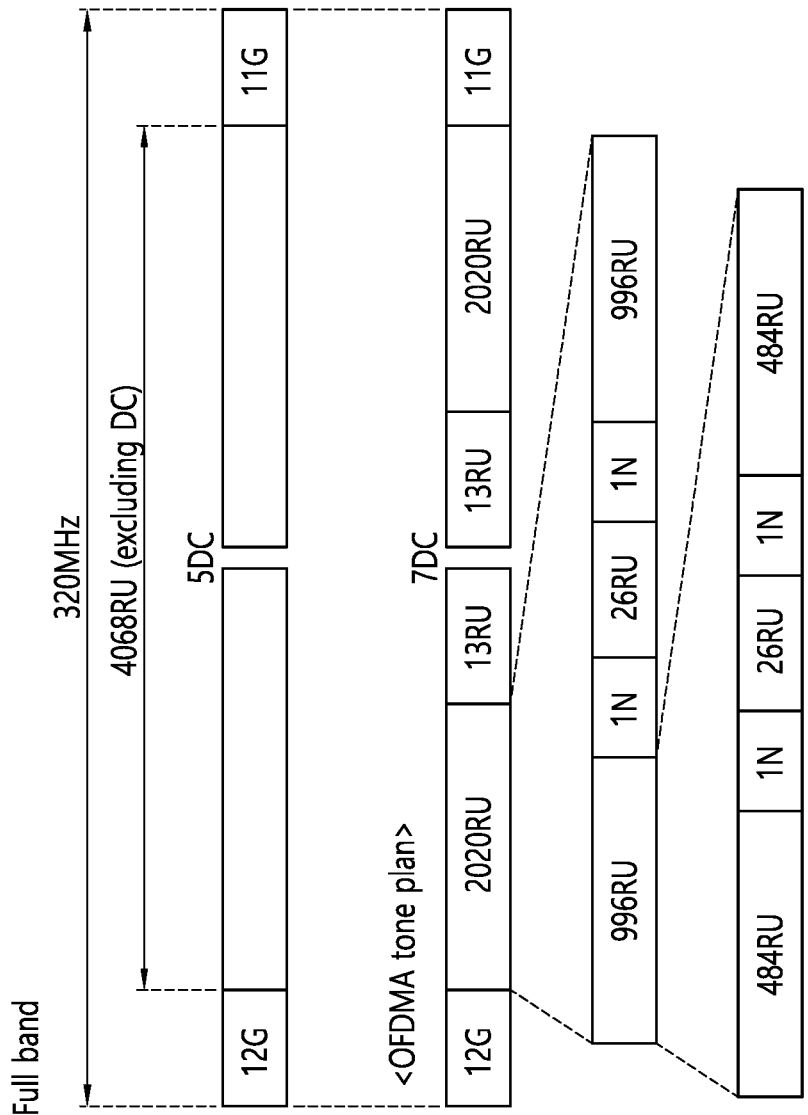
FIG. 14 illustrates an example of a tone plan in a 320 MHz band according to an embodiment.

FIG. 14 illustrates an example of a tone plan in a 320 MHz band according to an embodiment.

A tone plan in case of a full band and a tone plan in case of applying OFDMA are both illustrated in FIG. 14.

First, in case of the full band, a tone plan of 320 MHz may sequentially include 12 guard tones, 4068 RU, 5 DC tones, and 11 guard tones. 5 DC tones may be located at the center of 320 MHz, and data may be transmitted in the 4068 RU.

However, FIG. 14 is for one embodiment only, and thus the 12 guard tones and the 11 guard tones may change in locations. When 7 DC tones are located at the center of 320 MHz, the data may be transmitted in 4066 RU.

In case of applying OFDMA, a tone plan of 320 MHz may sequentially include 12 guard tones, 2020 RU, 13 RU, 7 DC tones, 13 RU, 2020 RU, and 11 guard tones. In addition, the 2020-tone RU may include 996 RU, one null tone, 26 RU, one null tone, and 996 RU. In addition, the 996 RU may include 484 RU, one null tone, 26 RU, one null tone, and 484 RU. However, FIG. 14 is for one embodiment only, and thus the 12 guard tones and the 11 guard tones may change in locations. The 996 RU may include one null tone, 484 RU, 26 RU, 484 RU, and one null tone.

The 484 RU and subordinate RUs are not shown since they may have the same configuration as in the existing 11ax.

Figure 15:
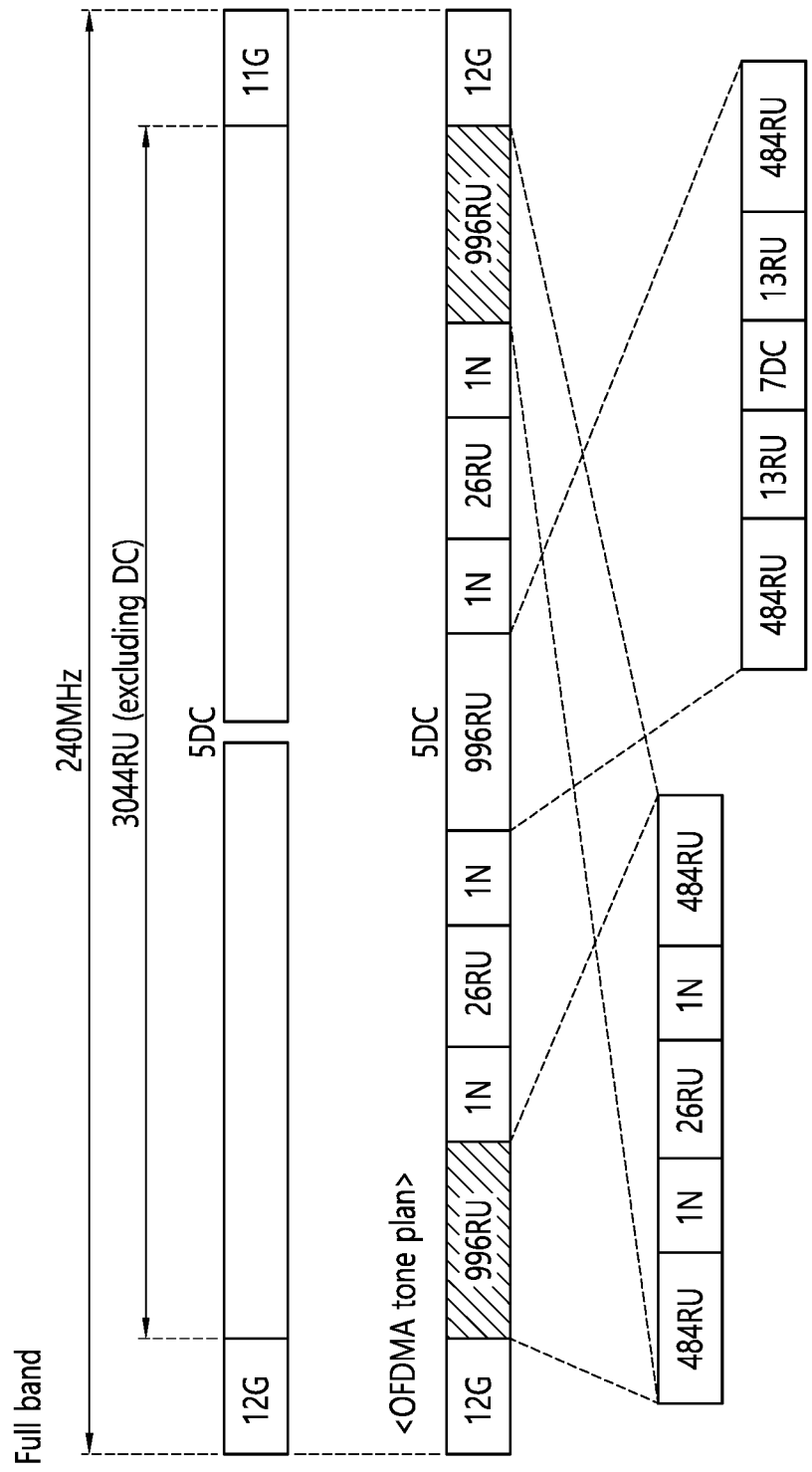
FIG. 15 illustrates an example of a tone plan in a 240 MHz band according to an embodiment.

FIG. 15 illustrates an example of a tone plan in a 240 MHz band according to an embodiment.

FIG. 15 shows both the full band tone plan and the OFDMA tone plan proposed in tone plan 1.

First, in the full band, the 240 MHz tone plan may include 12 guard tones, a 3044 RU, five DC tones, and 11 guard tones in order. The five DC tones may be disposed in the middle of the 240 MHz band, and data may be transmitted via the 3044 RU. However, FIG. 15 shows only one embodiment, and the positions of the 12 guard tones and the 11 guard tones may be changed. Further, when seven DC tones are disposed in the middle of the 240 MHz band, data may be transmitted via a 3042 RU.

When OFDMA is applied, the 240 MHz tone plan may include 12 guard tones, a 996 RU, one null tone, a 26 RU, one null tone, a 996 RU, five DC tones, one null tone, a 26 RU, one null tone, a 996 RU, and 11 guard tones in order.

The 996 RU at either end may include a 484 RU, one null tone, a 26 RU, one null tone, and a 484 RU. The 996 RU in the middle may include a 484 RU, a 13 RU, seven DC tones, a 13 RU, and a 484 RU. However, FIG. 13 show only one embodiment, and the positions of the 12 guard tones and the 11 guard tones may be changed, and the 996 RU at either end may include one null tone, a 484 RU, a 26 RU, a 484 RU, and one null tone.

The 484 RU and the other RUs may have the same configurations as in existing 11ax and thus are not shown.

5. Aspects of the Present Disclosure

The present disclosure proposes phase rotation applied to a legacy preamble when a packet is transmitted using 160/240/320 MHz in a (802.11) WLAN system.

The 802.11 WLAN system considers transmission of an increased stream using a wider band than that in conventional 11ax or using more antennas than those in 11ax in order to increase peak throughput. Further, the system also considers a method of aggregating various bands for use.

The present disclosure considers using a wide band and particularly proposes phase rotation applied to a legacy preamble when a packet is transmitted using 160/240/320 MHz.

First, a procedure for encoding a PPDU may be as follows.

An L-STF included in the PPDU may be configured by the following procedure.
 a) Determine the channel bandwidth from the TXVECTOR parameter CH_BANDWIDTH.
 b) Sequence generation: Generate the L-STF sequence over the channel bandwidth as described in 27.3.10.3 (L-STF). Apply a 3 dB power boost if transmitting an HE ER SU PPDU as described in 27.3.10.3 (L-STF).
 c) Phase rotation: Apply appropriate phase rotation for each 20 MHz subchannel as described in 27.3.9 (Mathematical description of signals) and 21.3.7.5 (Definition of tone rotation).
 d) CSD per STS: If the TXVECTOR parameter BEAM_CHANGE is 0, apply CSD per STS for each space-time stream and frequency segment as described in 27.3.10.2.2 (Cyclic shift for HE modulated fields).
 e) Spatial mapping: If the TXVECTOR parameter BEAM_CHANGE is 0, apply the A matrix and the Q matrix as described in 27.3.10.3 (L-STF).
 f) IDFT: Compute the inverse discrete Fourier transform.
 g) CSD per chain: If the TXVECTOR parameter BEAM_CHANGE is 1 or not present, apply CSD per chain for each transmit chain and frequency segment as described in 27.3.10.2.1 (Cyclic shift for pre-HE modulated fields).
 h) Insert GI and apply windowing: Prepend a GI ($T_{GI,Pre-HE}$) and apply windowing as described in 27.3.9 (Mathematical description of signals).
 i) Analog and RF: Upconvert the resulting complex baseband waveform associated with each transmit chain to an RF signal according to the center frequency of the desired channel and transmit. Refer to 27.3.9 (Mathematical description of signals) and 27.3.10 (HE preamble) for details.

An L-LTF included in the PPDU may be configured by the following procedure.
 a) Determine the channel bandwidth from the TXVECTOR parameter CH_BANDWIDTH.
 b) Sequence generation: Generate the L-LTF sequence over the channel bandwidth as described in 27.3.10.4 (L-LTF). Apply a 3 dB power boost if transmitting an HE ER SU PPDU as described in 27.3.10.4 (L-LTF).
 c) Phase rotation: Apply appropriate phase rotation for each 20 MHz subchannel as described in 27.3.9 (Mathematical description of signals) and 21.3.7.5 (Definition of tone rotation).
 d) CSD per STS: If the TXVECTOR parameter BEAM_CHANGE is 0, apply CSD per STS for each space-time stream and frequency segment as described in 27 3.10.2.2 (Cyclic shift for HE modulated fields) before spatial mapping.
 e) Spatial mapping: If the TXVECTOR parameter BEAM_CHANGE is 0, apply the A matrix and the Q matrix as described in 27.3.10.4 (L-LTF).
 f) IDFT: Compute the inverse discrete Fourier transform.
 g) CSD per chain: If the TXVECTOR parameter BEAM_CHANGE is 1 or not present, apply CSD per chain for each transmit chain and frequency segment as described in 27.3.10.2.1 (Cyclic shift for pre-HE modulated fields).
 h) Insert GI and apply windowing: Prepend a GI ($T_{GI,L-LTF}$) and apply windowing as described in 27.3.9 (Mathematical description of signals).
 i) Analog and RF: Upconvert the resulting complex baseband waveform associated with each transmit chain to an RF signal according to the carrier frequency of the desired channel and transmit. Refer to 27.3.9 (Mathematical description of signals) and 27.3.10 (HE preamble) for details.

An L-SIG included in the PPDU may be configured by the following procedure.

a) Set the RATE subfield in the SIGNAL field to 6 Mb/s. Set the LENGTH. Parity, and Tail fields in the SIGNAL field as described in 27.3.10.5 (L-SIG).
b) BCC encoder: Encode the SIGNAL field by a convolutional encoder at the rate of R=½ as described in 27.3.11.5.1 (Binary convolutional coding and puncturing).
c) BCC interleaver: Interleave as described in 17.3.5.7 (BCC interleavers).
d) Constellation Mapper: BPSK modulate as described in 27.3.11.9 (Constellation mapping).
e) Pilot insertion: Insert pilots as described in 27.3.10.5 (L-SIG).
f) Extra tone insertion: Four extra tones are inserted in subcarriers k e {−28, −27, 27, 28} for channel estimation purpose and the values on these four extra tones are {−1, −1, −1, 1}, respectively. Apply a 3 dB power boost to the four extra tones if transmitting an HE ER SU PPDU as described in 27.3.10.5 (L-SIG).
g) Duplication and phase rotation: Duplicate the L-SIG field over each occupied 20 MHz subchannel of the channel bandwidth. Apply appropriate phase rotation for each occupied 20 MHz subchannel as described in 27.3.9 (Mathematical description of signals) and 21.3.7.5 (Definition of tone rotation).
h) CSD per STS: If the TXVECTOR parameter BEAM_CHANGE is 0, apply CSD per STS for each space-time stream and frequency segment as described in 27.3.10.2.2 (Cyclic shift for HE modulated fields) before spatial mapping.
i) Spatial mapping: If the TXVECTOR parameter BEAM_ CHANGE is 0, apply the A matrix and Q matrix as described in 27.3.10.5 (L-SIG).
j) IDFT: Compute the inverse discrete Fourier transform.
k) CSD per chain: If the TXVECTOR parameter BEAM_ CHANGE is 1 or not present, apply CSD per chain for each transmit chain and frequency segment as described in 27.3.10.2.1 (Cyclic shift for pre-HE modulated fields).
l) Insert GI and apply windowing: Prepend a GI ($T_{GI,Pre-LTF}$) and apply windowing as described in 27.3.9 (Mathematical description of signals).
m) Analog and RF: Upconvert the resulting complex baseband waveform associated with each transmit chain. Refer to 27.3.9 (Mathematical description of signals) and 27.3.10 (HE preamble) for details.

Appropriate phase rotation may be applied to the L-STF, the L-LTF, and the L-SIG for each 20 MHz subchannel (see c) of the L-STF, c) of the L-LTF, and g) of the L-SIG). Here, when the L-SIG is transmitted in a bandwidth of 40 MHz or wider, the L-SIG may be duplicated over each 20 MHz, and phase rotation may be applied for each 20 MHz (see g) of the L-SIG). The phase rotation may be described as follows.

Phase rotation used for a legacy preamble and HE-SIG-A/B in existing 11ax is illustrated below.

A function $\Upsilon_{k,BW}$ is used to represent the rotation of a tone. $\Upsilon_{k,BW}$ may be defined as a phase rotation value. A bandwidth (BW) in $\Upsilon_{k,BW}$ is determined by a TXVECTOR parameter CH_BANDWIDTH defined as in the following table. Here, k is a subcarrier index.

TABLE 11

| CH_BANDWIDTH | $\Upsilon_{k,BW}$ |
|---|---|
| CBW20 | $\Upsilon_{k,20}$ |
| CBW40 | $\Upsilon_{k,40}$ |

TABLE 11-continued

| CH_BANDWIDTH | $\Upsilon_{k,BW}$ |
|---|---|
| CBW80 | $\Upsilon_{k,80}$ |
| CBW160 | $\Upsilon_{k,160}$ |
| CBW80 + 80 | $\Upsilon_{k,80}$ per frequency segment |

$\Upsilon_{k,BW}$ according to bandwidth is defined as follows.
For a 20 MHz PPDU transmission, $\Upsilon_{k,20}=1$ For a 40 MHz PPDU transmission, $$\Upsilon_{k,40} = \begin{cases} 1, & k < 0 \\ j, & k \geq 0 \end{cases}$$

For an 80 MHz PPDU transmission.

$$\Upsilon_{k,80} = \begin{cases} 1, & k < -64 \\ -1, & k \geq -64 \end{cases}$$

For an 80+80 MHz PPDU transmission, each 80 MHz frequency segment needs to use the phase rotation for the 80 MHz PPDU transmission.
For a 160 MHz PPDU transmission.

$$\Upsilon_{k,160} = \begin{cases} 1, & k < -192 \\ -1, & -192 \leq k < 0 \\ 1, & 0 \leq k < 64 \\ -1, & 64 \leq k \end{cases}$$

As described above, for 160 MHz, the phase rotation for 80 MHz is repeated twice.

A wide band may be used in post-11ax Wi-Fi in order to improve peak throughput, and up to 240/320 MHz is taken into consideration in the present disclosure. Although the type of a packet to be used is not known, it is obvious that a packet starts with a legacy preamble in order to coexist with a legacy packet. In addition, a case of transmitting a contiguous 160/240/320 MHz packet using one RF by employing improved hardware and an improved RF may be considered. The present disclosure proposes various types of phase rotation (hereinafter, techniques in A. Phase rotation) for optimizing the PAPRs of an L-STF and an L-LTF in view of this case and also evaluates the PAPR of an L-SIG (hereinafter, techniques in B. PAPR).

L-STF and L-LTF sequences corresponding to 20 MHz are illustrated below and are applied to each 20 MHz bandwidth in a wide bandwidth as they are.

L-STF=sqrt(½).*[0 0 0 0 0 0 0 0 1 +j 0 0 0 −1 −j 0 0 0 1 +j 0 0 0 −1 −j 0 0 0 −1 −j 0 0 0 1 +j 0 0 0 0 0 0 0 −1 −j 0 0 0 −1 −j 0 0 0 1 +j 0 0 0 1 +j 0 0 0 1 +j 0 0 0 1 +j 0 0 0 0 0 0 0]

L-LTF=[0 0 0 0 0 0 1 1 −1 −1 1 1 −1 1 −1 1 1 1 1 1 1 −1 −1 1 1 −1 1 −1 1 1 1 1 0 1 −1 −1 1 1 −1 1 −1 1 −1 −1 −1 −1 −1 1 1 −1 −1 1 −1 1 −1 1 1 1 1 0 0 0 0 0]

The PAPR of a signal which is repeated in the frequency domain as above may significantly increase. Phase rotation is applied to reduce the PAPR, and the following phase rotations are proposed.

A. Phase Rotation
1) 160 MHz (subcarrier indices ranging from −256 to +256)

160 MHz includes both contiguous 160 MHz and non-contiguous 160 MHz, and non-contiguous 160 MHz may be 80+80 MHz. Particularly, in non-contiguous 160 MHz, respective channels may be positioned in different bands. Even in this case, the following phase rotations may be equally applied for simplification. Alternatively, since it is obvious that different RFs are used and thus a PAPR is not affected, separate phase rotation may be applied depending on the size of a channel used in a band. The same may be applied to the following 240/320 MHz.

Contiguous/non-contiguous 160 MHz phase rotations proposed below may be equally applied to a 160 MHz portion in wider non-contiguous 240/320 MHz transmission.

A) Method 1: Repeating Existing 80 MHz Phase Rotation

Method 1 is the same as that used in existing 11ax and may simplify phase rotation when transmitting a contiguous 160 MHz packet using one RF and when transmitting a contiguous/non-contiguous 160 MHz packet by each 80 MHz using two RFs.

Phase rotation for contiguous 160 MHz may be represented as follows.

Gamma_k,160=1 if k<−192
−1 if −192≤k<0
1 if 0≤k<64
−1 if 64≤k

Gamma_k,160 denotes a phase rotation value for subcarrier index k in contiguous 160 MHz.

Phase rotation for each 80 MHz may be represented as follows.

Gamma_k,80=1 if k<−64
1 if −64≤k

B) Method 2: Repeating existing 80 MHz phase rotation and adding phase rotation by 80 MHz bandwidth Method 2 is a method for further optimizing a PAPR by applying the same method as in existing 11ax and additionally applying phase rotation by a unit of 80 MHz. Since the unit of 80 MHz is maintained, this method may also simplify phase rotation when transmitting a contiguous 160 MHz packet using one RF and when transmitting a contiguous/non-contiguous 160 MHz packet by each 80 MHz using two RFs.

In this method, it is optimum to add a phase rotation of 1 to all of the two 80 MHz bandwidths in terms of PAPR, and the same phase rotation as in method 1 may be applied. That is, phase rotation applied to an 80 MHz bandwidth, which is optimized in terms of PAPR, is [1 1] when defined from low-frequency 80 MHz. By multiplying [1 1] and Gamma_k,160 proposed in method 1 for each 80 MHz, the same phase rotation as in method 1 may be obtained as follows.

Gamma_k,160=1 if k<−192
−1 if −192≤k<0
1 if 0≤k<64
−1 if 64≤k

C) Method 3: PAPR-Optimizing Phase Rotation Applied for Each 20 MHz Bandwidth

Method 3 is PAPR-optimizing phase rotation applied for each 20 MHz bandwidth when a contiguous 160 MHz packet is transmitted using one RF and is described as follows. Method 3 may also be applied to non-contiguous 160 MHz by adjusting subcarrier indices (i.e., in the following equation, phase rotation in −256≤k<0 may be applied to low-frequency 80 MHz, and phase rotation in 0≤k<256 may be applied to high-frequency 80 MHz) but may not be optimal in terms of PAPR.

Optimized phase rotation for an L-STF is as follows.
Gamma_k,160=1 if k<−192
−j if −192≤k<−128
1 if −128≤k<−64
−j if −64≤k<0
−1 if 0≤k<64
j if 64≤k<128
−1 if 128≤k<192
−j if 192≤k
or
Gamma_k,160=1 if k<−192
j if −192≤k<−128
1 if −128≤k<−64
j if −64≤k<0
−1 if 0≤k<64
−j if 64≤k<128
−1 if 128≤k<192
j if 192≤k
or
Gamma_k,160=1 if k<−192
j if −192≤k<−128
−1 if −128≤k<−64
j if −64≤k<0
1 if 0≤k<64
−j if 64≤k<128
1 if 128≤k<192
−j if 192≤k
or
Gamma_k,160=1 if k<−192
−j if −192≤k<−128
−1 if −128≤k<−64
−j if −64≤k<0
1 if 0≤k<64
j if 64≤k<128
1 if 128≤k<192
j if 192≤k Optimized phase rotation for an L-LTF is as follows.
Gamma_k,160=1 if k<−192
−1 if −192≤k<−128
1 if −128≤k<−64
1 if −64≤k<0
1 if 0≤k<64
1 if 64≤k<128
−1 if 128≤k<192
−1 if 192≤k
or
Gamma_k,160=1 if k<−192
1 if −192≤k<−128
−1 if −128≤k<−64
−1 if −64≤k<0
−1 if 0≤k<64
−1 if 64≤k<128
1 if 128≤k<192
−1 if 192≤k 2) 240 MHz (Subcarrier Indices Ranging from −384 to +384)

240 MHz includes both contiguous 240 MHz and non-contiguous 240 MHz, and non-contiguous 240 MHz may be 160+80/80+160/80+80+80 MHz. Contiguous/non-contiguous 160 MHz phase rotations proposed below may be equally applied to a 240 MHz portion in wider non-contiguous 320 MHz transmission.

A) Method 1: Repeating Existing 80 MHz Phase Rotation

Method 1 is the same as that used in existing 11ax and may simplify phase rotation when transmitting a contiguous 240 MHz packet using one RF and when transmitting a contiguous/non-contiguous 240 MHz packet by each 80 MHz using a plurality of RFs.

Phase rotation for contiguous 240 MHz may be represented as follows.

Gamma_k,240=1 if k<−320
−1 if −320≤k<−128
1 if −128≤k<−64
−1 if −64≤k<128
1 if 128≤k<192
−1 if 192≤k P Phase rotation for each contiguous 160/80 MHz may be represented as in A) in 1).

B) Method 2: Repeating Existing 80 MHz Phase Rotation and Adding Phase Rotation by 80 MHz Bandwidth Method 2 is a method for further optimizing a PAPR by applying the same method as in existing 11ax and additionally applying phase rotation by a unit of 80 MHz. Since the unit of 80 MHz is maintained, this method may also simplify phase rotation when transmitting a contiguous 240 MHz packet using one RF and when transmitting a contiguous/non-contiguous 240 MHz packet by each 80 MHz using a plurality of RFs.

In this method, phase rotation applied to an 80 MHz bandwidth, which is optimized in terms of the PAPRs of an L-STF and an L-LTF, is [1 1 −1]/[1 −1 −1] from low-frequency 80 MHz. That is, by multiplying [1 1 −1] or [1 −1 −1] and Gamma_k,240 proposed in method 1 for each 80 MHz, phase rotation for contiguous 240 MHz may be represented as follows.

Gamma_k,240 illustrated below is an example obtained by multiplying Gamma_k,240 proposed in method 1 and [1 1 −1] for each 80 MHz bandwidth.

Gamma_k,240=1 if k<−320
−1 if −320≤k<−128
1 if −128≤k<−64
−1 if −64≤k<128
−1 if 128≤k<192
1 if 192≤k Gamma_k,240 illustrated below is an example obtained by multiplying Gamma_k,240 proposed in method 1 and [1 −1 −1] for each 80 MHz bandwidth.

Gamma_k,240=1 if k<−320
−1 if −320≤k<−128
−1 if −128≤k<−64
1 if −64≤k<128
−1 if 128≤k<192
1 if 192≤k Method 2 may also be applied to non-contiguous 240 MHz by adjusting subcarrier indices. In the above equation, phase rotation in −384≤k<−128 may be applied to lowest-frequency 80 MHz, phase rotation in −128≤k<128 may be applied to second lowest-frequency 80 MHz, and phase rotation 128≤k<384 may be applied to highest-frequency 80 MHz.

C) Method 3: PAPR-Optimizing Phase Rotation Applied for Each 20 MHz Bandwidth

Method 3 is PAPR-optimizing phase rotation applied for each 20 MHz bandwidth when a contiguous 240 MHz packet is transmitted using one RF and is described as follows. Method 3 may also be applied to non-contiguous 240 MHz by adjusting subcarrier indices (i.e., in the following equation, phase rotation in −384≤k<−128 may be applied to lowest-frequency 80 MHz, phase rotation in −128≤k<128 may be applied to second lowest-frequency 80 MHz, and phase rotation 128≤k<384 may be applied to highest-frequency 80 MHz) but may not be optimal in terms of PAPR.

Optimized phase rotation for an L-STF is as follows.
Gamma_k,240=1 if k<−320
j if −320≤k<−256
−1 if −256≤k<−192
−j if −192≤k<−128
1 if −128≤k<−64
−j if −64≤k<0
1 if 0≤k<64
−j if 64≤k<128
1 if 128≤k<192
−j if 192≤k<256
−1 if 256≤k<320
j if 320≤k
or
Gamma_k,240=1 if k<−320
−j if −320≤k<−256
−1 if −256≤k<−192
j if −192≤k<−128
1 if −128≤k<−64
j if −64≤k<0
1 if 0≤k<64
j if 64≤k<128
1 if 128≤k<192
j if 192≤k<256
−1 if 256≤k<320
−j if 320≤k Optimized phase rotation for an L-LTF is as follows.
Gamma_k,240=1 if k<−320
1 if −320≤k<−256
1 if −256≤k<−192
1 if −192≤k<−128
−1 if −128≤k<−64
−1 if −64≤k<0
1 if 0≤k<64
1 if 64≤k<128
−1 if 128≤k<192
1 if 192≤k<256
−1 if 256≤k<320
1 if 320≤k
or
Gamma_k,240=1 if k<−320
−1 if −320≤k<−256
1 if −256≤k<−192
−1 if −192≤k<−128
1 if −128≤k<−64
1 if −64≤k<0
−1 if 0≤k<64
−1 if 64≤k<128
1 if 128≤k<192
1 if 192≤k<256
1 if 256≤k<320
1 if 320≤k 3) 320 MHz (subcarrier indices ranging from −512 to +512)

320 MHz includes both contiguous 320 MHz and non-contiguous 320 MHz, and non-contiguous 320 MHz may be 240+80/80+240/160+160/160+80+80/80+160+80/80+80+160/80+80+80+80 MHz.

A) Method 1: Repeating Existing 80 MHz Phase Rotation

Method 1 is the same as that used in existing 11ax and may simplify phase rotation when transmitting a contiguous 320 MHz packet using one RF and when transmitting a contiguous/non-contiguous 320 MHz packet by each 80 MHz using a plurality of RFs.

Phase rotation for contiguous 320 MHz may be represented as follows.
Gamma_k,320=1 if k<−448
−1 if −448≤k<−256
1 if −256≤k<−192
−1 if −192≤k<0
1 if 0≤k<64
−1 if 64≤k<256

1 if 256≤k<320
-1 if 320≤k

Phase rotation for each contiguous 240/160/80 MHz may be represented as in A) in 2) and A) in 1).

B) Method 2: Repeating Existing 80 MHz Phase Rotation and Adding Phase Rotation by 80 MHz Bandwidth Method 2 is a method for further optimizing a PAPR by applying the same method as in existing 11ax and additionally applying phase rotation by a unit of 80 MHz. Since the unit of 80 MHz is maintained, this method may also simplify phase rotation when transmitting a contiguous 320 MHz packet using one RF and when transmitting a contiguous/non-contiguous 320 MHz packet by each 80 MHz using a plurality of RFs.

In this method, phase rotation applied to an 80 MHz bandwidth, which is optimized in terms of the PAPR of an L-STF, is [1 -j -j 1]/[1 j j 1] from low-frequency 80 MHz. That is, by multiplying [1 -j -j 1] or [1 j j 1] and Gamma_k,320 proposed in method 1 for each 80 MHz, phase rotation for contiguous 320 MHz may be represented as follows.

Gamma_k,320 illustrated below is an example obtained by multiplying Gamma_k,320 proposed in method 1 and [1 -j -j 1] for each 80 MHz bandwidth.

Gamma_k,320=1 if k<-448
-1 if -448≤k<-256
-j if -256≤k<-192
j if -192≤k<0
-j if 0≤k<64
j if 64≤k<256
1 if 256≤k<320
-1 if 320≤k Gamma_k,320 illustrated below is an example obtained by multiplying Gamma_k,320 proposed in method 1 and [1 j j 1] for each 80 MHz bandwidth.

Gamma_k,320=1 if k<-448
-1 if -448≤k<-256
j if -256≤k<-192
-j if -192≤k<0
j if 0≤k<64
-j if 64≤k<256
1 if 256≤k<320
-1 if 320≤k Further, phase rotation applied to an 80 MHz bandwidth, which is optimized in terms of the PAPR of an L-LTF, is [1 j j 1]/[1 -j -j 1] from low-frequency 80 MHz. That is, by multiplying [1 j j 1] or [1 -j -j 1] and Gamma_k,320 proposed in method 1 for each 80 MHz, phase rotation for contiguous 320 MHz may be represented as follows.

Gamma_k,320 illustrated below is an example obtained by multiplying Gamma_k,320 proposed in method 1 and [1 j j 1] for each 80 MHz bandwidth.

Gamma_k,320=1 if k<-448
-1 if -448≤k<-256
j if -256≤k<-192
-j if -192≤k<0
j if 0≤k<64
-j if 64≤k<256
1 if 256≤k<320
-1 if 320≤k Gamma_k,320 illustrated below is an example obtained by multiplying Gamma_k,320 proposed in method 1 and [1 -j -j 1] for each 80 MHz bandwidth.

Gamma_k,320=1 if k<-448
-1 if -448≤k<-256
-j if -256≤k<-192
j if -192≤k<0
-j if 0≤k<64
j if 64≤k<256
1 if 256≤k<320
-1 if 320≤k Method 2 may also be applied to non-contiguous 320 MHz by adjusting subcarrier indices. In the above equation, phase rotation in -512≤k<-256 may be applied to lowest-frequency 80 MHz, phase rotation in -256≤k<0 may be applied to second lowest-frequency 80 MHz, phase rotation in 0≤k<256 may be applied to third lowest-frequency 80 MHz, and phase rotation 256≤k<512 may be applied to highest-frequency 80 MHz.

C) Method 3: Repeating PAPR-Optimizing Phase Rotation Applied for Each 20 MHz Bandwidth and Adding Phase Rotation by 160 MHz Bandwidth in 160 MHz Method 3 is a method for further optimizing a PAPR by applying the same PAPR-optimizing phase rotation applied for each 20 MHz bandwidth and additionally applying phase rotation by a unit of 160 MHz in 160 MHz. Since the unit of 160 MHz is maintained, this method may simplify phase rotation when transmitting a contiguous 320 MHz packet using one RF and when transmitting a contiguous/non-contiguous 320 MHz packet by each 160 MHz using two RFs.

Phase rotation for each 160 MHz bandwidth, which is optimized in terms of PAPR, obtained by applying phase rotation optimized for each 20 MHz bandwidth in a 160 MHz L-STF to an L-STF and an L-LTF of 320 MHz is [1 1] from low-frequency 160 MHz First, phase rotation optimized for each 20 MHz bandwidth in the 160 MHz L-STF may be Gamma_k,160 optimized for the L-STF, defined in C) Method 3 in 1) 160 MHz. Since the entire bandwidth is 320 MHz, Gamma_k,160 may be repeated twice. Further, by multiplying [1 1] and a phase rotation value in which Gamma_k,160 is repeated twice 2 for each 160 MHz bandwidth, phase rotation for contiguous 320 MHz may be represented as follows.

Gamma_k,320=1 if k<-448
-j if -448≤k<-384
1 if -384≤k<-320
-j if -320≤k<-256
-1 if -256≤k<-192
j if -192≤k<-128
-1 if -128≤k<-64
-j if -64≤k<0
1 if 0≤k<64
-j if 64≤k<128
1 if 128≤k<192
-j if 192≤k<256
-1 if 256≤k<320
j if 320≤k<384
-1 if 384≤k<448
-j if 448≤k<512
or
Gamma_k,320=1 if k<-448
j if -448≤k<-384
1 if -384≤k<-320
j if -320≤k<-256
-1 if -256≤k<-192
-j if -192≤k<-128
-1 if -128≤k<-64
j if -64≤k<0
1 if 0≤k<64
j if 64≤k<128
1 if 128≤k<192
j if 192≤k<256
-1 if 256≤k<320

−j if 320≤k<384
−1 if 384≤k<448
j if 448≤k<512
or
Gamma_k,320=1 if k<−448
j if −448≤k<−384
−1 if −384≤k<−320
j if −320≤k<−256
1 if −256≤k<−192
−j if −192≤k<−128
1 if −128≤k<−64
−j if −64≤k<0
1 if 0≤k<64
j if 64≤k<128
−1 if 128≤k<192
j if 192≤k<256
1 if 256≤k<320
−j if 320≤k<384
1 if 384≤k<448
−j if 448≤k<512
or
Gamma_k,320=1 if k<−448
−j if −448≤k<−384
−1 if −384≤k<−320
−j if −320≤k<−256
1 if −256≤k<−192
j if −192≤k<−128
1 if −128≤k<−64
j if −64≤k<0
1 if 0≤k<64
−j if 64≤k<128
−1 if 128≤k<192
−j if 192≤k<256
1 if 256≤k<320
j if 320≤k<384
1 if 384≤k<448
j if 448≤k<512

Phase rotation for each 160 MHz bandwidth, which is optimized in terms of PAPR, obtained by applying phase rotation optimized for each 20 MHz bandwidth in a 160 MHz L-LTF to the L-STF and the L-LTF of 320 MHz is [1 1] from low-frequency 160 MHz First, phase rotation optimized for each 20 MHz bandwidth in the 160 MHz L-LTF may be Gamma_k,160 optimized for the L-LTF, defined in C) Method 3 in 1) 160 MHz. Since the entire bandwidth is 320 MHz, Gamma_k,160 may be repeated twice. Further, by multiplying [1 1] and a phase rotation value in which Gamma_k,160 is repeated twice 2 for each 160 MHz bandwidth, phase rotation for contiguous 320 MHz may be represented as follows.

Gamma_k,320=1 if k<−448
−1 if −448≤k<−384
1 if −384≤k<−320
1 if −320≤k<−256
1 if −256≤k<−192
1 if −192≤k<−128
−1 if −128≤k<−64
−1 if −64≤k<0
1 if 0≤k<64
−1 if 64≤k<128
1 if 128≤k<192
1 if 192≤k<256
1 if 256≤k<320
1 if 320≤k<384
−1 if 384≤k<448
−1 if 448≤k<512
or
Gamma_k,320=1 if k<−448
1 if −448≤k<−384
−1 if −384≤k<−320
−1 if −320≤k<−256
−1 if −256≤k<−192
−1 if −192≤k<−128
1 if −128≤k<−64
−1 if −64≤k<0
1 if 0≤k<64
1 if 64≤k<128
−1 if 128≤k<192
−1 if 192≤k<256
−1 if 256≤k<320
−1 if 320≤k<384
1 if 384≤k<448
−1 if 448≤k<512

Method 3 may also be applied to any type of non-contiguous 320 MHz by adjusting subcarrier indices. In the above equation, phase rotation in −512≤k<−256 may be applied to lowest-frequency 80 MHz, phase rotation in −256≤k<0 may be applied to second lowest-frequency 80 MHz, phase rotation in 0≤k<256 may be applied to third lowest-frequency 80 MHz, and phase rotation 256≤k<512 may be applied to highest-frequency 80 MHz. However, the PAPR is not always optimal in all cases.

D) Method 4: PAPR-Optimizing Phase Rotation Applied for Each 20 MHz Bandwidth

Method 3 is PAPR-optimizing phase rotation applied for each 20 MHz bandwidth when a contiguous 240 MHz packet is transmitted using one RF and is described as follows. Method 3 may also be applied to non-contiguous 240 MHz by adjusting subcarrier indices (i.e., in the following equation, phase rotation in −512≤k<−256 may be applied to lowest-frequency 80 MHz, phase rotation in −256≤k<0 may be applied to second lowest-frequency 80 MHz, phase rotation in 0k<256 may be applied to third lowest-frequency 80 MHz, and phase rotation 256≤k<512 may be applied to highest-frequency 80 MHz) but may not be optimal in terms of PAPR.

Optimized phase rotation for an L-STF is as follows.
Gamma_k,320=1 if k<−448
1 if −448≤k<−384
1 if −384≤k<−320
j if −320≤k<−256
j if −256≤k<−192
1 if −192≤k<−128
1 if −128≤k<−64
−j if −64≤k<0
1 if 0≤k<64
−1 if 64≤k<128
−1 if 128≤k<192
1 if 192≤k<256
−1 if 256≤k<320
j if 320≤k<384
−j if 384≤k<448
1 if 448≤k<512
or
Gamma_k,320=1 if k<−448
1 if −448≤k<−384
1 if −384≤k<−320
−j if −320≤k<−256
−j if −256≤k<−192
1 if −192≤k<−128
1 if −128≤k<−64
j if −64≤k<0
1 if 0≤k<64
−1 if 64≤k<128

−1 if 128≤k<192
1 if 192≤k<256
−1 if 256≤k<320
−j if 320≤k<384
j if 384≤k<448
1 if 448≤k<512
Optimized phase rotation for an L-LTF is as follows.
Gamma_k,320=1 if k<−448
j if −448≤k<−384
−1 if −384≤k<−320
1 if −320≤k<−256
j if −256≤k<−192
j if −192≤k<−128
−1 if −128≤k<−64
−1 if −64≤k<0
1 if 0≤k<64
−j if 64≤k<128
1 if 128≤k<192
−j if 192≤k<256
−1 if 256≤k<320
−1 if 320≤k<384
j if 384≤k<448
−j if 448≤k<512
or
Gamma_k,320=1 if k<−448
−j if −448≤k<−384
−1 if −384≤k<−320
1 if −320≤k<−256
−j if −256≤k<−192
−j if −192≤k<−128
−1 if −128≤k<−64
−1 if −64≤k<0
1 if 0≤k<64
j if 64≤k<128
1 if 128≤k<192
j if 192≤k<256
−1 if 256≤k<320
−1 if 320≤k<384
−j if 384≤k<448
j if 448≤k<512
or
Gamma_k,320=1 if k<−448
−1 if −448≤k<−384
−j if −384≤k<−320
−j if −320≤k<−256
1 if −256≤k<−192
j if −192≤k<−128
1 if −128≤k<−64
j if −64≤k<0
−j if 0≤k<64
−j if 64≤k<128
−1 if 128≤k<192
−1 if 192≤k<256
j if 256≤k<320
−j if 320 k<384
−1 if 384≤k<448
j if 448≤k<512
or
Gamma_k,320=1 if k<−448
−1 if −448≤k<−384
j if −384≤k<−320
j if −320≤k<−256
1 if −256≤k<−192
−j if −192≤k<−128
1 if −128≤k<−64
−j if −64≤k<0
j if 0≤k<64 j if 64≤k<128
−1 if 128≤k<192
−1 if 192≤k<256
−j if 256≤k<320
j if 320≤k<384
−1 if 384≤k<448
−j if 448≤k<512

E) Method 5: Phase Rotation Applied for Each 20 MHz Bandwidth, which Secures High Performance in L-STF and L-LTF Method 5 is phase rotation applied for each 20 MHz bandwidth, which secures an optimal PAPR of an L-STF and an L-LTF when a contiguous 320 MHz packet is transmitted using one RF and is described as follows. Method 5 may also be applied to non-contiguous 320 MHz by adjusting subcarrier indices (i.e., in the following equation, phase rotation in −512≤k<−256 may be applied to lowest-frequency 80 MHz, phase rotation in −256≤k<0 may be applied to second lowest-frequency 80 MHz, phase rotation in 0k<256 may be applied to third lowest-frequency 80 MHz, and phase rotation 256≤k<512 may be applied to highest-frequency 80 MHz) but may not be optimal in terms of PAPR.

A first phase rotation option is as follows.
Gamma_k,320=1 if k<−448
−j if −448≤k<−384
−j if −384≤k<−320
−1 if −320≤k<−256
−j if −256≤k<−192
−1 if −192≤k<−128
j if −128≤k<−64
1 if −64≤k<0
−1 if 0≤k<64
−j if 64≤k<128
1 if 128≤k<192
j if 192≤k<256
1 if 256≤k<320
j if 320≤k<384
j if 384≤k<448
−1 if 448≤k<512

A second phase rotation option is as follows.
Gamma_k,320=1 if k<−448
j if −448≤k<−384
j if −384≤k<−320
−1 if −320≤k<−256
j if −256≤k<−192
−1 if −192≤k<−128
−j if −128≤k<−64
1 if −64≤k<0
−1 if 0≤k<64
j if 64≤k<128
1 if 128≤k<192
−j if 192≤k<256
1 if 256≤k<320
−j if 320≤k<384
−j if 384≤k<448
−1 if 448≤k<512

B. PAPR

When the various phase rotations proposed above are applied to contiguous 160/240/320 MHz, the PAPR of an L-STF/L-LTF/L-SIG is as follows. Since the content of the L-SIG is a random bit and BPSK is used, the PAPR is calculated by performing generation 100 times and applying phase rotation to each generation, thereby obtaining a CDF.

1) Contiguous 160 MHz

Table 12 illustrates the PAPRs when 20 MHz is simply repeated without using phase rotation.

TABLE 12

| L-STF | L-LTF |
|---|---|
| 11.1203 | 12.1967 |

Figure 16:
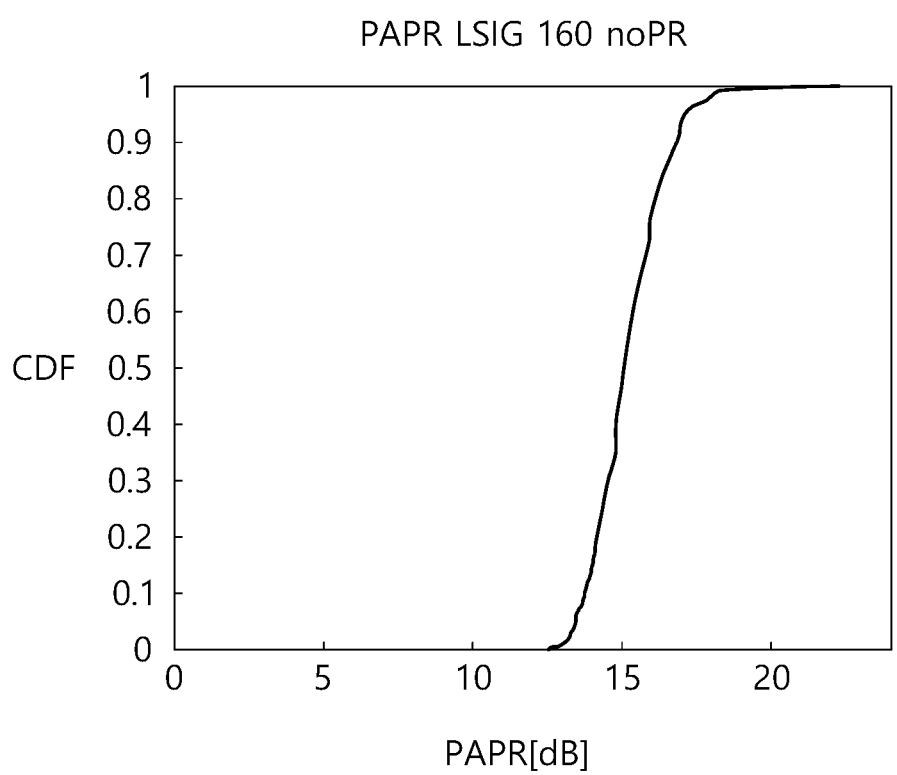
FIG. 16 illustrates the PAPR of an L-SIG in contiguous 160 MHz to which phase rotation is not applied.

FIG. 16 illustrates the PAPR of the L-SIG in contiguous 160 MHz to which phase rotation is not applied. Table 13 illustrates the PAPRs in a contiguous case when phase rotation 1 illustrated below is used.

Gamma_k,160=1 if k<−192
−1 if −192≤k<0
1 if 0≤k<64
−1 if 64≤k

TABLE 13

| L-STF | L-LTF |
|---|---|
| 5.9144 | 6.4716 |

Figure 17:
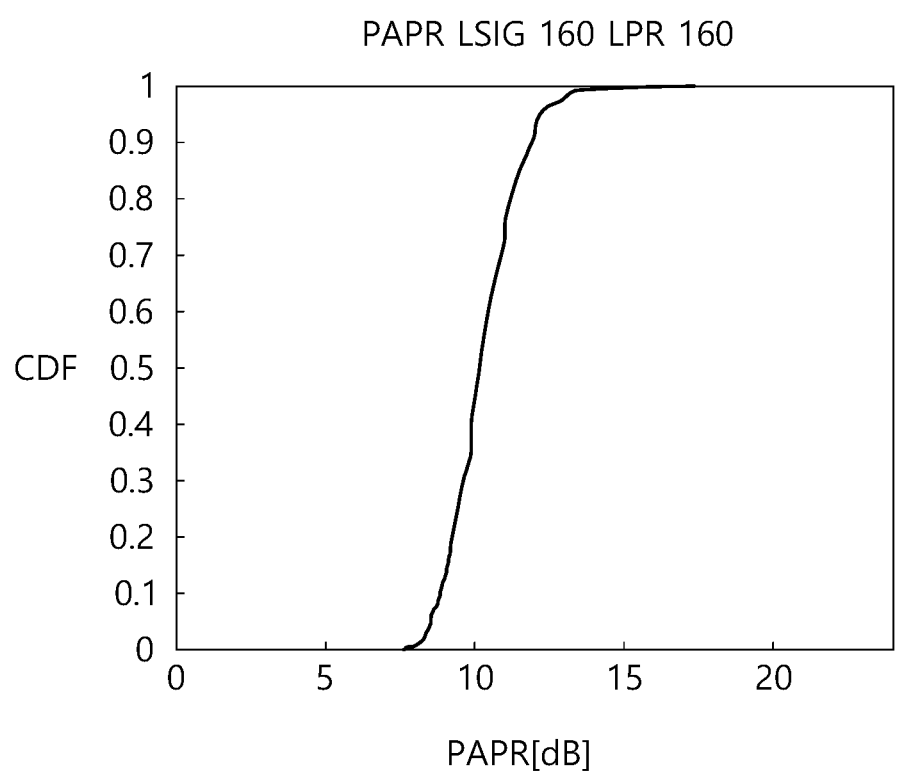
FIG. 17 illustrates the PAPR of an L-SIG in contiguous 160 MHz to which phase rotation 1 is applied.

FIG. 17 illustrates the PAPR of the L-SIG in contiguous 160 MHz to which phase rotation 1 is applied. Table 14 illustrates the PAPRs in a contiguous case when phase rotation 2 illustrated below is used.

Gamma_k,160=1 if k<−192
−j if −192≤k<−128
1 if −128≤k<−64
−j if −64≤k<0
−1 if 0≤k<64
j if 64≤k<128
−1 if 128≤k<192
−j if 192≤k
or
Gamma__k,160=1 if k<−192
j if −192≤k<−128
1 if −128≤k<−64
j if −64≤k<0
−1 if 0≤k<64
−j if 64≤k<128
−1 if 128≤k<192
j if 192≤k
or
Gamma_k, 160=1 if k<−192
j if −192≤k<−128
−1 if −128≤k<−64
j if −64≤k<0
1 if 0≤k<64
−j if 64≤k<128
1 if 128≤k<192
−j if 192≤k
or
Gamma_k,160=1 if k<−192
−j if −192≤k<−128
−1 if −128≤k<−64
−j if −64≤k<0
1 if 0≤k<64
j if 64≤k<128
1 if 128≤k<192
j if 192≤k

TABLE 14

| L-STF | L-LTF |
|---|---|
| 4.2755 | 5.3516 |

Figure 18:
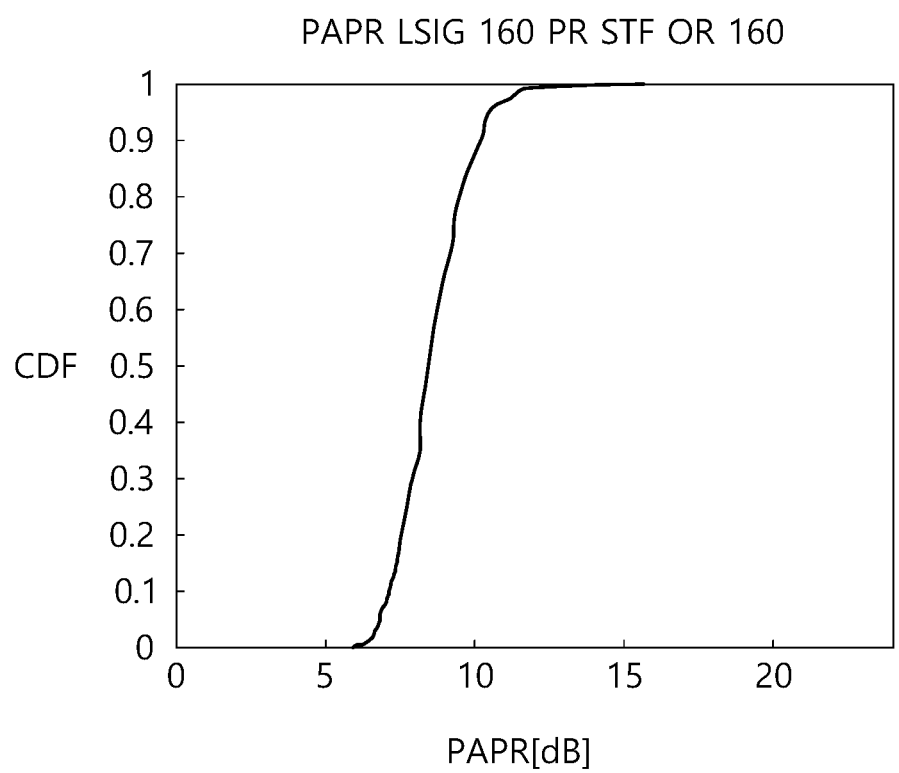
FIG. 18 illustrates the PAPR of an L-SIG in contiguous 160 MHz to which phase rotation 2 is applied.

FIG. 18 illustrates the PAPR of the L-SIG in contiguous 160 MHz to which phase rotation 2 is applied. Table 15 illustrates the PAPRs in a contiguous case iWhen phase rotation 3 illustrated below is used.

Gamma_k, 160=1 if k<−192
−1 if −192≤k<−128
1 if −128≤k<−64
1 if −64≤k<0
1 if 0≤k<64
1 if 64≤k<128
−1 if 128≤k<192
−1 if 192≤k
or
Gamma_k,160=1 if k<−192
1 if −192≤k<−128
−1 if −128≤k<−64
−1 if −64≤k<0
−1 if 0≤k<64
−1 if 64≤k<128
1 if 128≤k<192
−1 if 192≤k

TABLE 15

| L-STF | L-LTF |
|---|---|
| 4.3383 | 5.0715 |

Figure 19:
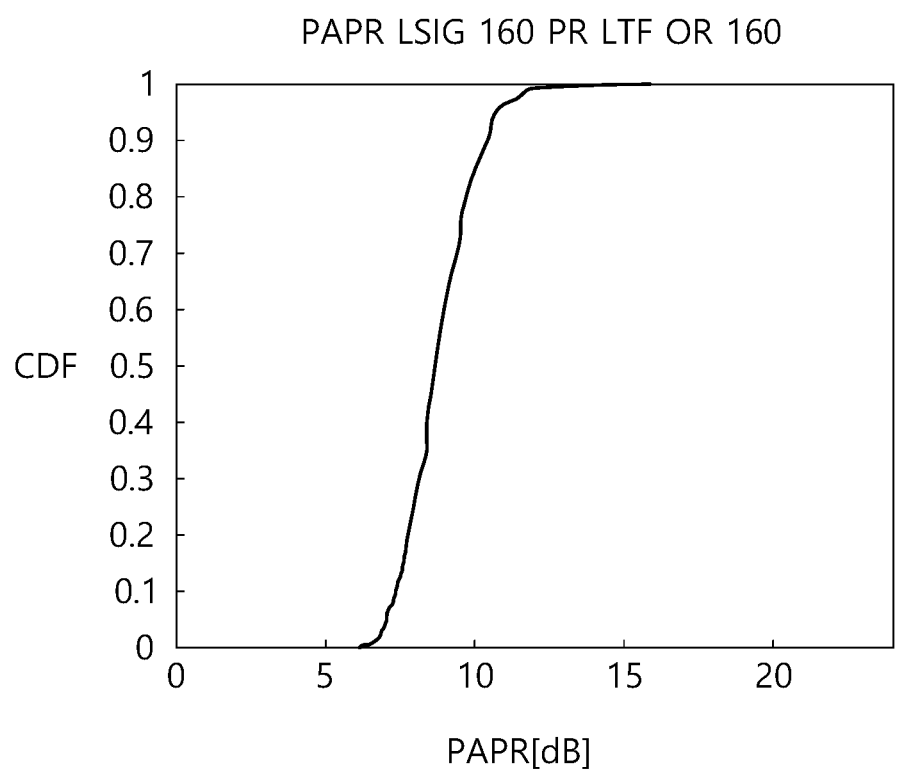
FIG. 19 illustrates the PAPR of an L-SIG in contiguous 160 MHz to which phase rotation 3 is applied.

FIG. 19 illustrates the PAPR of the L-SIG in contiguous 160 MHz to which phase rotation 3 is applied. As shown in the above results, the PAPRs are significantly unfavorable in the simple repetition. Therefore, phase rotation is required, and the option of repeating the existing 11ax 80 MHz phase rotation may be preferable in terms of application in a non-contiguous case and in terms of PAPR. Phase rotation optimized in terms of PAPR for each 20 MHz bandwidth enables an optimal PAPR, but may not be suitable in terms of PAPR in each RF when transmission is performed using a plurality of RFs. If contiguous 160 MHz transmission is performed in view of one RF, using phase rotation optimized for the L-LTF among the phase rotation methods optimized in terms of PAPR for each 20 MHz bandwidth may be most favorable in order to minimize the maximum PAPR. Further, the option of repeating the 11ax 80 MHz phase rotation may be preferable in view of STAs having various capabilities to perform contiguous/non-contiguous 160 MHz transmission using one RF and a plurality of RFs.

2) Contiguous 240 MHz

Table 16 illustrates the PAPRs when 20 MHz is simply repeated without using phase rotation.

TABLE 16

| L-STF | L-LTF |
|---|---|
| 12.8812 | 13.9576 |

Figure 20:
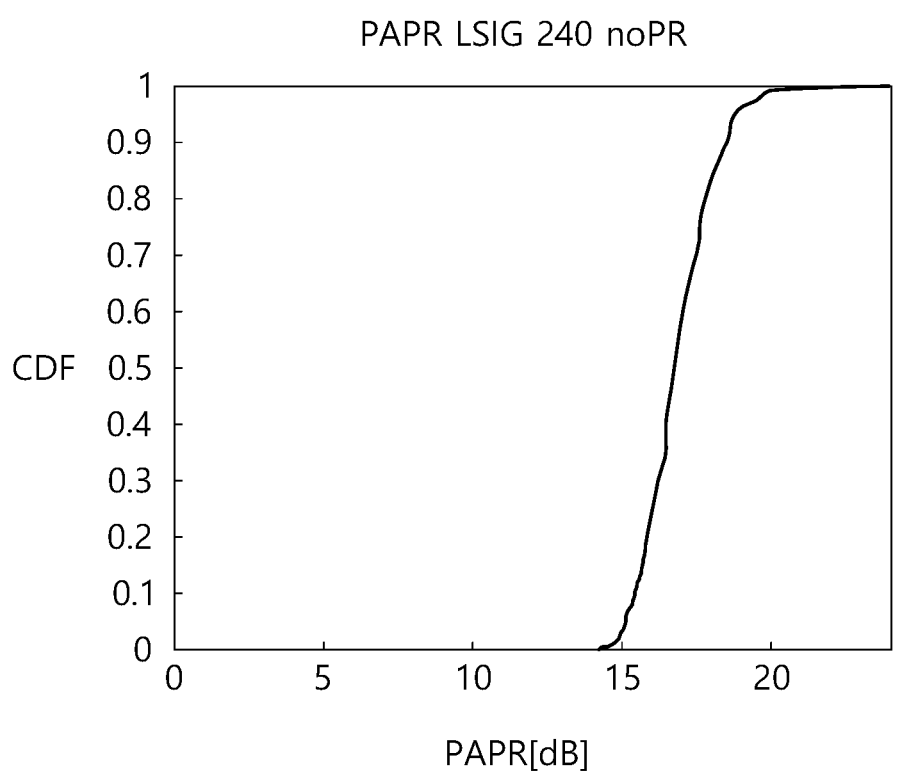
FIG. 20 illustrates the PAPR of an L-SIG in contiguous 240 MHz to which phase rotation is not applied.

FIG. 20 illustrates the PAPR of the L-SIG in contiguous 240 MHz to which phase rotation is not applied. Table 17 illustrates the PAPRs in a contiguous case when phase rotation 4 illustrated below is used.

Gamma_k,240=1 if k<−320
−1 if −320≤k<−128
1 if −128≤k<−64
−1 if −64≤k<128
1 if 128≤k<192
−1 if 192≤k

TABLE 17

| L-STF | L-LTF |
|---|---|
| 7.1712 | 7.9370 |

Figure 21:
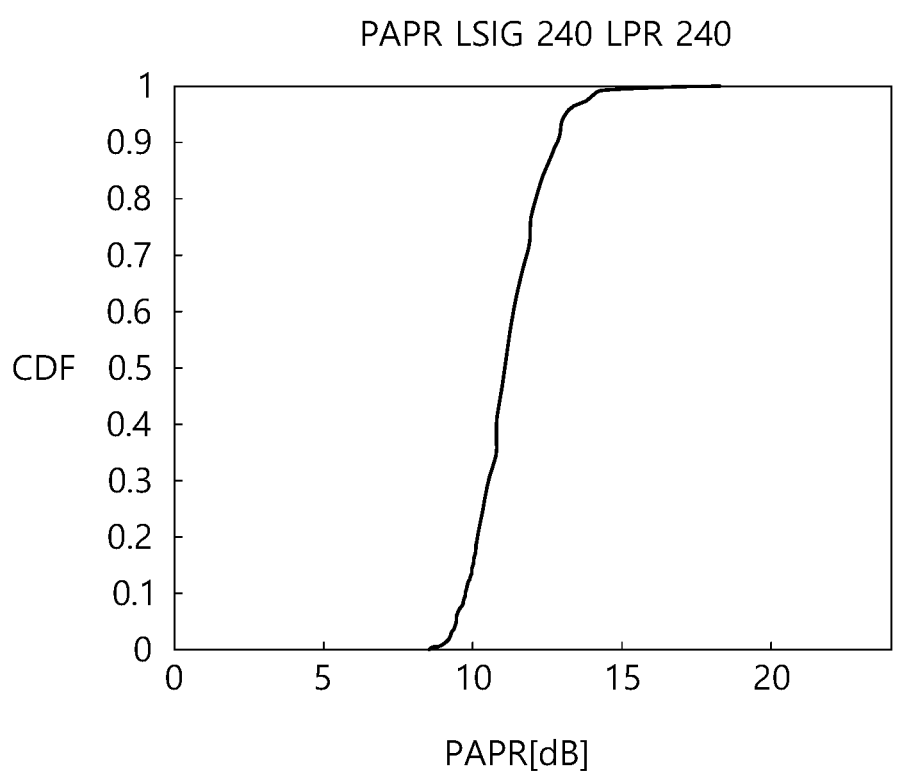
FIG. 21 illustrates the PAPR of an L-SIG in contiguous 240 MHz to which phase rotation 4 is applied.

FIG. 21 illustrates the PAPR of the L-SIG in contiguous 240 MHz to which phase rotation 4 is applied. Table 18 illustrates the PAPRs in a contiguous case when phase rotation 5 illustrated below is used.

Gamma_k,240=1 if k<−320
−1 if −320≤k<−128
1 if −128≤k<−64
−1 if −64≤k<128
−1 if 128≤k<192
1 if 192≤k
or
Gamma_k,240=1 if k<−320
−1 if −320≤k<−128
−1 if −128≤k<−64
1 if −64≤k<128
−1 if 128≤k<192
1 if 192≤k

TABLE 18

| L-STF | L-LTF |
|---|---|
| 6.5568 | 7.2900 |

Figure 22:
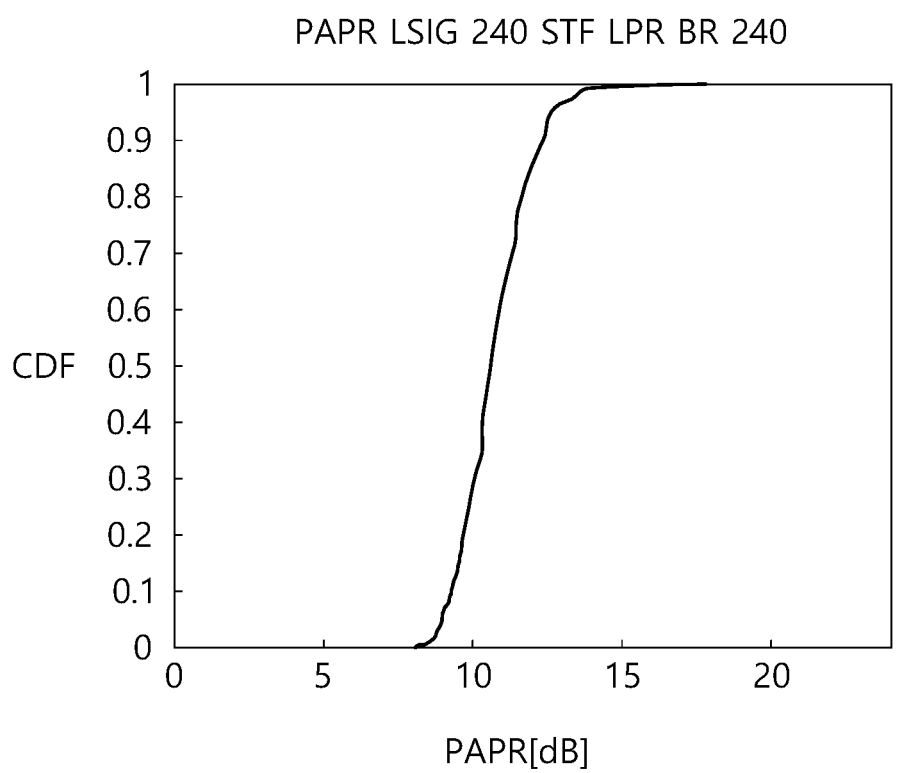
FIG. 22 illustrates the PAPR of an L-SIG in contiguous 240 MHz to which phase rotation 5 is applied.

FIG. 22 illustrates the PAPR of the L-SIG in contiguous 240 MHz to which phase rotation 5 is applied. Table 19 illustrates the PAPRs in a contiguous case when phase rotation 6 illustrated below is used.

Gamma_k,240=1 if k<−320
j if −320≤k<−256
−1 if −256≤k<−192
−j if −192≤k<−128
1 if −128≤k<−64
−j if −64≤k<0
1 if 0≤k<64
−j if 64≤k<128
1 if 128≤k<192
−j if 192≤k<256
−1 if 256≤k<320
j if 320≤k
or
Gamma_k,240=1 if k<−320
−j if −320≤k<−256
−1 if −256≤k<−192
j if −192≤k<−128
1 if −128≤k<−64
j if −64≤k<0
1 if 0≤k<64
j if 64≤k<128
1 if 128≤k<192
j if 192≤k<256
−1 if 256≤k<320
−j if 320≤k

TABLE 19

| L-STF | L-LTF |
|---|---|
| 4.2242 | 5.3003 |

Figure 23:
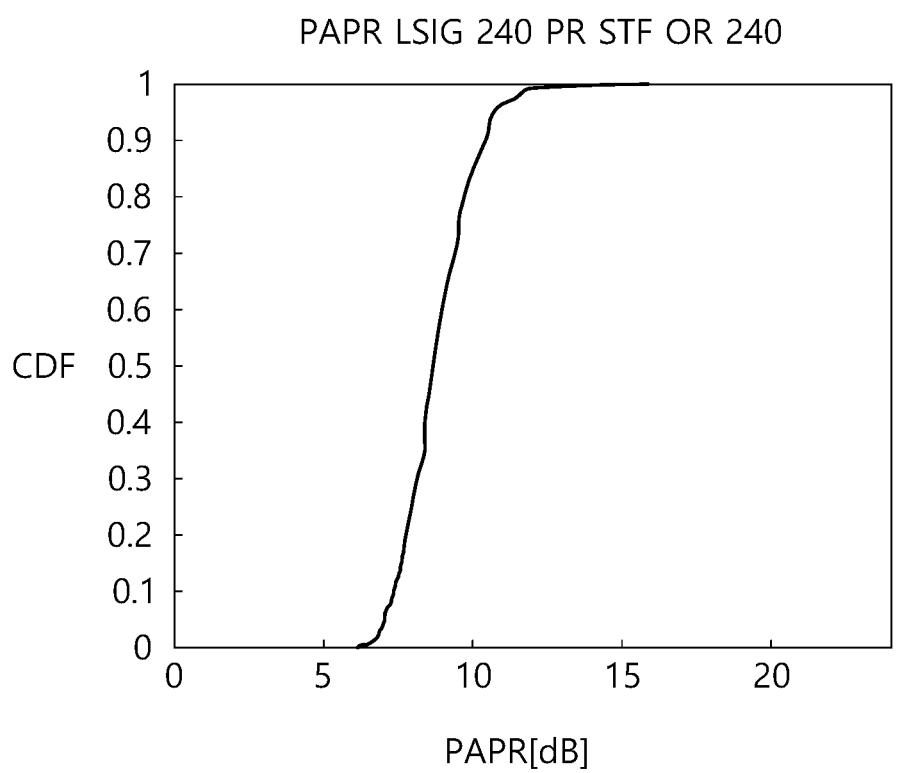
FIG. 23 illustrates the PAPR of an L-SIG in contiguous 240 MHz to which phase rotation 6 is applied.

FIG. 23 illustrates the PAPR of the L-SIG in contiguous 240 MHz to which phase rotation 6 is applied. Table 20 illustrates the PAPRs in a contiguous case when phase rotation 7 illustrated below is used.

Gamma_k,240=1 if k<−320
1 if −320≤k<−256
1 if −256≤k<−192
1 if −192≤k<−128
−1 if −128≤k<−64
−1 if −64≤k<0
1 if 0≤k<64
1 if 64≤k<128
−1 if 128≤k<192
1 if 192≤k<256
−1 if 256≤k<320
1 if 320≤k
or
Gamma_k,240=1 if k<−320
−1 if −320≤k<−256
1 if −256≤k<−192
−1 if −192≤k<−128
1 if −128≤k<−64
1 if −64≤k<0
−1 if 0≤k<64
−1 if 64≤k<128
1 if 128≤k<192
1 if 192≤k<256
1 if 256≤k<320
1 if 320≤k

TABLE 20

| L-STF | L-LTF |
|---|---|
| 4.2870 | 5.0260 |

Figure 24:
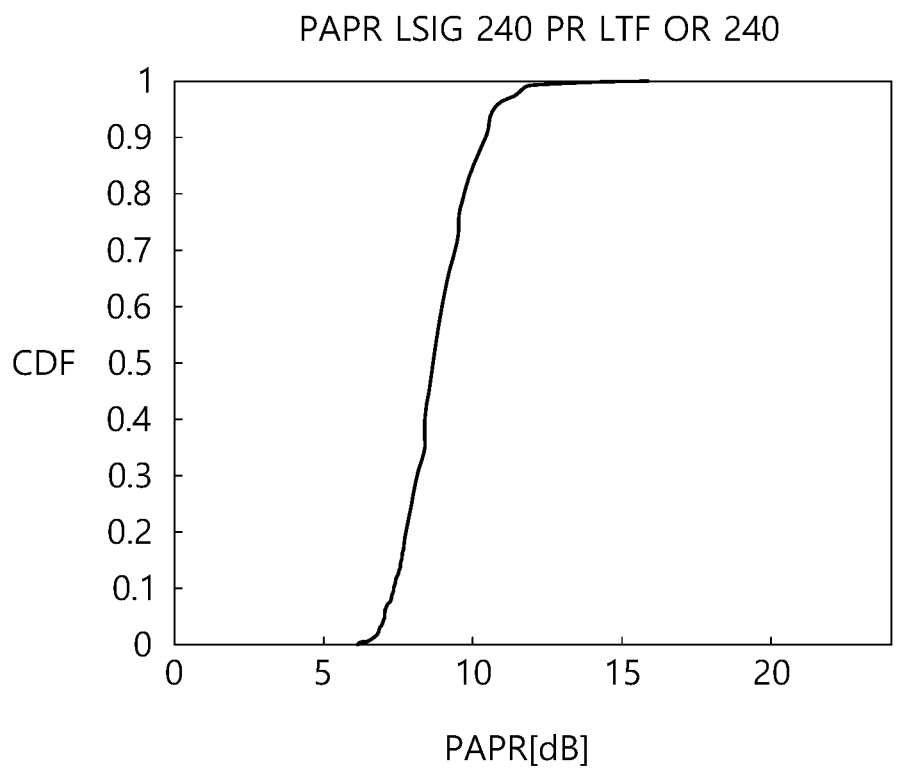
FIG. 24 illustrates the PAPR of an L-SIG in contiguous 240 MHz to which phase rotation 7 is applied.

FIG. 24 illustrates the PAPR of the L-SIG in contiguous 240 MHz to which phase rotation 7 is applied.

As shown in the above results, the PAPRs are significantly unfavorable in the simple repetition. Therefore, phase rotation is required, and the option of repeating existing 11ax 80 MHz phase rotation and applying additional phase rotation for each 80 MHz bandwidth may be preferable in terms of application in a non-contiguous case and in terms of PAPR. Phase rotation optimized in terms of PAPR for each 20 MHz bandwidth enables an optimal PAPR, but may not be suitable in terms of PAPR in each RF when transmission is performed using a plurality of RFs. If contiguous 240 MHz transmission is performed in view of one RF, using phase rotation optimized for the L-LTF among the phase rotation methods optimized in terms of PAPR for each 20 MHz bandwidth may be most favorable in order to minimize the maximum PAPR. Further, the option of repeating the 11ax 80 MHz phase rotation and applying the additional phase rotation for each 80 MHz bandwidth may be preferable in view of STAs having various capabilities to perform contiguous/non-contiguous 240 MHz transmission using one RF and a plurality of RFs.

3) Contiguous 320 MHz

Table 21 illustrates the PAPRs when 20 MHz is simply repeated without using phase rotation.

TABLE 21

| L-STF | L-LTF |
|---|---|
| 14.1306 | 15.2070 |

Figure 25:
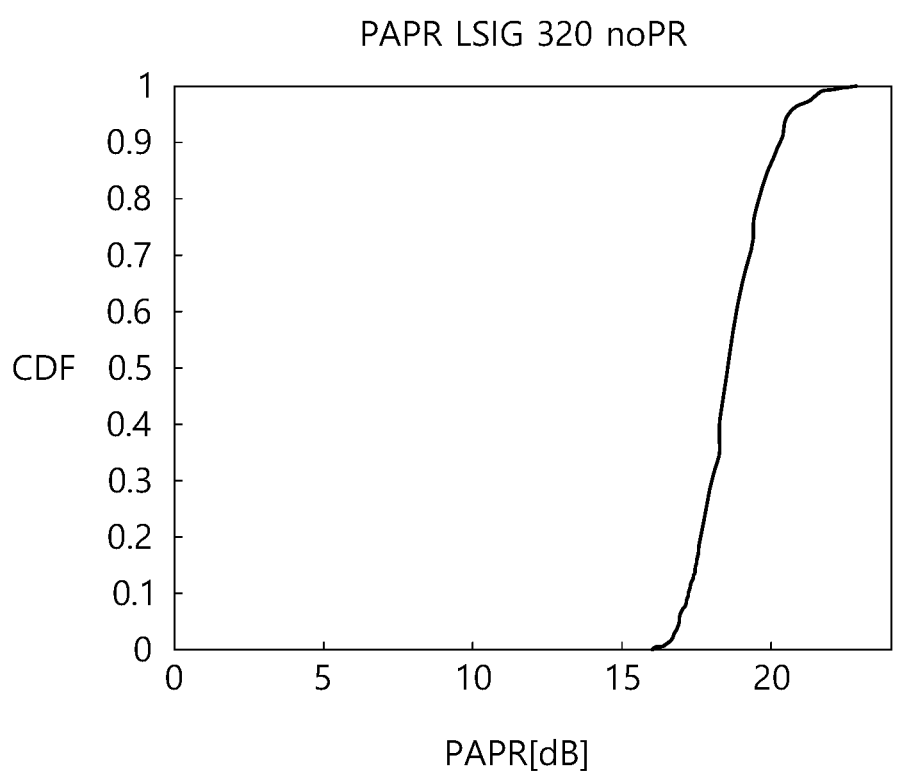
FIG. 25 illustrates the PAPR of an L-SIG in contiguous 320 MHz to which phase rotation is not applied.

FIG. 25 illustrates the PAPR of the L-SIG in contiguous 320 MHz to which phase rotation is not applied. Table 22 illustrates the PAPRs in a contiguous case when phase rotation 8 illustrated below is used.

Gamma_k,320=1 if k<−448
−1 if −448≤k<−256
1 if −256≤k<−192
−1 if −192≤k<0
1 if 0≤k<64
−1 if 64≤k<256
1 if 256≤k<320
−1 if 320≤k

TABLE 22

| L-STF | L-LTF |
|---|---|
| 8.2600 | 9.1864 |

FIG. 26 illustrates the PAPR of the L-SIG in contiguous 320 MHz to which phase rotation 8 is applied. Table 23 illustrates the PAPRs in a contiguous case when phase rotation 9 illustrated below is used.

Gamma_k,320=1 if k<−448
−1 if −448≤k<−256
−j if −256≤k<−192
j if −192≤k<0
−j if 0≤k<64
j if 64≤k<256
1 if 256≤k<320
−1 if 320≤k

TABLE 23

| L-STF | L-LTF |
|---|---|
| 5.5493 | 6.3714 |

Figure 27:
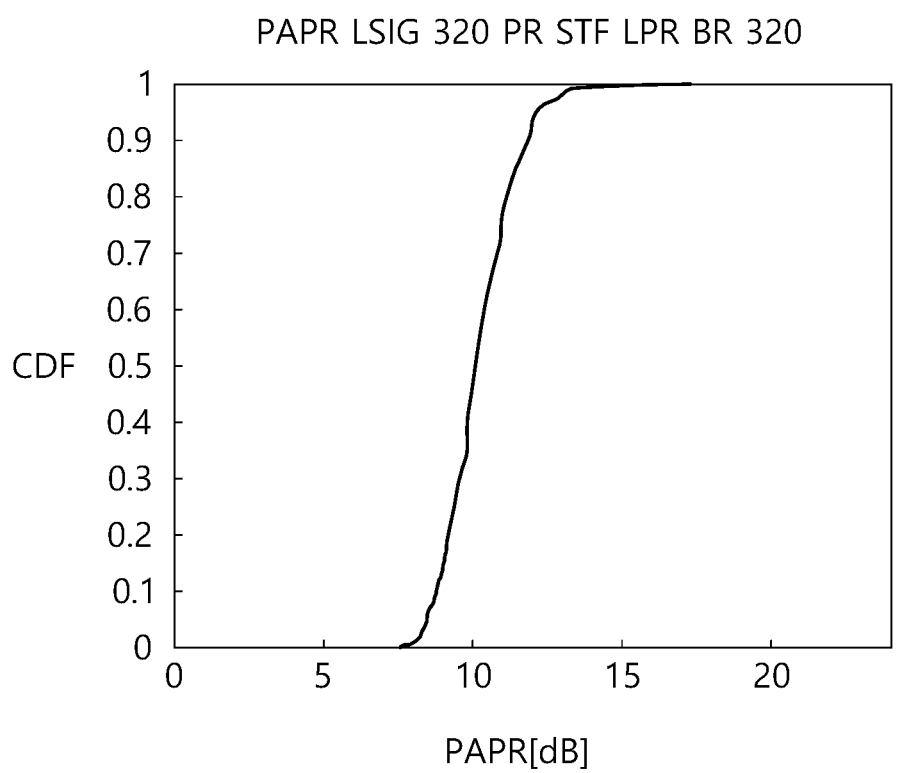
FIG. 27 illustrates the PAPR of an L-SIG in contiguous 320 MHz to which phase rotation 9 is applied.

FIG. 27 illustrates the PAPR of the L-SIG in contiguous 320 MHz to which phase rotation 9 is applied. Table 24 illustrates the PAPRs in a contiguous case when phase rotation 10 illustrated below is used.

Gamma_k,320=1 if k<−448
−1 if −448≤k<−256
j if −256≤k<−192
−j if −192≤k<0
j if 0≤k<64
−j if 64≤k<256
1 if 256≤k<320
−1 if 320≤k

TABLE 24

| L-STF | L-LTF |
|---|---|
| 5.5493 | 6.3714 |

Figure 28:
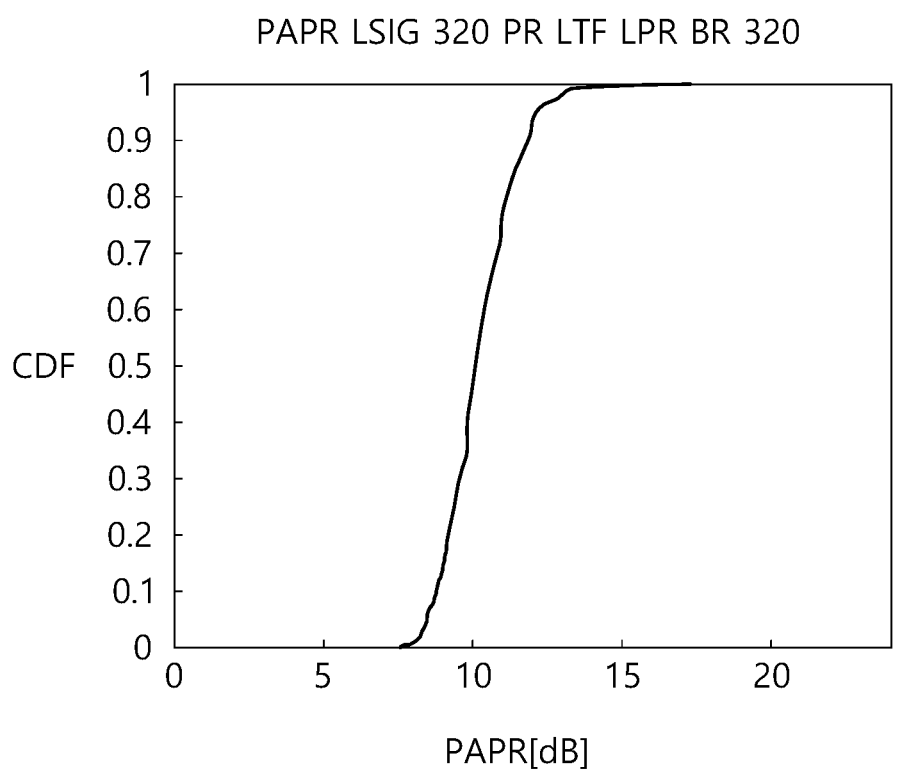
FIG. 28 illustrates the PAPR of an L-SIG in contiguous 320 MHz to which phase rotation 10 is applied.

FIG. 28 illustrates the PAPR of the L-SIG in contiguous 320 MHz to which phase rotation 10 is applied. Table 24 illustrates the PAPRs in a contiguous case when phase rotation 11 illustrated below is used.

Gamma_k,320=1 if k<−448
−j if −448≤k<−384
1 if −384≤k<−320
−j if −320≤k<−256
−1 if −256≤k<−192
j if −192≤k<−128
−1 if −128≤k<−64
−j if −64≤k<0
1 if 0≤k<64
−j if 64≤k<128
1 if 128≤k<192
−j if 192≤k<256
−1 if 256≤k<320
j if 320≤k<384
−1 if 384≤k<448
−j if 448≤k<512
or
Gamma_k,320=1 if k<−448
j if −448≤k<−384
1 if −384≤k<−320
j if −320≤k<−256
−1 if −256≤k<−192
−j if −192≤k<−128
−1 if −128≤k<−64
j if −64≤k<0
1 if 0≤k<64
j if 64≤k<128
1 if 128≤k<192
j if 192≤k<256
−1 if 256≤k<320
−j if 320≤k<384
−1 if 384≤k<448
j if 448≤k<512
or
Gamma_k,320=1 if k<−448
j if −448≤k<−384
−1 if −384≤k<−320
j if −320≤k<−256
1 if −256≤k<−192
−j if −192≤k<−128
1 if −128≤k<−64
−j if −64≤k<0
1 if 0≤k<64
j if 64≤k<128
−1 if 128≤k<192
j if 192≤k<256
1 if 256≤k<320
−j if 320≤k<384
1 if 384≤k<448
−j if 448≤k<512
or
Gamma_k,320=1 if k<−448
−j if −448≤k<−384
−1 if −384≤k<−320
−j if −320≤k<−256
1 if −256≤k<−192
j if −192≤k<−128
1 if −128≤k<−64
j if −64≤k<0
1 if 0≤k<64
−j if 64≤k<128
−1 if 128≤k<192
−j if 192≤k<256
1 if 256≤k<320
j if 320≤k<384
1 if 384≤k<448
j if 448≤k<512

TABLE 25

| L-STF | L-LTF |
|---|---|
| 6.9208 | 7.8822 |

Figure 29:
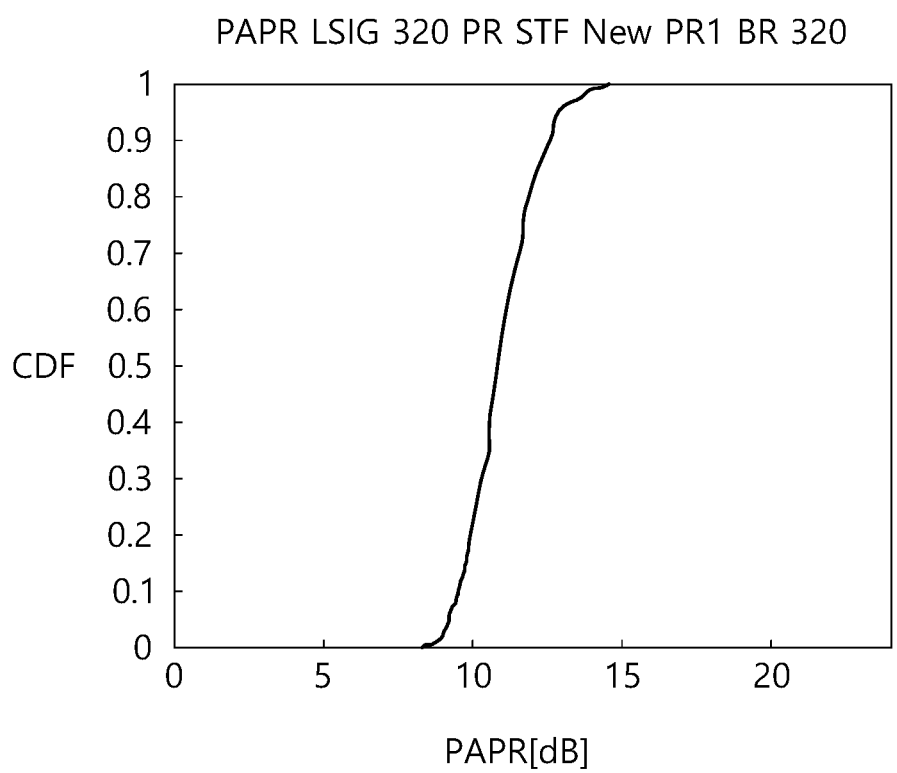
FIG. 29 illustrates the PAPR of an L-SIG in contiguous 320 MHz to which phase rotation 11 is applied.

FIG. 29 illustrates the PAPR of the L-SIG in contiguous 320 MHz to which phase rotation 11 is applied. Table 26 illustrates the PAPRs in a contiguous case when phase rotation 12 illustrated below is used.

Gamma_k,320=1 if k<−448
−1 if −448≤k<−384
1 if −384≤k<−320
1 if −320≤k<−256
1 if −256≤k<−192
1 if −192≤k<−128
−1 if −128≤k<−64
−1 if −64≤k<0
1 if 0≤k<64
−1 if 64≤k<128
1 if 128≤k<192
1 if 192≤k<256
1 if 256≤k<320
1 if 320≤k<384
−1 if 384≤k<448
−1 if 448≤k<512
or
Gamma_k,320=1 if k<−448
1 if −448≤k<−384
−1 if −384≤k<−320
−1 if −320≤k<−256
−1 if −256≤k<−192
−1 if −192≤k<−128
1 if −128≤k<−64
−1 if −64≤k<0
1 if 0≤k<64
1 if 64≤k<128
−1 if 128≤k<192
−1 if 192≤k<256
−1 if 256≤k<320
−1 if 320≤k<384
1 if 384≤k<448
−1 if 448≤k<512

TABLE 26

| L-STF | L-LTF |
|---|---|
| 6.9208 | 7.8822 |

Figure 30:
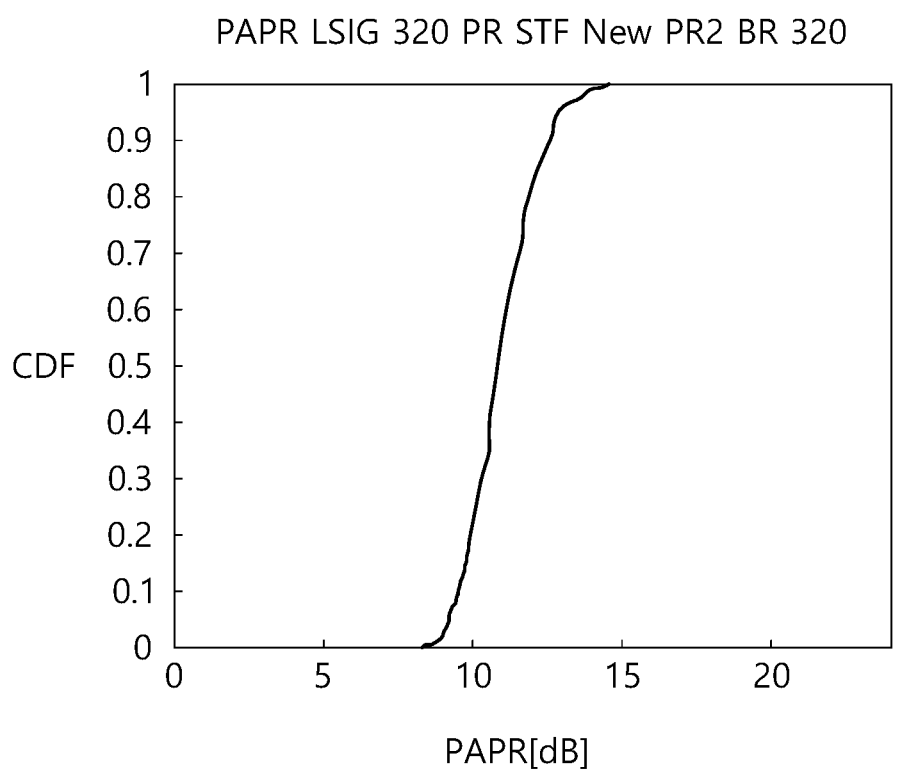
FIG. 30 illustrates the PAPR of an L-SIG in contiguous 320 MHz to which phase rotation 12 is applied.

FIG. 30 illustrates the PAPR of the L-SIG in contiguous 320 MHz to which phase rotation 12 is applied. Table 27 illustrates the PAPRs in a contiguous case when phase rotation 13 illustrated below is used.

Gamma_k,320=1 if k<−448
1 if −448≤k<−384
1 if −384≤k<−320
j if −320≤k<−256
j if −256≤k<−192
1 if −192≤k<−128
1 if −128≤k<−64
−j if −64≤k<0
1 if 0≤k<64
−1 if 64≤k<128
−1 if 128≤k<192
1 if 192≤k<256
−1 if 256≤k<320
j if 320≤k<384
−j if 384≤k<448
1 if 448≤k<512
or
Gamma_k,320=1 if k<−448
1 if −448≤k<−384
1 if −384≤k<−320
−j if −320≤k<−256
−j if −256≤k<−192
1 if −192≤k<−128
1 if −128≤k<−64
j if −64≤k<0
1 if 0≤k<64
−1 if 64≤k<128
−1 if 128≤k<192
1 if 192≤k<256
−1 if 256≤k<320
−j if 320≤k<384
j if 384≤k<448
1 if 448≤k<512

TABLE 27

| L-STF | L-LTF |
|---|---|
| 4.2429 | 5.4333 |

Figure 31:
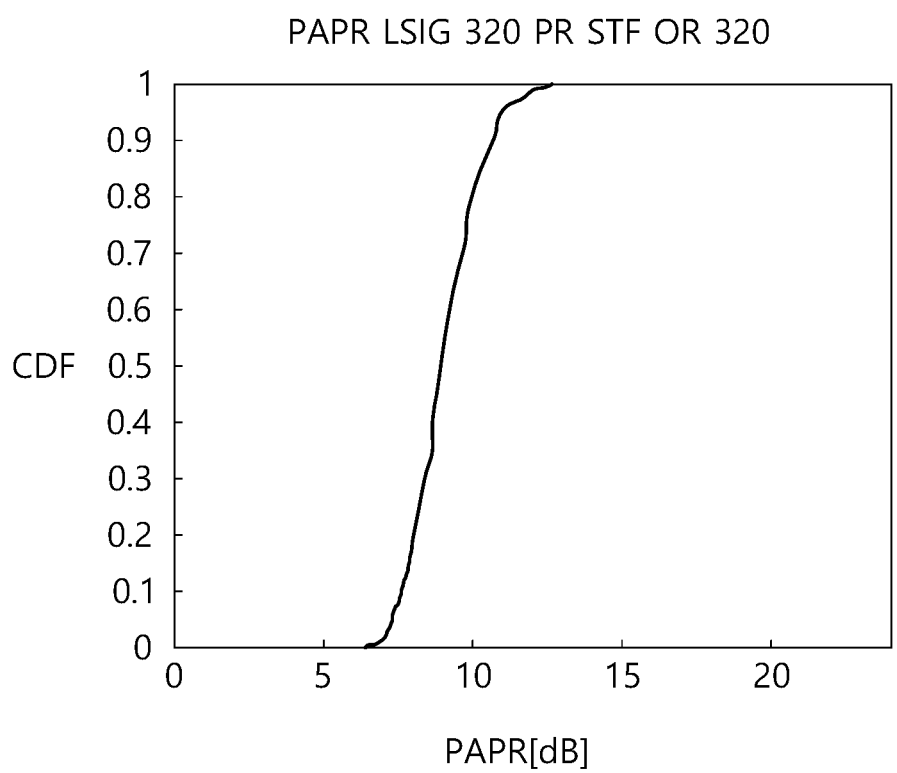
FIG. 31 illustrates the PAPR of an L-SIG in contiguous 320 MHz to which phase rotation 13 is applied.

FIG. 31 illustrates the PAPR of the L-SIG in contiguous 320 MHz to which phase rotation 13 is applied. Table 28 illustrates the PAPRs in a contiguous case when phase rotation 14 illustrated below is used.

Gamma_k,320=1 if k<−448
j if −448≤k<−384
−1 if −384≤k<−320
1 if −320≤k<−256
j if −256≤k<−192
j if −192≤k<−128
−1 if −128≤k<−64
−1 if −64≤k<0
1 if 0≤k<64
−j if 64≤k<128
1 if 128≤k<192
−j if 192≤k<256
−1 if 256≤k<320
−1 if 320≤k<384
j if 384≤k<448
−j if 448≤k<512
or
Gamma_k,320=1 if k<−448
−j if −448≤k<−384
−1 if −384≤k<−320
1 if −320≤k<−256
−j if −256≤k<−192
−j if −192≤k<−128
−1 if −128≤k<−64
−1 if −64≤k<0
1 if 0≤k<64
j if 64≤k<128
1 if 128≤k<192
j if 192≤k<256
−1 if 256≤k<320
−1 if 320≤k<384
−j if 384≤k<448
j if 448≤k<512
or
Gamma_k,320=1 if k<−448
−1 if −448≤k<−384
−j if −384≤k<−320
−j if −320≤k<−256
1 if −256≤k<−192
j if −192≤k<−128
1 if −128≤k<−64
j if −64≤k<0

−j if 0≤k<64
−j if 64≤k<128
−1 if 128≤k<192
−1 if 192≤k<256
j if 256≤k<320
−j if 320≤k<384
−1 if 384≤k<448
j if 448≤k<512
or
Gamma_k,320=1 if k<−448
−1 if −448≤k<−384
j if −384≤k<−320
j if −320≤k<−256
1 if −256≤k<−192
−j if −192≤k<−128
1 if −128≤k<−64
−j if −64≤k<0
j if 0≤k<64
j if 64≤k<128
−1 if 128≤k<192
−1 if 192≤k<256
−j if 256≤k<320
j if 320≤k<384
−1 if 384≤k<448
−j if 448≤k<512

TABLE 28

| L-STF | L-LTF |
|---|---|
| 4.4262 | 5.1594 |

Figure 32:
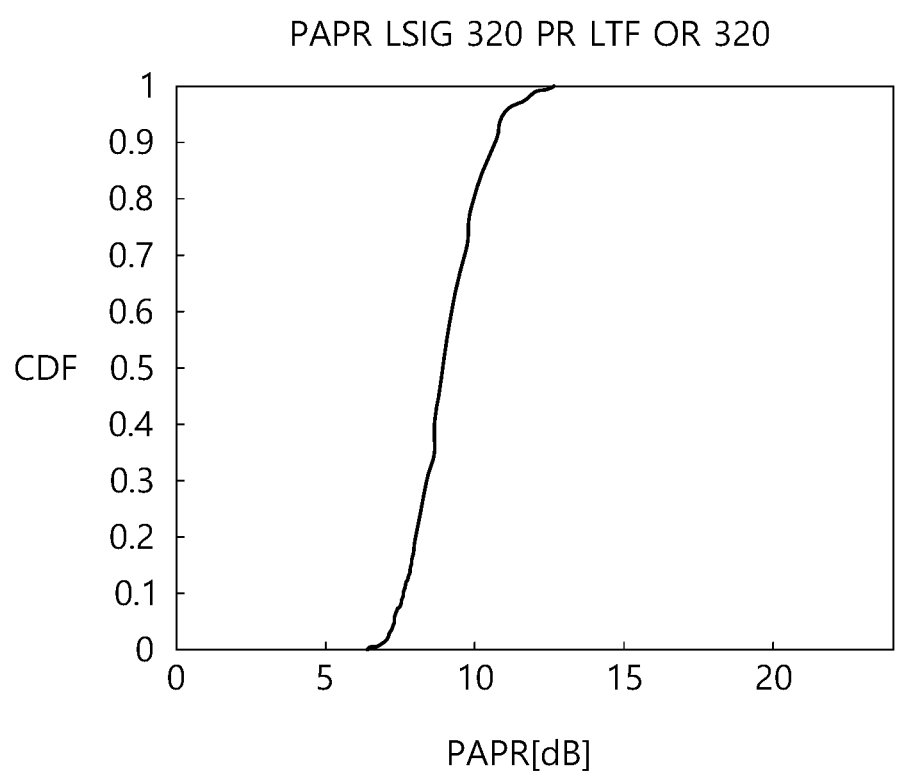
FIG. 32 illustrates the PAPR of an L-SIG in contiguous 320 MHz to which phase rotation 14 is applied.

FIG. 32 illustrates the PAPR of the L-SIG in contiguous 320 MHz to which phase rotation 14 is applied. Table 29 illustrates the PAPRs in a contiguous case when phase rotation 15 illustrated below is used.

Gamma_k,320=1 if k<−448
−j if −448≤k<−384
−j if −384≤k<−320
−1 if −320≤k<−256
−j if −256≤k<−192
−1 if −192≤k<−128
j if −128≤k<−64
1 if −64≤k<0
−1 if 0≤k<64
−j if 64≤k<128
1 if 128≤k<192
j if 192≤k<256
1 if 256≤k<320
j if 320≤k<384
j if 384≤k<448
−1 if 448≤k<512

TABLE 29

| L-STF | L-LTF |
|---|---|
| 4.2899 | 5.2007 |

Figure 33:
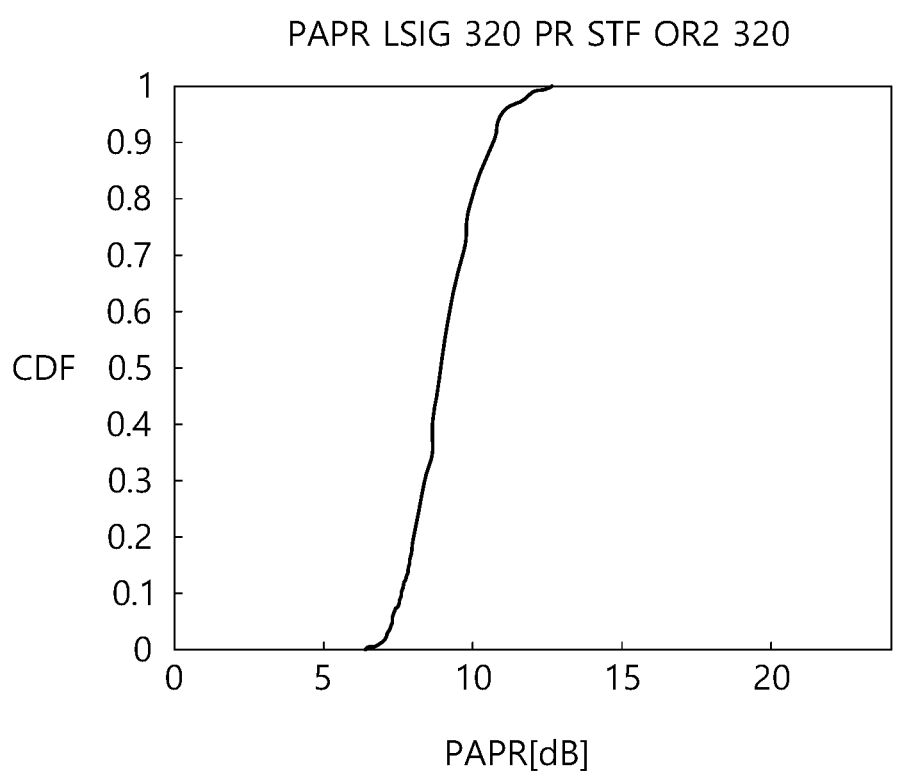
FIG. 33 illustrates the PAPR of an L-SIG in contiguous 320 MHz to which phase rotation 15 is applied.

FIG. 33 illustrates the PAPR of the L-SIG in contiguous 320 MHz to which phase rotation 15 is applied. Table 30 illustrates the PAPRs in a contiguous case when phase rotation 16 is used.

Gamma_k,320=1 if k<−448
j if −448≤k<−384
j if −384≤k<−320
−1 if −320≤k<−256
j if −256≤k<−192
−1 if −192≤k<−128
−j if −128≤k<−64
1 if −64≤k<0
−1 if 0≤k<64
j if 64≤k<128
1 if 128≤k<192
−j if 192≤k<256
1 if 256≤k<320
−j if 320≤k<384
−j if 384≤k<448
−1 if 448≤k<512

TABLE 30

| L-STF | L-LTF |
|---|---|
| 4.2899 | 5.2007 |

Figure 34:
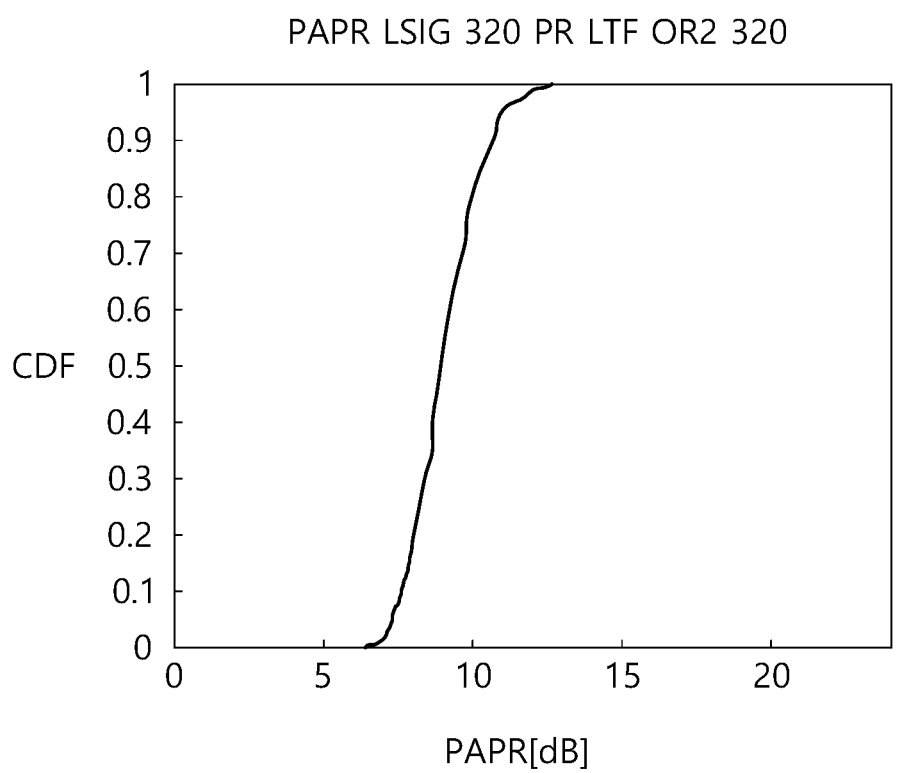
FIG. 34 illustrates the PAPR of an L-SIG in contiguous 320 MHz to which phase rotation 16 is applied.

FIG. 34 illustrates the PAPR of the L-SIG in contiguous 320 MHz to which phase rotation 16 is applied. As shown in the above results, the PAPRs are significantly unfavorable in the simple repetition. Therefore, phase rotation is required, and the option of repeating existing 11ax 80 MHz phase rotation and applying additional phase rotation for each 80 MHz bandwidth may be preferable in terms of application in a non-contiguous case and in terms of PAPR. The option of repeating phase rotation optimized in terms of PAPR for each 20 MHz bandwidth twice and applying additional phase rotation for each 160 MHz bandwidth in 160 MHz enables a favorable PAPR but allows a high PAPR compared to the option of repeating the 11ax 80 MHz phase rotation and applying the additional phase rotation for each 80 MHz bandwidth and may allow an unfavorable PAPR in an RF for transmission by each 80 MHz. Phase rotation optimized in terms of PAPR for each 20 MHz bandwidth enables an optimal PAPR, but may not be suitable in terms of PAPR in each RF when transmission is performed using a plurality of RFs. If contiguous 320 MHz transmission is performed in view of one RF, using phase rotation optimized for the L-LTF among the phase rotation methods optimized in terms of PAPR for each 20 MHz bandwidth may be most favorable in order to minimize the maximum PAPR. Further, the option of repeating the 11ax 80 MHz phase rotation and applying the additional phase rotation for each 80 MHz bandwidth may be preferable in view of STAs having various capabilities to perform contiguous/non-contiguous 320 MHz transmission using one RF and a plurality of RFs.

In the foregoing embodiments, proposed phase rotation values may be used after being multiplied by the same value (e.g., 1, −1, j, or −j), may be used in a changed order (e.g. [−1 −1 −1 1 −1 −1 −1 1] is used by changing the order of [1 −1 −1 −1 1 −1 −1 −1] from low to high frequencies), or may be used in a changed order after being multiplied by the same value ([1 1 1 −1 1 1 1 −1] is used by changing the order of [1 −1 −1 −1 1 −1 −1 −1] and multiplying [1 −1 −1 −1 1 −1 −1 −1] by −1). In this case, the same PAPR is obtained.

Figure 35:
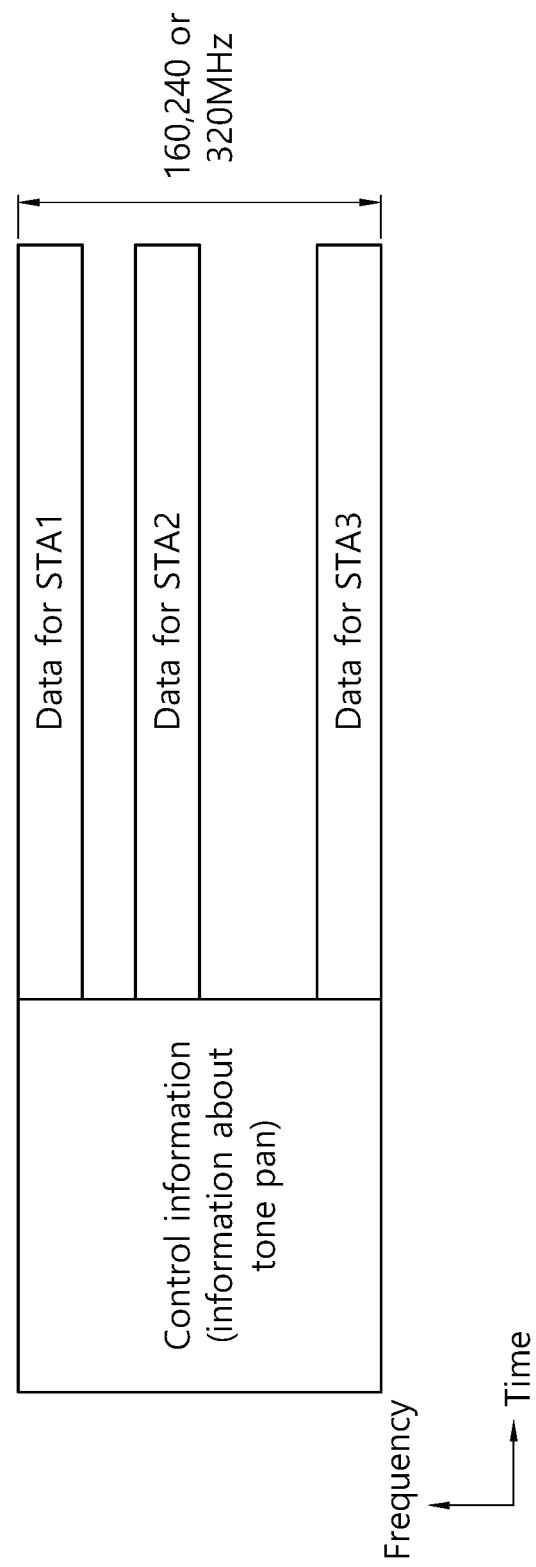
FIG. 35 illustrates an example of OFDMA transmission in a 160 MHz, 240 MHz, or 320 MHz band according to an embodiment.

FIG. 35 illustrates an example of OFDMA transmission in a 160 MHz, 240 MHz, or 320 MHz band according to an embodiment.

Referring to FIG. 35, an AP may transmit a PPDU to STA 1 to STA 3.

The PPDU may include control information including information about a tone plan. STA 1 to STA 3 may transmit or receive data in RUs based on the information about the tone plan in 160 MHz, 240 MHz, or 320 MHz.

That is, the AP may transmit the information about the tone plan to all STAs in a BSS in 160 MHz, 240 MHz, or 320 MHz, and the STAs may obtain scheduling information about data thereof based on the information about the tone plan. Accordingly, STA 1 to STA 3 having data among all the STAs within the BSS may transmit or receive the data through an allocated RU based on the information about the tone plan. The data may include both downlink data and uplink data FIG. 36 is a flowchart illustrating a procedure for transmitting a PPDU according to an embodiment.

Figure 36:
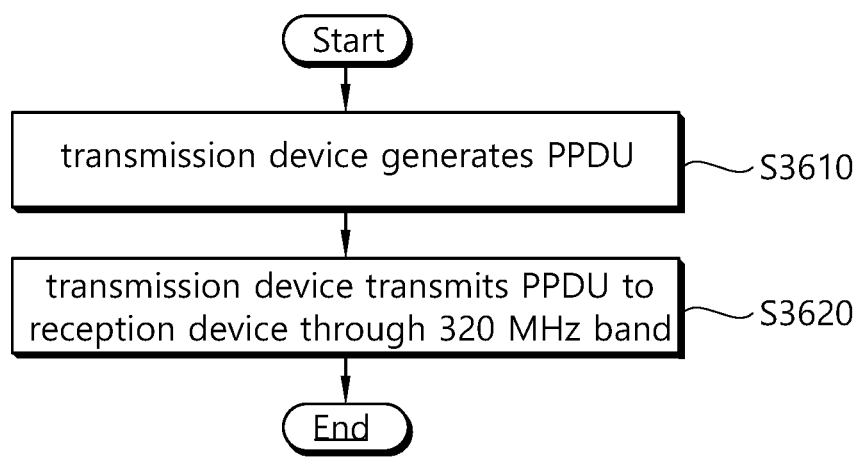
FIG. 36 is a flowchart illustrating a procedure for transmitting a PPDU according to an embodiment.

The embodiment of FIG. 36 may be performed in a network environment supporting a next-generation WLAN system. The next-generation WLAN system may be a WLAN system evolving from an 802.11ax system and may satisfy backward compatibility with the 802.11ax system. The next-generation WLAN system may correspond to an extremely high throughput (EHT) WLAN system or an 802.11be WLAN system.

The embodiment of FIG. 36 may be performed by a transmission device, and the transmission device may correspond to an AP. A reception device may correspond to a STA (non-AP STA).

The embodiment relates to a method and a device for setting a phase rotation value applied to a legacy preamble to optimize a PAPR when a PPDU is transmitted through a 160, 240, or 320 MHz band. However, the following description will be made with reference only to a 320 MHz band.

In operation S3610, the transmission device generates a physical protocol data unit (PPDU).

In operation S3620, the transmission device transmits the PPDU to the reception device through a 320 MHz band.

The PPDU includes a legacy preamble and an extremely high throughput (EHT) field, and the legacy preamble includes a legacy-short training field (L-STF) and a legacy-long training field (L-LTF). The legacy preamble may further include a legacy-signal (L-SIG). The EHT field may include an EHT-SIG, an EHT-STF, an EHT-LTF, and a data field. The legacy field may be a field supported by a pre-802.11be WLAN system, and the EHT field may be a field supported by an 802.11be WLAN system.

The legacy preamble is generated by applying a first phase rotation value or a second phase rotation value. That is, either the first phase rotation value or the second phase rotation value may be commonly applied to all fields included in the legacy preamble. The first phase rotation value is a phase rotation value defined for an optimal PAPR of the L-STF, and the second phase rotation value is a phase rotation value defined for an optimal PAPR of the L-LTF. For example, when the PAPR of the L-STF is high, the first phase rotation value may be applied to the legacy preamble to minimize the PAPR of the L-STF. When the PAPR of the L-LTF is high, the second phase rotation value may be applied to the legacy preamble to minimize the PAPR of the L-LTF.

The first phase rotation value is obtained based on a third phase rotation value and a fourth phase rotation value.

The third phase rotation value is a phase rotation value obtained by repeating a phase rotation value defined when the PPDU is transmitted in an 80 MHz band four times. Since the PPDU is transmitted through the 320 MHz band, the third phase rotation value may be obtained by repeating the phase rotation value for the 80 MHz band defined in existing 802.11ax four times. When the PPDU is transmitted through a 160 MHz band, the third phase rotation value may be obtained by repeating the phase rotation value for the 80 MHz band defined in existing 802.11ax twice. When the PPDU is transmitted through a 240 MHz band, the third phase rotation value may be obtained by repeating the phase rotation value for the 80 MHz band defined in existing 802.11ax three times.

The fourth phase rotation value is a phase rotation value defined for each 80 MHz band in the 320 MHz band based on the optimal PAPR of the L-STF. Since the 320 MHz band can be divided into four 80 MHz bands, one value in the fourth phase rotation value may be defined for each of the four 80 MHz bands. When the PPDU is transmitted through a 160 MHz band, one value in the fourth phase rotation value may be defined for each of two 80 MHz bands based on the optimal PAPR of the L-STF. When the PPDU is transmitted through a 240 MHz band, one value in the fourth phase rotation value may be defined for each of three 80 MHz bands based on the optimal PAPR of the L-STF.

That is, the embodiment proposes a method of additionally performing phase rotation (fourth phase rotation value or fifth phase rotation value) per 80 MHz unit in the entire band while applying the existing 802.11 ax method (third phase rotation value).

Hereinafter, a subcarrier range to which a phase rotation value is applied will be described.

The 320 MHz band may include subcarriers having a subcarrier index ranging from −512 to 511.

The third phase rotation value may be [1 −1 1 −1 1 −1 1 −1], because the third phase rotation value is obtained by repeating the phase rotation value [1 −1] for the 80 MHz band defined in existing 802.11ax four times.

A first value of 1 in the third phase rotation value may be applied to subcarriers having a subcarrier index ranging from −512 to −449. A second value of −1 in the third phase rotation value may be applied to subcarriers having a subcarrier index ranging from −448 to −257. That is, the first and second values of [1 −1] in the third phase rotation value may be applied to a first 80 MHz band in the 320 MHz band.

A third value of 1 in the third phase rotation value may be applied to subcarriers having a subcarrier index ranging from −256 to −193. A fourth value of −1 in the third phase rotation value may be applied to subcarriers having a subcarrier index ranging from −192 to −1. That is, the third and fourth values of [1 −1] in the third phase rotation value may be applied to a second 80 MHz band in the 320 MHz band.

A fifth value of 1 in the third phase rotation value may be applied to subcarriers having a subcarrier index ranging from 0 to 63. A sixth value of −1 in the third phase rotation value may be applied to subcarriers having a subcarrier index ranging from 64 to 255. That is, the fifth and sixth values of [1 −1] in the third phase rotation value may be applied to a third 80 MHz band in the 320 MHz band.

A seventh value of 1 in the third phase rotation value may be applied to subcarriers having a subcarrier index ranging from 256 to 319. An eighth value of −1 in the third phase rotation value may be applied to subcarriers having a subcarrier index ranging from 320 to 511. That is, the seventh and eighth values of [1 −1] in the third phase rotation value may be applied to a fourth 80 MHz band in the 320 MHz band.

For example, the fourth phase rotation value may be [1 −j −j 1]. Since the 320 MHz band has the four 80 MHz bands, one value in the fourth phase rotation value may be defined for each of the four 80 MHz bands.

A first value of 1 in the fourth phase rotation value may be applied to the first 80 MHz band in the 320 MHz band.

A second value of −j in the fourth phase rotation value may be applied to the second 80 MHz band in the 320 MHz band.

A third value of −j in the fourth phase rotation value may be applied to the third 80 MHz band in the 320 MHz band.

A fourth value of 1 in the fourth phase rotation value may be applied to the fourth 80 MHz band in the 320 MHz band.

The first phase rotation value may be obtained based on the product of the third phase rotation value and the fourth phase rotation value. That is, the first phase rotation value may be obtained by multiplying the third phase rotation value and the fourth phase rotation value according to a frequency band (or subcarrier index). In this case, the first phase rotation value may be [1 −1 −j j −j j 1 −1].

In another example, the fourth phase rotation value may be [1 j j 1]. Since the 320 MHz band has four 80 MHz bands, one value in the fourth phase rotation value may be defined for each of the four 80 MHz bands.

A first value of 1 in the fourth phase rotation value may be applied to the first 80 MHz band in the 320 MHz band.

A second value of j in the fourth phase rotation value may be applied to the second 80 MHz band in the 320 MHz band.

A third value of j in the fourth phase rotation value may be applied to the third 80 MHz band in the 320 MHz band.

A fourth value of 1 in the fourth phase rotation value may be applied to the fourth 80 MHz band in the 320 MHz band.

The first phase rotation value may be obtained based on the product of the third phase rotation value and the fourth phase rotation value. That is, the first phase rotation value may be obtained by multiplying the third phase rotation value and the fourth phase rotation value according to a frequency band (or subcarrier index). In this case, the first phase rotation value may be [1 −1 j −j j −j 1 −1].

The second phase rotation value may be obtained based on the third phase rotation value and a fifth phase rotation value.

The second phase rotation value may be obtained based on the third phase rotation value and the fifth phase rotation value.

The fifth phase rotation value may be a phase rotation value defined for each 80 MHz band in the 320 MHz band based on the optimal PAPR of the L-LTF. Since the 320 MHz band can be divided into the four 80 MHz bands, one value in the fifth phase rotation value may be defined for each of the four 80 MHz bands. When the PPDU is transmitted through the 160 MHz band, one value in the fifth phase rotation value may be defined for each of two 80 MHz bands based on the optimal PAPR of the L-LTF. When the PPDU is transmitted through the 240 MHz band, one value in the fifth phase rotation value may be defined for each of three 80 MHz bands based on the optimal PAPR of the L-LTF.

For example, the fifth phase rotation value may be [1 j j 1]. Since the 320 MHz band has the four 80 MHz bands, one value in the fifth phase rotation value may be defined for each of the four 80 MHz bands.

A first value of 1 in the fifth phase rotation value may be applied to the first 80 MHz band in the 320 MHz band.

A second value of j in the fifth phase rotation value may be applied to the second 80 MHz band in the 320 MHz band.

A third value of j in the fifth phase rotation value may be applied to the third 80 MHz band in the 320 MHz band.

A fourth value of 1 in the fifth phase rotation value may be applied to the fourth 80 MHz band in the 320 MHz band.

The second phase rotation value may be obtained based on the product of the third phase rotation value and the fifth phase rotation value. That is, the second phase rotation value may be obtained by multiplying the third phase rotation value and the fifth phase rotation value according to a frequency band (or subcarrier index). In this case, the second phase rotation value may be [1 −1 j −j j −j 1 −1].

In another example, the fifth phase rotation value may be [1 −j −j 1]. Since the 320 MHz band has four 80 MHz bands, one value in the fifth phase rotation value may be defined for each of the four 80 MHz bands.

A first value of 1 in the fifth phase rotation value may be applied to the first 80 MHz band in the 320 MHz band.

A second value of −j in the fifth phase rotation value may be applied to the second 80 MHz band in the 320 MHz band.

A third value of −j in the fifth phase rotation value may be applied to the third 80 MHz band in the 320 MHz band.

A fourth value of 1 in the fifth phase rotation value may be applied to the fourth 80 MHz band in the 320 MHz band.

The second phase rotation value may be obtained based on the product of the third phase rotation value and the fifth phase rotation value. That is, the second phase rotation value may be obtained by multiplying the third phase rotation value and the fifth phase rotation value according to a frequency band (or subcarrier index). In this case, the second phase rotation value may be [1 −1 −j j −j j 1 −1].

The L-STF may be generated by applying the first phase rotation value or the second phase rotation value to an L-STF sequence. The L-LTF may be generated by applying the first phase rotation value or the second phase rotation value to an L-LTF sequence.

The L-STF sequence may be a sequence in which an L-STF sequence defined for a 20 MHz band is repeated. Since the L-STF is transmitted through the 320 MHz band, the L-STF sequence may be obtained by repeating the L-STF sequence defined for the 20 MHz band in existing 802.11ax. Likewise, when the L-STF is transmitted through the 160 MHz band, the L-STF sequence defined for the 20 MHz band in existing 802.11ax may be repeated twice. When the L-STF is transmitted through the 240 MHz band, the L-STF sequence defined for the 20 MHz band in existing 802.11ax may be repeated three times.

The L-STF sequence defined for the 20 MHz band is sqrt(½)*[0 0 0 0 0 0 0 1 +j 0 0 0 −1 −j 0 0 0 1 +j 0 0 0 −1 −j 0 0 0 −1 −j0 0 0 1 +j 0 0 0 0 0 0 0 −1 −j 0 0 0 −1 −j0 0 0 1 +j0 0 0 1 +j0 0 0 1 +j 0 0 0 1 +j 0 0 0 0 0 0 0].

The L-LTF sequence may be a sequence in which an L-LTF sequence defined for a 20 MHz band is repeated. Since the L-LTF is transmitted through the 320 MHz band, the L-LTF sequence may be obtained by repeating the L-LTF sequence defined for the 20 MHz band in existing 802.11ax. Likewise, when the L-LTF is transmitted through the 160 MHz band, the L-LTF sequence defined for the 20 MHz band in existing 802.11ax may be repeated twice. When the L-LTF is transmitted through the 240 MHz band, the L-LTF sequence defined for the 20 MHz band in existing 802.11ax may be repeated three times.

The L-LTF sequence defined for 20 MHz band is [0 0 0 0 0 0 1 1 −1 −1 1 1 −1 1 −1 1 1 1 1 1 1 −1 −1 1 1 −1 1 −1 1 1 1 1 0 1 −1 −1 1 1 −1 1 −1 1 −1 −1 −1 −1 −1 1 1 −1 −1 1 1 −1 1 −1 1 1 1 1 0 0 0 0 0].

According to the foregoing embodiment, when the PPDU is transmitted through the 160 MHz or 240 MHz band, a phase rotation value may also be defined and applied to the legacy preamble in the same manner.

The EHT-SIG may include an EHT-SIG-A and an EHT-SIG-B. The EHT-SIG-B may include RU information. That is, the AP may indicate information on a tone plan for 160/240/320 MHz through the EHT-SIG-B in the PPDU. The EHT-STF, EHT-LTF, and the data field included in the EHT field may be transmitted or received in a band (RU) according to the tone plan for 160/240/320 MHz.

The EHT-SIG may be generated by applying the first phase rotation value or the second phase rotation value. When the EHT PPDU has a preamble structure according to 11ax, the field may be generated by applying the same phase rotation value to up to the EHT-SIG-B.

Figure 37:
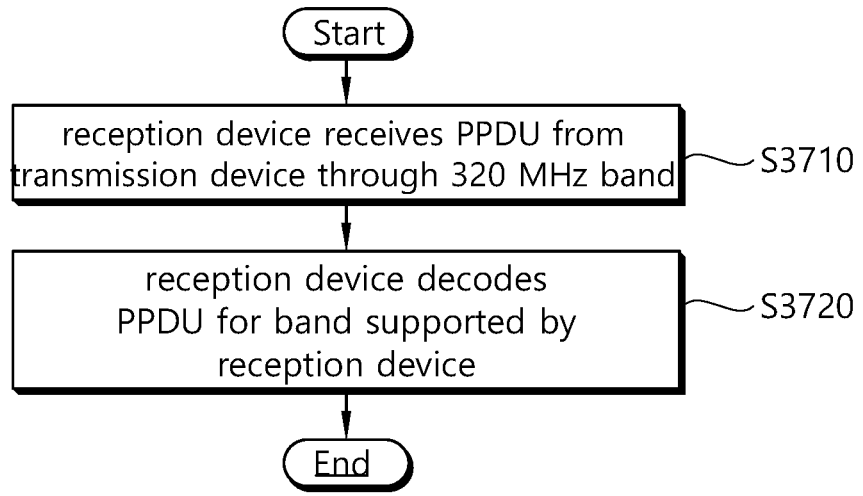
FIG. 37 is a flowchart illustrating a procedure for receiving a PPDU according to an embodiment.

FIG. 37 is a flowchart illustrating a procedure for receiving a PPDU according to an embodiment.

The embodiment of FIG. 37 may be performed in a network environment supporting a next-generation WLAN system. The next-generation WLAN system may be a WLAN system evolving from an 802.11ax system and may satisfy backward compatibility with the 802.11ax system. The next-generation WLAN system may correspond to an extremely high throughput (EHT) WLAN system or an 802.11be WLAN system.

The embodiment of FIG. 37 may be performed by a reception device, and the reception device may correspond to a STA (non-AP STA). A transmission device may correspond to an AP.

The embodiment relates to a method and a device for setting a phase rotation value applied to a legacy preamble to optimize a PAPR when a PPDU is transmitted through a 160, 240, or 320 MHz band. However, the following description will be made with reference only to a 320 MHz band.

In operation 3710, the reception device receives a PPDU from the transmission device through a 320 MHz band.

In operation 3720, the reception device decodes the PPDU for a band supported by the reception device.

The PPDU includes a legacy preamble and an extremely high throughput (EHT) field, and the legacy preamble includes a legacy-short training field (L-STF) and a legacy-long training field (L-LTF). The legacy preamble may further include a legacy-signal (L-SIG). The EHT field may include an EHT-SIG, an EHT-STF, an EHT-LTF, and a data field. The legacy field may be a field supported by a pre-802.11be WLAN system, and the EHT field may be a field supported by an 802.11be WLAN system.

The legacy preamble is generated by applying a first phase rotation value or a second phase rotation value. That is, either the first phase rotation value or the second phase rotation value may be commonly applied to all fields included in the legacy preamble. The first phase rotation value is a phase rotation value defined for an optimal PAPR of the L-STF, and the second phase rotation value is a phase rotation value defined for an optimal PAPR of the L-LTF. For example, when the PAPR of the L-STF is high, the first phase rotation value may be applied to the legacy preamble to minimize the PAPR of the L-STF. When the PAPR of the L-LTF is high, the second phase rotation value may be applied to the legacy preamble to minimize the PAPR of the L-LTF.

The first phase rotation value is obtained based on a third phase rotation value and a fourth phase rotation value.

The third phase rotation value is a phase rotation value obtained by repeating a phase rotation value defined when the PPDU is transmitted in an 80 MHz band four times. Since the PPDU is transmitted through the 320 MHz band, the third phase rotation value may be obtained by repeating the phase rotation value for the 80 MHz band defined in existing 802.11 ax four times. When the PPDU is transmitted through a 160 MHz band, the third phase rotation value may be obtained by repeating the phase rotation value for the 80 MHz band defined in existing 802.11ax twice. When the PPDU is transmitted through a 240 MHz band, the third phase rotation value may be obtained by repeating the phase rotation value for the 80 MHz band defined in existing 802.11ax three times.

The fourth phase rotation value is a phase rotation value defined for each 80 MHz band in the 320 MHz band based on the optimal PAPR of the L-STF. Since the 320 MHz band can be divided into four 80 MHz bands, one value in the fourth phase rotation value may be defined for each of the four 80 MHz bands. When the PPDU is transmitted through a 160 MHz band, one value in the fourth phase rotation value may be defined for each of two 80 MHz bands based on the optimal PAPR of the L-STF. When the PPDU is transmitted through a 240 MHz band, one value in the fourth phase rotation value may be defined for each of three 80 MHz bands based on the optimal PAPR of the L-STF.

That is, the embodiment proposes a method of additionally performing phase rotation (fourth phase rotation value or fifth phase rotation value) per 80 MHz unit in the entire band while applying the existing 802.11 ax method (third phase rotation value).

Hereinafter, a subcarrier range to which a phase rotation value is applied will be described.

The 320 MHz band may include subcarriers having a subcarrier index ranging from −512 to 511.

The third phase rotation value may be [1 −1 1 −1 1 −1 1 −1], because the third phase rotation value is obtained by repeating the phase rotation value [1 −1] for the 80 MHz band defined in existing 802.11ax four times.

A first value of 1 in the third phase rotation value may be applied to subcarriers having a subcarrier index ranging from −512 to −449. A second value of −1 in the third phase rotation value may be applied to subcarriers having a subcarrier index ranging from −448 to −257. That is, the first and second values of [1 −1] in the third phase rotation value may be applied to a first 80 MHz band in the 320 MHz band.

A third value of 1 in the third phase rotation value may be applied to subcarriers having a subcarrier index ranging from −256 to −193. A fourth value of −1 in the third phase rotation value may be applied to subcarriers having a subcarrier index ranging from −192 to −1. That is, the third and fourth values of [1 −1] in the third phase rotation value may be applied to a second 80 MHz band in the 320 MHz band.

A fifth value of 1 in the third phase rotation value may be applied to subcarriers having a subcarrier index ranging from 0 to 63. A sixth value of −1 in the third phase rotation value may be applied to subcarriers having a subcarrier index ranging from 64 to 255. That is, the fifth and sixth values of [1 −1] in the third phase rotation value may be applied to a third 80 MHz band in the 320 MHz band.

A seventh value of 1 in the third phase rotation value may be applied to subcarriers having a subcarrier index ranging from 256 to 319. An eighth value of −1 in the third phase rotation value may be applied to subcarriers having a subcarrier index ranging from 320 to 511. That is, the seventh and eighth values of [1 −1] in the third phase rotation value may be applied to a fourth 80 MHz band in the 320 MHz band.

For example, the fourth phase rotation value may be [1 −j −j 1]. Since the 320 MHz band has the four 80 MHz bands, one value in the fourth phase rotation value may be defined for each of the four 80 MHz bands.

A first value of 1 in the fourth phase rotation value may be applied to the first 80 MHz band in the 320 MHz band.

A second value of −j in the fourth phase rotation value may be applied to the second 80 MHz band in the 320 MHz band.

A third value of –j in the fourth phase rotation value may be applied to the third 80 MHz band in the 320 MHz band.

A fourth value of 1 in the fourth phase rotation value may be applied to the fourth 80 MHz band in the 320 MHz band.

The first phase rotation value may be obtained based on the product of the third phase rotation value and the fourth phase rotation value. That is, the first phase rotation value may be obtained by multiplying the third phase rotation value and the fourth phase rotation value according to a frequency band (or subcarrier index). In this case, the first phase rotation value may be [1 −1 −j j −j j 1 −1].

In another example, the fourth phase rotation value may be [j j 1]. Since the 320 MHz band has four 80 MHz bands, one value in the fourth phase rotation value may be defined for each of the four 80 MHz bands.

A first value of 1 in the fourth phase rotation value may be applied to the first 80 MHz band in the 320 MHz band.

A second value of j in the fourth phase rotation value may be applied to the second 80 MHz band in the 320 MHz band.

A third value of j in the fourth phase rotation value may be applied to the third 80 MHz band in the 320 MHz band.

A fourth value of 1 in the fourth phase rotation value may be applied to the fourth 80 MHz band in the 320 MHz band.

The first phase rotation value may be obtained based on the product of the third phase rotation value and the fourth phase rotation value. That is, the first phase rotation value may be obtained by multiplying the third phase rotation value and the fourth phase rotation value according to a frequency band (or subcarrier index). In this case, the first phase rotation value may be [1 −1 j −j j −j 1 −1].

The second phase rotation value may be obtained based on the third phase rotation value and a fifth phase rotation value.

The second phase rotation value may be obtained based on the third phase rotation value and the fifth phase rotation value.

The fifth phase rotation value may be a phase rotation value defined for each 80 MHz band in the 320 MHz band based on the optimal PAPR of the L-LTF. Since the 320 MHz band can be divided into the four 80 MHz bands, one value in the fifth phase rotation value may be defined for each of the four 80 MHz bands. When the PPDU is transmitted through the 160 MHz band, one value in the fifth phase rotation value may be defined for each of two 80 MHz bands based on the optimal PAPR of the L-LTF. When the PPDU is transmitted through the 240 MHz band, one value in the fifth phase rotation value may be defined for each of three 80 MHz bands based on the optimal PAPR of the L-LTF.

For example, the fifth phase rotation value may be [1 j j 1]. Since the 320 MHz band has the four 80 MHz bands, one value in the fifth phase rotation value may be defined for each of the four 80 MHz bands.

A first value of 1 in the fifth phase rotation value may be applied to the first 80 MHz band in the 320 MHz band.

A second value of j in the fifth phase rotation value may be applied to the second 80 MHz band in the 320 MHz band.

A third value of j in the fifth phase rotation value may be applied to the third 80 MHz band in the 320 MHz band.

A fourth value of 1 in the fifth phase rotation value may be applied to the fourth 80 MHz band in the 320 MHz band.

The second phase rotation value may be obtained based on the product of the third phase rotation value and the fifth phase rotation value. That is, the second phase rotation value may be obtained by multiplying the third phase rotation value and the fifth phase rotation value according to a frequency band (or subcarrier index). In this case, the second phase rotation value may be [1 1 −j j −j 1 −1].

In another example, the fifth phase rotation value may be [1 −j −j 1]. Since the 320 MHz band has four 80 MHz bands, one value in the fifth phase rotation value may be defined for each of the four 80 MHz bands.

A first value of 1 in the fifth phase rotation value may be applied to the first 80 MHz band in the 320 MHz band.

A second value of −j in the fifth phase rotation value may be applied to the second 80 MHz band in the 320 MHz band.

A third value of −j in the fifth phase rotation value may be applied to the third 80 MHz band in the 320 MHz band.

A fourth value of 1 in the fifth phase rotation value may be applied to the fourth 80 MHz band in the 320 MHz band.

The second phase rotation value may be obtained based on the product of the third phase rotation value and the fifth phase rotation value. That is, the second phase rotation value may be obtained by multiplying the third phase rotation value and the fifth phase rotation value according to a frequency band (or subcarrier index). In this case, the second phase rotation value may be [1 −1 −j j −j j 1 −1].

The L-STF may be generated by applying the first phase rotation value or the second phase rotation value to an L-STF sequence. The L-LTF may be generated by applying the first phase rotation value or the second phase rotation value to an L-LTF sequence.

The L-STF sequence may be a sequence in which an L-STF sequence defined for a 20 MHz band is repeated. Since the L-STF is transmitted through the 320 MHz band, the L-STF sequence may be obtained by repeating the L-STF sequence defined for the 20 MHz band in existing 802.11ax. Likewise, when the L-STF is transmitted through the 160 MHz band, the L-STF sequence defined for the 20 MHz band in existing 802.11ax may be repeated twice. When the L-STF is transmitted through the 240 MHz band, the L-STF sequence defined for the 20 MHz band in existing 802.11ax may be repeated three times.

The L-STF sequence defined for the 20 MHz band is sqrt(½)*[0 0 0 0 0 0 0 1 +j 0 0 0 −1 −j 0 0 0 1 +j 0 0 0 −1 −j 0 0 0 −1 −j 0 0 0 1 +j 0 0 0 0 0 0 0 −−j 0 0 0 −1 −j 0 0 1 +j 0 0 0 1 +j 0 0 0 1 +j 0 0 0 1 +j 0 0 0 0 0 0 0].

The L-LTF sequence may be a sequence in which an L-LTF sequence defined for a 20 MHz band is repeated. Since the L-LTF is transmitted through the 320 MHz band, the L-LTF sequence may be obtained by repeating the L-LTF sequence defined for the 20 MHz band in existing 802.11ax. Likewise, when the L-LTF is transmitted through the 160 MHz band, the L-LTF sequence defined for the 20 MHz band in existing 802.11ax may be repeated twice. When the L-LTF is transmitted through the 240 MHz band, the L-LTF sequence defined for the 20 MHz band in existing 802.11ax may be repeated three times.

The L-LTF sequence defined for the 20 MHz band is [0 0 0 0 0 1 1 −1 −1 1 1 −1 1 −1 1 1 1 1 1 −1 −1 1 1 −1 1 −1 1 1 1 1 0 1 −1 −1 1 1 −1 1 −1 1 −1 −1 −1 −1 −1 1 1 −1 −1 1 −1 1 −1 1 1 1 1 0 0 0 0 0].

According to the foregoing embodiment, when the PPDU is transmitted through the 160 MHz or 240 MHz band, a phase rotation value may also be defined and applied to the legacy preamble in the same manner.

The EHT-SIG may include an EHT-SIG-A and an EHT-SIG-B. The EHT-SIG-B may include RU information. That is, the AP may indicate information on a tone plan for 160/240/320 MHz through the EHT-SIG-B in the PPDU. The EHT-STF, EHT-LTF, and the data field included in the EHT field may be transmitted or received in a band (RU) according to the tone plan for 160/240/320 MHz.

The EHT-SIG may be generated by applying the first phase rotation value or the second phase rotation value. When the EHT PPDU has a preamble structure according to 1 lax, the field may be generated by applying the same phase rotation value to up to EHT-SIG-B.

6. Device Configuration

Figure 38:
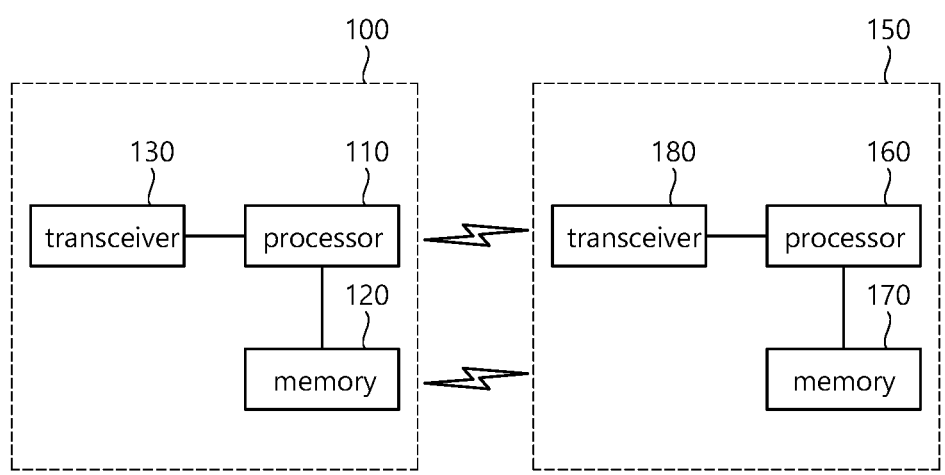
FIG. 38 is a diagram illustrating a device for implementing the aforementioned method.

FIG. 38 is a diagram illustrating a device for implementing the aforementioned method.

A wireless device (100) of FIG. 38 may be a transmission device capable of implementing the foregoing embodiments and may operate as an AP STA. A wireless device 150 of FIG. 38 may be a reception device capable of implementing the foregoing embodiments and may operate as a non-AP STA.

The transmission device (100) may include a processor (110), a memory (120), and a transceiver (130), and the reception device (150) may include a processor (160), a memory (170), and a transceiver (180). The transceiver (130, 180) transmits/receives a radio signal and may be operated in a physical layer of IEEE 802.11/3GPP, and so on. The processor (110, 160) may be operated in the physical layer and/or MAC layer and may be operatively connected to the transceiver (130, 180).

The processor (110, 160) and/or the transceiver (130, 180) may include application-specific integrated circuit (ASIC), other chipset, logic circuit and/or data processor. The memory (120, 170) may include read-only memory (ROM), random access memory (RAM), flash memory, memory card, storage medium and/or other storage unit. When the embodiments are executed by software, the techniques (or methods) described herein can be executed with modules (e.g., processes, functions, and so on) that perform the functions described herein. The modules can be stored in the memory (120, 170) and executed by the processor (110, 160). The memory (120, 170) can be implemented (or positioned) within the processor (110, 160) or external to the processor (110, 160). Also, the memory (120, 170) may be operatively connected to the processor (110, 160) via various means known in the art.

The processor (110, 160) may implement the functions, processes and/or methods proposed in the present disclosure. For example, the processor (110, 160) may perform the operation according to the present embodiment.

A specific operation of the processor (110) of the transmission device is as follows. The processor (110) of the transmission device generates a PPDU and transmits the PPDU through a 160/240/320 MHz broadband.

A specific operation of the processor (160) of the reception device is as follows. The processor (160) of the reception device receives a PPDU generated by the transmission device through a 160/240/320 MHz broadband and decodes the PPDU for a band supported by the reception device.

Figure 39:
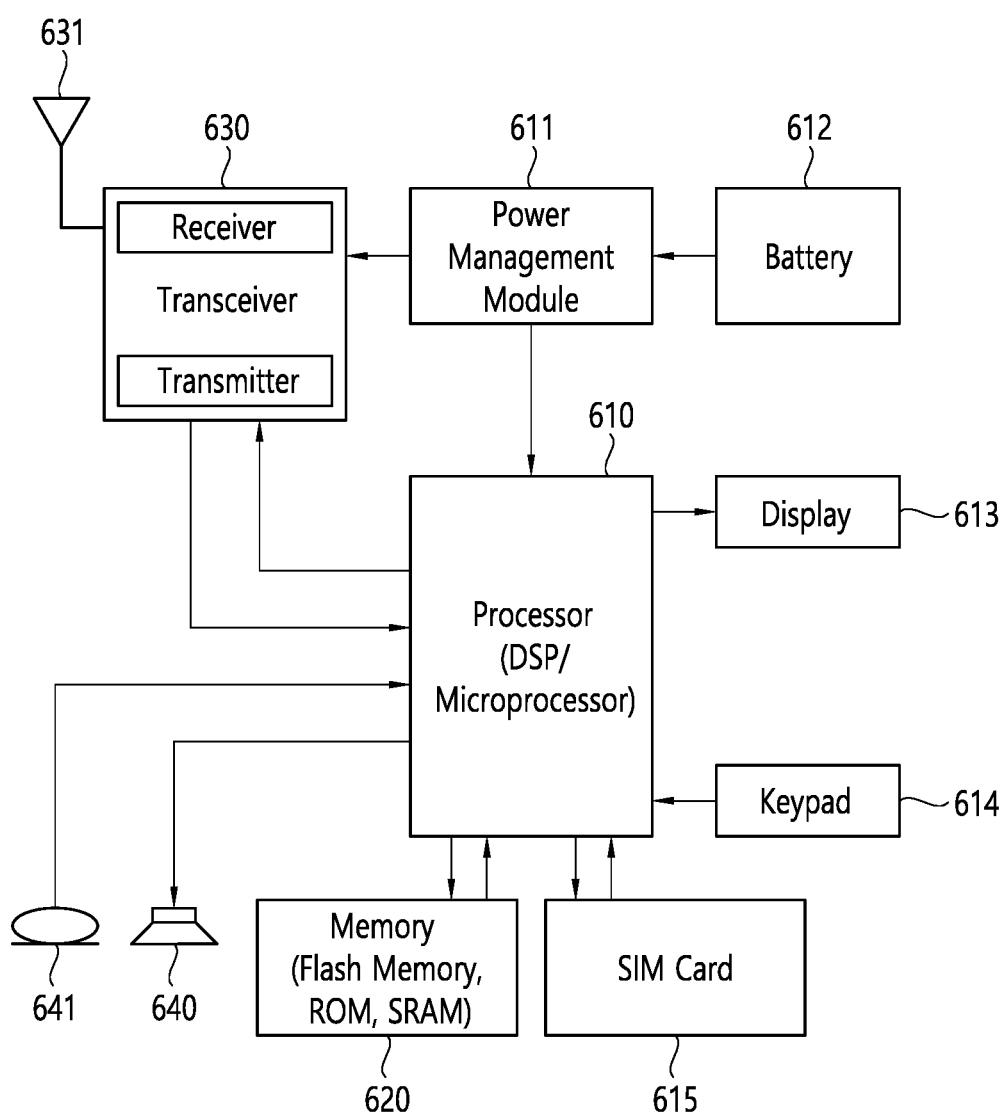
FIG. 39 illustrates a specific wireless device for implementing an embodiment of the present disclosure.

FIG. 39 illustrates a specific wireless device for implementing an embodiment of the present disclosure. The present disclosure described above for the transmission device or the reception device may be applied to this embodiment.

A wireless device includes a processor 610, a power management module 611, a battery 612, a display 613, a keypad 614, a subscriber identification module (SIM) card 615, a memory 620, a transceiver 630, one or more antennas 631, a speaker 640, and a microphone 641.

The processor 610 may be configured to implement proposed functions, procedures, and/or methods described in this disclosure. Layers of the radio interface protocol may be implemented in the processor 610. The processor 610 may include application-specific integrated circuit (ASIC), other chipset, logic circuit and/or data processing device. The processor 610 may be an application processor (AP). The processor 610 may include at least one of a digital signal processor (DSP), a central processing unit (CPU), a graphics processing unit (GPU), a modem (modulator and demodulator). An example of the processor 610 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The power management module 611 manages power for the processor 610 and/or the transceiver 630. The battery 612 supplies power to the power management module 611. The display 613 outputs results processed by the processor 610. The keypad 614 receives inputs to be used by the processor 610. The keypad 614 may be shown on the display 613. The SIM card 615 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 620 is operatively coupled with the processor 610 and stores a variety of information to operate the processor 610. The memory 620 may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in the memory 620 and executed by the processor 610. The memory 620 can be implemented within the processor 610 or external to the processor 610 in which case those can be communicatively coupled to the processor 610 via various means as is known in the art.

The transceiver 630 is operatively coupled with the processor 610, and transmits and/or receives a radio signal. The transceiver 630 includes a transmitter and a receiver. The transceiver 630 may include baseband circuitry to process radio frequency signals. The transceiver 630 controls the one or more antennas 631 to transmit and/or receive a radio signal.

The speaker 640 outputs sound-related results processed by the processor 610. The microphone 641 receives sound-related inputs to be used by the processor 610.

In the transmission device, the processor (610) generates a PPDU and transmits the PPDU through a 160/240/320 MHz broadband.

In the reception device, the processor (610) receives a PPDU generated by the transmission device through a 160/240/320 MHz broadband and decodes the PPDU for a band supported by the reception device.

The PPDU includes a legacy preamble and an extremely high throughput (EHT) field, and the legacy preamble includes a legacy-short training field (L-STF) and a legacy-long training field (L-LTF). The legacy preamble may further include a legacy-signal (L-SIG). The EHT field may include an EHT-SIG, an EHT-STF, an EHT-LTF, and a data field. The legacy field may be a field supported by a pre-802.11be WLAN system, and the EHT field may be a field supported by an 802.11be WLAN system.

The legacy preamble is generated by applying a first phase rotation value or a second phase rotation value. That is, either the first phase rotation value or the second phase rotation value may be commonly applied to all fields included in the legacy preamble. The first phase rotation value is a phase rotation value defined for an optimal PAPR of the L-STF, and the second phase rotation value is a phase rotation value defined for an optimal PAPR of the L-LTF. For example, when the PAPR of the L-STF is high, the first phase rotation value may be applied to the legacy preamble to minimize the PAPR of the L-STF. When the PAPR of the L-LTF is high, the second phase rotation value may be applied to the legacy preamble to minimize the PAPR of the L-LTF.

The first phase rotation value is obtained based on a third phase rotation value and a fourth phase rotation value.

The third phase rotation value is a phase rotation value obtained by repeating a phase rotation value defined when the PPDU is transmitted in an 80 MHz band four times. Since the PPDU is transmitted through the 320 MHz band, the third phase rotation value may be obtained by repeating the phase rotation value for the 80 MHz band defined in existing 802.11ax four times. When the PPDU is transmitted through a 160 MHz band, the third phase rotation value may be obtained by repeating the phase rotation value for the 80 MHz band defined in existing 802.11ax twice. When the PPDU is transmitted through a 240 MHz band, the third phase rotation value may be obtained by repeating the phase rotation value for the 80 MHz band defined in existing 802.11ax three times.

The fourth phase rotation value is a phase rotation value defined for each 80 MHz band in the 320 MHz band based on the optimal PAPR of the L-STF. Since the 320 MHz band can be divided into four 80 MHz bands, one value in the fourth phase rotation value may be defined for each of the four 80 MHz bands. When the PPDU is transmitted through a 160 MHz band, one value in the fourth phase rotation value may be defined for each of two 80 MHz bands based on the optimal PAPR of the L-STF. When the PPDU is transmitted through a 240 MHz band, one value in the fourth phase rotation value may be defined for each of three 80 MHz bands based on the optimal PAPR of the L-STF.

That is, the embodiment proposes a method of additionally performing phase rotation (fourth phase rotation value or fifth phase rotation value) per 80 MHz unit in the entire band while applying the existing 802.11 ax method (third phase rotation value).

Hereinafter, a subcarrier range to which a phase rotation value is applied will be described.

The 320 MHz band may include subcarriers having a subcarrier index ranging from −512 to 511.

The third phase rotation value may be [1 −1 1 −1 1 −1 1 −1], because the third phase rotation value is obtained by repeating the phase rotation value [1 −1] for the 80 MHz band defined in existing 802.11ax four times.

A first value of 1 in the third phase rotation value may be applied to subcarriers having a subcarrier index ranging from −512 to −449. A second value of −1 in the third phase rotation value may be applied to subcarriers having a subcarrier index ranging from −448 to −257. That is, the first and second values of [1 −1] in the third phase rotation value may be applied to a first 80 MHz band in the 320 MHz band.

A third value of 1 in the third phase rotation value may be applied to subcarriers having a subcarrier index ranging from −256 to −193. A fourth value of −1 in the third phase rotation value may be applied to subcarriers having a subcarrier index ranging from −192 to −1. That is, the third and fourth values of [1 −1] in the third phase rotation value may be applied to a second 80 MHz band in the 320 MHz band.

A fifth value of 1 in the third phase rotation value may be applied to subcarriers having a subcarrier index ranging from 0 to 63. A sixth value of −1 in the third phase rotation value may be applied to subcarriers having a subcarrier index ranging from 64 to 255. That is, the fifth and sixth values of [1 −1] in the third phase rotation value may be applied to a third 80 MHz band in the 320 MHz band.

A seventh value of 1 in the third phase rotation value may be applied to subcarriers having a subcarrier index ranging from 256 to 319. An eighth value of −1 in the third phase rotation value may be applied to subcarriers having a subcarrier index ranging from 320 to 511. That is, the seventh and eighth values of [1 −1] in the third phase rotation value may be applied to a fourth 80 MHz band in the 320 MHz band.

For example, the fourth phase rotation value may be [1 −j −j 1]. Since the 320 MHz band has the four 80 MHz bands, one value in the fourth phase rotation value may be defined for each of the four 80 MHz bands.

A first value of 1 in the fourth phase rotation value may be applied to the first 80 MHz band in the 320 MHz band.

A second value of −j in the fourth phase rotation value may be applied to the second 80 MHz band in the 320 MHz band.

A third value of −j in the fourth phase rotation value may be applied to the third 80 MHz band in the 320 MHz band.

A fourth value of 1 in the fourth phase rotation value may be applied to the fourth 80 MHz band in the 320 MHz band.

The first phase rotation value may be obtained based on the product of the third phase rotation value and the fourth phase rotation value. That is, the first phase rotation value may be obtained by multiplying the third phase rotation value and the fourth phase rotation value according to a frequency band (or subcarrier index). In this case, the first phase rotation value may be [1 −1 −j j −j j 1 −1].

In another example, the fourth phase rotation value may be [1 j j 1]. Since the 320 MHz band has four 80 MHz bands, one value in the fourth phase rotation value may be defined for each of the four 80 MHz bands.

A first value of 1 in the fourth phase rotation value may be applied to the first 80 MHz band in the 320 MHz band.

A second value of j in the fourth phase rotation value may be applied to the second 80 MHz band in the 320 MHz band.

A third value of j in the fourth phase rotation value may be applied to the third 80 MHz band in the 320 MHz band.

A fourth value of 1 in the fourth phase rotation value may be applied to the fourth 80 MHz band in the 320 MHz band.

The first phase rotation value may be obtained based on the product of the third phase rotation value and the fourth phase rotation value. That is, the first phase rotation value may be obtained by multiplying the third phase rotation value and the fourth phase rotation value according to a frequency band (or subcarrier index). In this case, the first phase rotation value may be [1 −1 j −j j −j 1 −1].

The second phase rotation value may be obtained based on the third phase rotation value and a fifth phase rotation value.

The second phase rotation value may be obtained based on the third phase rotation value and the fifth phase rotation value.

The fifth phase rotation value may be a phase rotation value defined for each 80 MHz band in the 320 MHz band based on the optimal PAPR of the L-LTF. Since the 320 MHz band can be divided into the four 80 MHz bands, one value in the fifth phase rotation value may be defined for each of the four 80 MHz bands. When the PPDU is transmitted through the 160 MHz band, one value in the fifth phase rotation value may be defined for each of two 80 MHz bands based on the optimal PAPR of the L-LTF. When the PPDU is transmitted through the 240 MHz band, one value in the fifth phase rotation value may be defined for each of three 80 MHz bands based on the optimal PAPR of the L-LTF.

For example, the fifth phase rotation value may be [1 j j 1]. Since the 320 MHz band has the four 80 MHz bands, one value in the fifth phase rotation value may be defined for each of the four 80 MHz bands.

A first value of 1 in the fifth phase rotation value may be applied to the first 80 MHz band in the 320 MHz band.

A second value of j in the fifth phase rotation value may be applied to the second 80 MHz band in the 320 MHz band.

A third value of j in the fifth phase rotation value may be applied to the third 80 MHz band in the 320 MHz band.

A fourth value of 1 in the fifth phase rotation value may be applied to the fourth 80 MHz band in the 320 MHz band.

The second phase rotation value may be obtained based on the product of the third phase rotation value and the fifth phase rotation value. That is, the second phase rotation value may be obtained by multiplying the third phase rotation value and the fifth phase rotation value according to a frequency band (or subcarrier index). In this case, the second phase rotation value may be [1 −1 j −j j −j 1 −1].

In another example, the fifth phase rotation value may be [1 −j −j 1]. Since the 320 MHz band has four 80 MHz bands, one value in the fifth phase rotation value may be defined for each of the four 80 MHz bands.

A first value of 1 in the fifth phase rotation value may be applied to the first 80 MHz band in the 320 MHz band.

A second value of −j in the fifth phase rotation value may be applied to the second 80 MHz band in the 320 MHz band.

A third value of −j in the fifth phase rotation value may be applied to the third 80 MHz band in the 320 MHz band.

A fourth value of 1 in the fifth phase rotation value may be applied to the fourth 80 MHz band in the 320 MHz band.

The second phase rotation value may be obtained based on the product of the third phase rotation value and the fifth phase rotation value. That is, the second phase rotation value may be obtained by multiplying the third phase rotation value and the fifth phase rotation value according to a frequency band (or subcarrier index). In this case, the second phase rotation value may be [1 −1 −j j −j j 1 −1].

The L-STF may be generated by applying the first phase rotation value or the second phase rotation value to an L-STF sequence. The L-LTF may be generated by applying the first phase rotation value or the second phase rotation value to an L-LTF sequence.

The L-STF sequence may be a sequence in which an L-STF sequence defined for a 20 MHz band is repeated. Since the L-STF is transmitted through the 320 MHz band, the L-STF sequence may be obtained by repeating the L-STF sequence defined for the 20 MHz band in existing 802.11ax. Likewise, when the L-STF is transmitted through the 160 MHz band, the L-STF sequence defined for the 20 MHz band in existing 802.11ax may be repeated twice. When the L-STF is transmitted through the 240 MHz band, the L-STF sequence defined for the 20 MHz band in existing 802.11ax may be repeated three times.

The L-STF sequence defined for the 20 MHz band is sqrt(½)*[0 0 0 0 0 0 0 0 1 +j 0 0 0 −1 −j 0 0 0 1 +j 0 0 0 −1 −j 0 0 0 −1 −j 0 0 0 1 +j 0 0 0 0 0 0 0 −1 −j 0 0 0 −1 −j 0 0 0 1 +j 0 0 0 1 +j 0 0 0 1 +j 0 0 0 1 +j 0 0 0 0 0 0 0].

The L-LTF sequence may be a sequence in which an L-LTF sequence defined for a 20 MHz band is repeated. Since the L-LTF is transmitted through the 320 MHz band, the L-LTF sequence may be obtained by repeating the L-LTF sequence defined for the 20 MHz band in existing 802.11ax. Likewise, when the L-LTF is transmitted through the 160 MHz band, the L-LTF sequence defined for the 20 MHz band in existing 802.11ax may be repeated twice. When the L-LTF is transmitted through the 240 MHz band, the L-LTF sequence defined for the 20 MHz band in existing 802.11ax may be repeated three times.

The L-LTF sequence defined for the 20 MHz band is [0 0 0 0 0 1 1 −1 −1 1 1 −1 1 −1 1 1 1 1 1 −1 −1 1 1 −1 1 −1 1 1 1 1 0 1 −1 −1 1 1 −1 1 −1 1 −1 −1 −1 −1 −1 1 1 −1 −1 1 −1 1 −1 1 1 1 1 0 0 0 0 0].

According to the foregoing embodiment, when the PPDU is transmitted through the 160 MHz or 240 MHz band, a phase rotation value may also be defined and applied to the legacy preamble in the same manner.

The EHT-SIG may include an EHT-SIG-A and an EHT-SIG-B. The EHT-SIG-B may include RU information. That is, the AP may indicate information on a tone plan for 160/240/320 MHz through the EHT-SIG-B in the PPDU. The EHT-STF, EHT-LTF, and the data field included in the EHT field may be transmitted or received in a band (RU) according to the tone plan for 160/240/320 MHz.

The EHT-SIG may be generated by applying the first phase rotation value or the second phase rotation value. When the EHT PPDU has a preamble structure according to 11ax, the field may be generated by applying the same phase rotation value to up to the EHT-SIG-B.

What is claimed is:

1. A method for transmitting a physical protocol data unit (PPDU) in a wireless local area network (WLAN) system, the method comprising:
   generating, by a transmission device, a PPDU; and
   transmitting, by the transmission device, the PPDU to a reception device through a 320 MHz band,
   wherein the PPDU comprises a legacy preamble and an extremely high throughput (EHT) field,
   the legacy preamble comprises a legacy-short training field (L-STF) and a legacy-long training field (L-LTF),
   the legacy preamble is generated by applying a first phase rotation value or a second phase rotation value,
   the first phase rotation value is obtained based on a third phase rotation value and a fourth phase rotation value,
   the third phase rotation value is a phase rotation value obtained by repeating a phase rotation value defined when the PPDU is transmitted in an 80 MHz band four times,
   the fourth phase rotation value is a phase rotation value defined for each 80 MHz band in the 320 MHz band based on an optimal Peak to Average Power Ratio (PAPR) of the L-STF,
   the 320 MHz band comprises subcarriers having a subcarrier index ranging from −512 to 511,
   the third phase rotation value is [1 −1 1 −1 1 −1 1 −1],
   a first value of 1 in the third phase rotation value is applied to subcarriers having a subcarrier index ranging from −512 to −449,
   a second value of −1 in the third phase rotation value is applied to subcarriers having a subcarrier index ranging from −448 to −257,
   a third value of 1 in the third phase rotation value is applied to subcarriers having a subcarrier index ranging from −256 to −193, a fourth value of −1 in the third phase rotation value is applied to subcarriers having a subcarrier index ranging from −192 to −1, a fifth value of 1 in the third phase rotation value is applied to subcarriers having a subcarrier index ranging from 0 to 63, a sixth value of −1 in the third phase rotation value is applied to subcarriers having a subcarrier index ranging from 64 to 255, a seventh value of 1 in the third phase rotation value is applied to subcarriers having a subcarrier index ranging from 256 to 319, and an eighth value of −1 in the third phase rotation value is applied to subcarriers having a subcarrier index ranging from 320 to 511.

2. The method of claim 1, wherein the fourth phase rotation value is [1 −j −j 1], a first value of 1 in the fourth phase rotation value is applied to a first 80 MHz band in the 320 MHz band, a second value of −j in the fourth phase rotation value is applied to a second 80 MHz band in the 320 MHz band, a third value of −j in the fourth phase rotation value is applied to a third 80 MHz band in the 320 MHz band, and a fourth value of 1 in the fourth phase rotation value is applied to a fourth 80 MHz band in the 320 MHz band.

3. The method of claim 2, wherein the first phase rotation value is obtained based on a product of the third phase rotation value and the fourth rotation value, and the first phase rotation value is [1 −1 −j j −j j 1 −1].

4. The method of claim 1, wherein the fourth phase rotation value is [1 j j 1], a first value of 1 in the fourth phase rotation value is applied to a first 80 MHz band in the 320 MHz band, a second value of j in the fourth phase rotation value is applied to a second 80 MHz band in the 320 MHz band, a third value of j in the fourth phase rotation value is applied to a third 80 MHz band in the 320 MHz band, and a fourth value of 1 in the fourth phase rotation value is applied to a fourth 80 MHz band in the 320 MHz band.

5. The method of claim 4, wherein the first phase rotation value is obtained based on a product of the third phase rotation value and the fourth rotation value, and the first phase rotation value is [1 −1 j −j j j −1 −1].

6. The method of claim 1, wherein the second phase rotation value is obtained based on the third phase rotation value and a fifth phase rotation value, and the fifth phase rotation value is a phase rotation value defined for each 80 MHz band in the 320 MHz band based on an optimal PAPR of the L-LTF.

7. The method of claim 6, wherein the fifth phase rotation value is [1 j j 1], a first value of 1 in the fifth phase rotation value is applied to a first 80 MHz band in the 320 MHz band, a second value of j in the fifth phase rotation value is applied to a second 80 MHz band in the 320 MHz band, a third value of j in the fifth phase rotation value is applied to a third 80 MHz band in the 320 MHz band, and a fourth value of 1 in the fifth phase rotation value is applied to a fourth 80 MHz band in the 320 MHz band.

8. The method of claim 7, wherein the second phase rotation value is obtained based on a product of the third phase rotation value and the fifth phase rotation value, and the second phase rotation value is [1 −1 j −j j j −1 −1].

9. The method of claim 6, wherein the fifth phase rotation value is [1 −j −j 1], a first value of 1 in the fifth phase rotation value is applied to a first 80 MHz band in the 320 MHz band, a second value of −j in the fifth phase rotation value is applied to a second 80 MHz band in the 320 MHz band, a third value of −j in the fifth phase rotation value is applied to a third 80 MHz band in the 320 MHz band, and a fourth value of 1 in the fifth phase rotation value is applied to a fourth 80 MHz band in the 320 MHz band.

10. The method of claim 9, wherein the second phase rotation value is obtained based on a product of the third phase rotation value and the fifth phase rotation value, and the second phase rotation value is [1 −1 −j j −j j 1 −1].

11. The method of claim 6, wherein the L-STF is generated by applying the first phase rotation value or the second phase rotation value to an L-STF sequence, the L-LTF is generated by applying the first phase rotation value or the second phase rotation value to an L-LTF sequence, the L-STF sequence is a sequence in which an L-STF sequence defined for a 20 MHz band is repeated, the L-STF sequence defined for the 20 MHz band is sqrt(½)*[0 0 0 0 0 0 0 0 1 +j 0 0 0 −1 −j 0 0 0 1 +j 0 0 0 −1 −j 0 0 0 −1 −j 0 0 0 1 +j 0 0 0 0 0 0 0 −1 −j 0 0 0 −1 −j 0 0 0 1 +j 0 0 0 1 +j 0 0 0 1 +j 0 0 0 1 +j 0 0 0 0 0], the L-LTF sequence is a sequence in which an L-LTF sequence defined for a 20 MHz band is repeated, and the L-LTF sequence defined for the 20 MHz band is [0 0 0 0 0 1 1 −1 −1 1 1 −1 1 −1 1 1 1 1 1 1 −1 −1 1 1 −1 1 −1 1 1 1 1 0 1 −1 −1 1 1 −1 1 −1 1 −1 −1 −1 −1 −1 1 1 −1 −1 1 −1 1 −1 1 1 1 1 0 0 0 0 0].

12. The method of claim 1, wherein the legacy preamble further comprises a legacy-signal (L-SIG), the EHT field comprises an EHT-SIG, an EHT-STF, an EHT-LTF, and a data field, and the EHT-SIG is generated by applying the first phase rotation value or the second phase rotation value.

13. A transmission device for transmitting a physical protocol data unit (PPDU) in a wireless local area network (WLAN) system, the transmission device comprising:

a memory;

a transceiver; and a processor operatively coupled with the memory and the transceiver, wherein the processor is configured to:

generate a PPDU, and transmit the PPDU to a reception device through a 320 MHz band, wherein the PPDU comprises a legacy preamble and an extremely high throughput (EHT) field, the legacy preamble comprises a legacy-short training field (L-STF) and a legacy-long training field (L-LTF), the legacy preamble is generated by applying a first phase rotation value or a second phase rotation value, the first phase rotation value is obtained based on a third phase rotation value and a fourth phase rotation value, the third phase rotation value is a phase rotation value obtained by repeating a phase rotation value defined when the PPDU is transmitted in an 80 MHz band four times, and the fourth phase rotation value is a phase rotation value defined for each 80 MHz band in the 320 MHz band based on an optimal Peak to Average Power Ratio (PAPR) of the L-STF, the 320 MHz band comprises subcarriers having a subcarrier index ranging from −512 to 511, the third phase rotation value is [1 −1 1 −1 1 −1 1 −1],
a first value of 1 in the third phase rotation value is applied to subcarriers having a subcarrier index ranging from −512 to −449,
a second value of −1 in the third phase rotation value is applied to subcarriers having a subcarrier index ranging from −448 to −257,
a third value of 1 in the third phase rotation value is applied to subcarriers having a subcarrier index ranging from −256 to −193,
a fourth value of −1 in the third phase rotation value is applied to subcarriers having a subcarrier index ranging from −192 to −1,
a fifth value of 1 in the third phase rotation value is applied to subcarriers having a subcarrier index ranging from 0 to 63,
a sixth value of −1 in the third phase rotation value is applied to subcarriers having a subcarrier index ranging from 64 to 255,
a seventh value of 1 in the third phase rotation value is applied to subcarriers having a subcarrier index ranging from 256 to 319, and
an eighth value of −1 in the third phase rotation value is applied to subcarriers having a subcarrier index ranging from 320 to 511.

14. A method for receiving a physical protocol data unit (PPDU) in a wireless local area network (WLAN) system, the method comprising:
receiving, by a reception device, a PPDU from a transmission device through a 320 MHz band; and
decoding, by the reception device, the PPDU for a band supported by the reception device,
the PPDU comprises a legacy preamble and an extremely high throughput (EHT) field,
the legacy preamble comprises a legacy-short training field (L-STF) and a legacy-long training field (L-LTF),
the legacy preamble is generated by applying a first phase rotation value or a second phase rotation value,
the first phase rotation value is obtained based on a third phase rotation value and a fourth phase rotation value,
the third phase rotation value is a phase rotation value obtained by repeating a phase rotation value defined when the PPDU is transmitted in an 80 MHz band four times,
the fourth phase rotation value is a phase rotation value defined for each 80 MHz band in the 320 MHz band based on an optimal Peak to Average Power Ratio (PAPR) of the L-STF,
the 320 MHz band comprises subcarriers having a subcarrier index ranging from −512 to 511,
the third phase rotation value is [1 −1 1 −1 1 −1 1 −1],
a first value of 1 in the third phase rotation value is applied to subcarriers having a subcarrier index ranging from −512 to −449,
a second value of −1 in the third phase rotation value is applied to subcarriers having a subcarrier index ranging from −448 to −257,
a third value of 1 in the third phase rotation value is applied to subcarriers having a subcarrier index ranging from −256 to −193,
a fourth value of −1 in the third phase rotation value is applied to subcarriers having a subcarrier index ranging from −192 to −1,
a fifth value of 1 in the third phase rotation value is applied to subcarriers having a subcarrier index ranging from 0 to 63,
a sixth value of −1 in the third phase rotation value is applied to subcarriers having a subcarrier index ranging from 64 to 255,
a seventh value of 1 in the third phase rotation value is applied to subcarriers having a subcarrier index ranging from 256 to 319, and
an eighth value of −1 in the third phase rotation value is applied to subcarriers having a subcarrier index ranging from 320 to 511.

\* \* \* \* \*